US012403058B2

(12) United States Patent
Lim et al.

(10) Patent No.: US 12,403,058 B2
(45) **Date of Patent: *Sep. 2, 2025**

(54) RECONFIGURABLE UPPER LEG SUPPORT FOR A SURGICAL FRAME

(71) Applicant: WARSAW ORTHOPEDIC, INC., Warsaw, IN (US)

(72) Inventors: Roy K. Lim, Germantown, TN (US); Richard A. Hynes, Melbourne Beach, FL (US); Matthew M. Morrison, Cordova, TN (US); Roger P. Jackson, Prairie Village, KS (US)

(73) Assignee: WARSAW ORTHOPEDIC, INC., Warsaw, IN (US)

( * ) Notice: Subject to any disclaimer, the term of this patent is extended or adjusted under 35 U.S.C. 154(b) by 146 days.

This patent is subject to a terminal disclaimer.

(21) Appl. No.: 18/208,670

(22) Filed: Jun. 12, 2023

(65) Prior Publication Data

US 2023/0320915 A1 Oct. 12, 2023

Related U.S. Application Data

(63) Continuation of application No. 16/927,219, filed on Jul. 13, 2020, now Pat. No. 11,672,718.
(Continued)

(51) Int. Cl.
*A61G 13/00* (2006.01)
*A61G 13/04* (2006.01)
(Continued)

(52) U.S. Cl.
CPC ..... *A61G 13/1245* (2013.01); *A61G 13/0036* (2013.01); *A61G 13/04* (2013.01);
(Continued)

(58) Field of Classification Search
CPC .... A61H 1/0237; A61H 1/024; A61H 1/0255; A61G 13/0036; A61G 13/0054;
(Continued)

(56) References Cited

U.S. PATENT DOCUMENTS 2,691,979 A 10/1954 Watson
3,060,925 A 10/1962 Honsaker et al.
(Continued)

FOREIGN PATENT DOCUMENTS

CN 2100875 U 4/1992
CN 201185976 1/2009
(Continued)

OTHER PUBLICATIONS

Examination Report dated Apr. 8, 2020 from Australian Application No. 2016308175.
(Continued)

*Primary Examiner* — Adam Baker

(57) ABSTRACT

A surgical frame and method for use thereof is provided. The surgical frame is capable of reconfiguration before, during, or after surgery. The surgical frame includes a main beam that can be rotated, raised/lowered, and tilted upwardly/downwardly to afford positioning and repositioning of a patient supported thereon. The surgical frame also includes a reconfigurable upper leg support for supporting portions of the upper legs, the hips, and the lower back of the patient to facilitate positioning and repositioning there during surgery. The upper leg support via reconfiguration thereof can accommodate patients of different sizes, can provide flexure of the patient's lumbar spine to facilitate surgical access thereto, and can prevent unwanted torsion of a patient's spine during such reconfiguration.

20 Claims, 52 Drawing Sheets

Related U.S. Application Data

(60) Provisional application No. 62/905,770, filed on Sep. 25, 2019.

(51) Int. Cl.
*A61G 13/06* (2006.01)
*A61G 13/08* (2006.01)
*A61G 13/12* (2006.01)

(52) U.S. Cl.
CPC ............. *A61G 13/06* (2013.01); *A61G 13/08* (2013.01); *A61G 13/123* (2013.01); *A61G 13/1235* (2013.01); *A61G 13/1285* (2013.01); *A61G 2200/322* (2013.01); *A61G 2200/325* (2013.01); *A61G 2200/327* (2013.01)

(58) Field of Classification Search
CPC .... A61G 13/0081; A61G 13/04; A61G 13/06; A61G 13/08; A61G 13/1245; A61G 13/125; A61G 13/1285; A61G 13/123; A61G 7/074; A61G 7/0755
USPC .......................................................... 128/845
See application file for complete search history.

(56) References Cited

U.S. PATENT DOCUMENTS

| | | | |
|---|---|---|---|
| 3,226,105 | A | 12/1965 | Weickgenannt et al. |
| 3,227,440 | A | 1/1966 | Scott |
| 3,293,667 | A | 12/1966 | Ohrberg |
| 3,306,287 | A | 2/1967 | Arp |
| 3,389,702 | A | 6/1968 | Kennedy |
| 3,828,377 | A | 8/1974 | Fary, Sr. |
| 4,029,089 | A | 6/1977 | Mulhlland |
| 4,194,257 | A | 3/1980 | Martin et al. |
| 4,627,119 | A | 12/1986 | Hachey et al. |
| 4,655,200 | A | 4/1987 | Knight |
| 4,705,026 | A | 11/1987 | Chaussy |
| 4,866,796 | A | 9/1989 | Robinson |
| 4,872,656 | A | 10/1989 | Brendgord |
| 4,901,384 | A | 2/1990 | Eary |
| 4,915,101 | A | 4/1990 | Cuccia |
| 5,009,407 | A | 4/1991 | Watanabe |
| 5,088,706 | A | 2/1992 | Jackson |
| 5,103,511 | A | 4/1992 | Sequin |
| 5,131,106 | A | 7/1992 | Jackson |
| 5,362,302 | A | 11/1994 | Jenson et al. |
| 5,390,383 | A | 2/1995 | Carn |
| 5,410,769 | A | 5/1995 | Waterman |
| 5,444,882 | A | 8/1995 | Andrews |
| 5,522,098 | A * | 6/1996 | Podgorschek ......... A61G 13/06 5/613 |
| 5,613,254 | A | 3/1997 | Clayman |
| 5,642,302 | A | 6/1997 | Dumont |
| 5,860,899 | A | 1/1999 | Rassman |
| 5,991,651 | A | 11/1999 | LaBarbera |
| 6,003,176 | A | 12/1999 | Wasley |
| 6,076,525 | A | 6/2000 | Hoffman |
| 6,112,349 | A | 9/2000 | Connolly |
| 6,154,901 | A | 12/2000 | Carr |
| 6,260,220 | B1 | 7/2001 | Lamb |
| 6,269,499 | B1 * | 8/2001 | Amir ........................ A61B 6/04 5/601 |
| 6,295,671 | B1 | 10/2001 | Reesby et al. |
| 6,311,349 | B1 | 11/2001 | Kazakia |
| 6,367,104 | B1 | 4/2002 | Fallbo, Sr. et al. |
| 6,378,149 | B1 | 4/2002 | Sanders et al. |
| 6,516,483 | B1 | 2/2003 | VanSteenburg |
| 6,566,833 | B2 | 5/2003 | Barlett |
| 6,615,430 | B2 | 9/2003 | Heimbrock |
| 6,671,905 | B2 | 1/2004 | Bartlett et al. |
| 6,681,423 | B2 | 1/2004 | Zachrisson |
| 6,701,553 | B1 | 3/2004 | Hand et al. |
| 6,701,554 | B2 | 3/2004 | Heimbrock |
| 6,701,558 | B2 | 3/2004 | VanSteenburg |
| 6,715,169 | B2 | 4/2004 | Niederkrom |
| 6,728,983 | B2 | 5/2004 | Bartlett et al. |
| 6,732,390 | B2 | 5/2004 | Krywiczanin |
| 6,739,006 | B2 | 5/2004 | Borders et al. |
| 6,820,621 | B2 | 11/2004 | DeMayo |
| 6,874,181 | B1 | 4/2005 | Connolly et al. |
| 6,905,508 | B2 | 6/2005 | Cuccia |
| 6,934,986 | B2 | 8/2005 | Krywiczanin et al. |
| 6,941,951 | B2 | 9/2005 | Hubert et al. |
| 6,966,081 | B1 | 11/2005 | Sharps |
| 6,986,181 | B2 | 1/2006 | Murphy et al. |
| 7,100,225 | B1 | 9/2006 | Bailey |
| 7,152,261 | B2 | 12/2006 | Jackson |
| 7,189,214 | B1 | 3/2007 | Saunders |
| 7,219,379 | B2 | 5/2007 | Krywiczanin et al. |
| 7,234,180 | B2 | 6/2007 | Horton et al. |
| 7,290,302 | B2 | 11/2007 | Sharps |
| 7,426,930 | B1 | 9/2008 | Bailey |
| 7,441,291 | B2 * | 10/2008 | Hayes .................... A61G 7/015 5/624 |
| 7,472,440 | B2 | 1/2009 | Bartlett et al. |
| 7,484,253 | B1 | 2/2009 | Coppens |
| 7,496,980 | B2 | 3/2009 | Sharps |
| 7,600,281 | B2 | 10/2009 | Skripps |
| 7,669,262 | B2 | 3/2010 | Skripps |
| 7,739,762 | B2 | 6/2010 | Lamb et al. |
| 7,882,583 | B2 | 2/2011 | Skripps |
| 8,118,029 | B2 | 2/2012 | Gneiting et al. |
| 8,234,730 | B2 | 8/2012 | Skripps |
| 8,286,283 | B2 | 10/2012 | Copeland et al. |
| 8,286,637 | B2 | 10/2012 | Kaska |
| 8,413,660 | B2 | 4/2013 | Weinstein et al. |
| 8,439,948 | B1 | 5/2013 | King |
| 8,443,473 | B2 | 5/2013 | Maxwell |
| 8,584,281 | B2 | 11/2013 | Diel et al. |
| 8,635,725 | B2 | 1/2014 | Tannoury et al. |
| 9,072,646 | B2 | 7/2015 | Skripps et al. |
| 9,265,680 | B2 | 2/2016 | Sharps |
| 9,339,430 | B2 | 5/2016 | Jackson et al. |
| 9,358,170 | B2 | 6/2016 | Jackson |
| 9,414,982 | B2 | 8/2016 | Jackson |
| 9,498,397 | B2 | 11/2016 | Hight et al. |
| 9,522,078 | B2 | 12/2016 | Pizzini |
| 9,554,959 | B2 | 1/2017 | Carn |
| 9,655,793 | B2 | 5/2017 | Hertz |
| 9,700,476 | B2 | 7/2017 | Hoel et al. |
| 9,713,562 | B2 | 7/2017 | Perlman et al. |
| 9,744,089 | B2 | 8/2017 | Jackson |
| 9,849,054 | B2 | 12/2017 | Jackson |
| 9,937,006 | B2 | 4/2018 | Skripps et al. |
| 9,993,380 | B2 | 6/2018 | Jackson |
| 10,136,863 | B2 | 11/2018 | Kaiser et al. |
| 10,314,758 | B2 | 6/2019 | Dolliver et al. |
| 10,342,722 | B2 | 7/2019 | Garrido |
| 10,406,054 | B1 | 9/2019 | Scholl et al. |
| 10,426,684 | B2 | 10/2019 | Dubois et al. |
| 10,531,998 | B2 | 1/2020 | Jackson et al. |
| 10,543,142 | B2 | 1/2020 | Lim et al. |
| 10,548,796 | B2 | 2/2020 | Lim et al. |
| 10,576,006 | B2 | 3/2020 | Lim et al. |
| 10,695,252 | B2 | 6/2020 | Jackson |
| 10,722,413 | B2 | 7/2020 | Lim et al. |
| 10,729,607 | B2 | 8/2020 | Jackson |
| 10,751,240 | B2 | 8/2020 | Lim et al. |
| 10,835,438 | B2 | 11/2020 | Jackson |
| 10,835,439 | B2 | 11/2020 | Lim et al. |
| 10,849,809 | B2 | 12/2020 | Lim et al. |
| 10,874,570 | B2 | 12/2020 | Lim et al. |
| 10,881,570 | B2 | 1/2021 | Lim et al. |
| 10,888,484 | B2 | 1/2021 | Lim et al. |
| 10,893,996 | B2 | 1/2021 | Lim et al. |
| 10,898,401 | B2 | 1/2021 | Lim et al. |
| 10,900,448 | B2 | 1/2021 | Lim et al. |
| 11,672,718 | B2 * | 6/2023 | Lim ....................... A61G 13/04 128/845 |
| 2002/0138905 | A1 | 10/2002 | Barltett et al. |
| 2002/0138906 | A1 | 10/2002 | Barltett et al. |
| 2002/0157186 | A1 | 10/2002 | VanSteenburg |

(56) References Cited

U.S. PATENT DOCUMENTS

2003/0140419 A1 7/2003 Barltett et al.
2003/0140420 A1 7/2003 Niederkrom
2003/0145382 A1 8/2003 Krywiczanin
2003/0154550 A1* 8/2003 Murphy ............... A61H 1/0292 5/624
2003/0178027 A1 9/2003 DeMayo et al.
2004/0010849 A1 1/2004 Krywiczanin et al.
2004/0133983 A1 7/2004 Newkirk
2005/0181917 A1 8/2005 Dayal
2006/0037141 A1 2/2006 Krywiczanin et al.
2006/0123546 A1 6/2006 Horton
2006/0162076 A1 7/2006 Bartlett et al.
2006/0162084 A1 7/2006 Mezue
2008/0034502 A1 2/2008 Copeland et al.
2008/0134434 A1 6/2008 Celauro
2008/0222811 A1 9/2008 Gilbert et al.
2009/0139030 A1 6/2009 Yang
2010/0037397 A1 2/2010 Wood
2010/0192300 A1 8/2010 Tannoury
2010/0293719 A1 11/2010 Klemm et al.
2011/0099716 A1 5/2011 Jackson
2011/0152931 A1 6/2011 Zhang et al.
2012/0103344 A1 5/2012 Hunter
2012/0144589 A1 6/2012 Skripps et al.
2012/0255122 A1 10/2012 Diel et al.
2012/0255123 A1* 10/2012 Buege .................... A61G 13/06 5/613
2013/0111666 A1 5/2013 Jackson
2013/0191994 A1 8/2013 Bellows et al.
2013/0283526 A1 10/2013 Gagliardi
2013/0307298 A1 11/2013 Meiki
2014/0020183 A1 1/2014 Dominick
2014/0059773 A1 3/2014 Carn
2014/0068861 A1 3/2014 Jackson
2014/0109316 A1 4/2014 Jackson et al.
2014/0137327 A1 5/2014 Tannoury et al.
2014/0243716 A1 8/2014 Diot et al.
2014/0325759 A1* 11/2014 Bly ........................ A61G 7/015 5/613
2015/0044956 A1 2/2015 Hacker
2015/0245971 A1 9/2015 Bernardoni et al.
2015/0272681 A1 10/2015 Skripps et al.
2016/0000621 A1 1/2016 Jackson
2016/0000626 A1 1/2016 Jackson et al.
2016/0081582 A1 3/2016 Rapoport
2016/0089287 A1 3/2016 Buerstner
2016/0193099 A1 7/2016 Drake
2017/0027797 A1 2/2017 Dolliver et al.
2017/0049651 A1 2/2017 Lim
2017/0049653 A1 2/2017 Lim
2017/0079864 A1 3/2017 Riley
2017/0112698 A1 4/2017 Hight et al.
2017/0112699 A1* 4/2017 Hight ................. A61G 13/1245
2017/0135891 A1 5/2017 Kettner
2017/0151115 A1 6/2017 Jackson
2017/0281438 A1* 10/2017 Elku ...................... A61G 7/015
2017/0341232 A1 11/2017 Perplies
2017/0348171 A1 12/2017 Jackson
2018/0116891 A1 5/2018 Beale et al.
2018/0185228 A1 7/2018 Catacchio et al.
2018/0193104 A1 7/2018 Beale et al.
2018/0363596 A1 12/2018 Lim et al.
2019/0000702 A1 1/2019 Lim et al.
2019/0000707 A1 1/2019 Lim et al.
2019/0021510 A1* 1/2019 Gao ....................... A47C 20/08
2019/0046381 A1 2/2019 Lim et al.
2019/0046383 A1 2/2019 Lim et al.
2019/0209409 A1 7/2019 Jackson et al.
2020/0000668 A1 1/2020 Lim et al.
2020/0060913 A1 2/2020 Lim et al.
2020/0060914 A1 2/2020 Lim et al.
2020/0060915 A1 2/2020 Lim et al.
2020/0138659 A1 5/2020 Lim et al.
2020/0138660 A1 5/2020 Jackson
2020/0170868 A1 6/2020 Jackson
2020/0188208 A1 6/2020 Lim et al.
2020/0281788 A1 9/2020 Lim et al.
2020/0297568 A1 9/2020 Lim et al.
2020/0337923 A1 10/2020 Lim et al.
2020/0337926 A1 10/2020 Lim et al.
2020/0337927 A1 10/2020 Lim et al.
2020/0360214 A1 11/2020 Lim et al.

FOREIGN PATENT DOCUMENTS

CN 103298440 A 9/2013
EP 3124000 2/2017
JP 2012-228509 11/2012
JP 5237301 7/2013
JP 2017099859 6/2017
JP 2017113528 6/2017
JP 2018069048 5/2018
WO 2000062731 10/2000
WO 2007058673 5/2007
WO 2017031225 2/2017
WO 2017139548 8/2017
WO 2019032491 2/2019

OTHER PUBLICATIONS

Office Action and Search Report issued Aug. 27, 2019 for corresponding Chinese application No. 201680046857.4.
Second Office Action dated Mar. 24, 2020 from Chinese Application No. 201680046857.4.
Office Action issued Dec. 17, 2019 for corresponding Japanese Application No. 2018-504646 with English translation.
Office Action issued Jun. 2, 2020 for corresponding Japanese application No. 2018-566265 with English translation.
International Search Report dated Nov. 21, 2016 from International Application No. PCT/US2016/047394.
International Search Report and Written Opinion dated Dec. 4, 2019 from International Application No. PCT/US2019/046979.
International Search Report and Written Opinion dated Feb. 5, 2021 from International Application No. PCT/US2020/052039.

* cited by examiner

| Height<br>6-3" | Neutral<br>3 deg | 30 deg flex<br>40 deg | length change |
|---|---|---|---|
| Cylinder 1 | 24.862 | 40.3749 | 15.5129 |
| Cylinder 2 | 8.63941 | 6.65196 | -1.98745 |
| Cylinder 3 | 11.9626 | 9.54042 | -2.42218 |

*FIG. 39*

RECONFIGURABLE UPPER LEG SUPPORT FOR A SURGICAL FRAME

The present application is a continuation of U.S. Ser. No. 16/927,219, filed Jul. 13, 2020; which claims benefit of U.S. Provisional Application No. 62/905,770, filed Sep. 25, 2019; all of which are incorporated by reference herein.

FIELD

The present technology generally relates to a reconfigurable upper leg support for use with a surgical frame incorporating a main beam capable of rotation.

BACKGROUND

Access to a patient is of paramount concern during surgery. Surgical frames have been used to position and reposition patients during surgery. For example, surgical frames have been configured to manipulate the rotational position of the patient before, during, and even after surgery. Such surgical frames include support structures to facilitate the rotational movement of the patient. Typical support structures can include main beams supported at either end thereof for rotational movement about axes of rotation extending along the lengths of the surgical frames. The main beams can be positioned and repositioned to afford various positions of the patients positioned thereon. To illustrate, the main beams can be rotated for positioning a patient in prone positions, lateral positions, and positions 45° between the prone and lateral positions. In addition to the rotational positioning afforded by the main beams, the patients can be further manipulated by support structures attached relative to the main beam. To illustrate, an upper leg support can be provided to support portions of upper legs, hips, and the lower back of the patient. Such an upper leg support can be moveable with respect to the main beam to facilitate positioning and repositioning of the upper legs, the hips, and the lower back of the patient to facilitate access to the patient during surgery. However, patients have different sizes and it is desirous to inhibit torsion of the patient's spine during use of surgical frame. Therefore, there is a need for a reconfigurable upper leg support that via reconfiguration thereof can accommodate patients of different sizes, can provide flexure of the patient's lumbar spine to facilitate surgical access thereto, and can prevent unwanted torsion of a patient's spine during such reconfiguration.

SUMMARY

The techniques of this disclosure generally relate to a reconfigurable upper leg support attached relative to a rotatable main beam that is articulable to adjust the position of the upper legs of a patient to correspondingly affect the flexure of the lumbar spine of a patient, while simultaneously inhibiting unwanted torsion of the patient's spine caused by reconfiguration of the upper leg support.

In one aspect, the present disclosure provides a method of adjusting a position of a patient supported on a surgical frame, the method including positioning the patient on the surgical frame by supporting upper legs of the patient on a support plate; extending a first arm portion relative to a second arm portion to adjust a position of a platform portion relative to a portion of the surgical frame, the first arm portion including a first end attached relative to the portion of the surgical frame and a second end attached relative to the platform portion, and the second arm portion including a first end attached relative to the platform portion and a second end attached relative to the portion of the surgical frame; extending a first telescoping shaft to adjust a position of the platform portion relative to at least one of the first arm portion and the second arm portion, the first telescoping shaft including a first end attached relative to the second arm portion and a second end attached relative to the platform portion; extending a second telescoping shaft to adjust a position of the support plate relative to the platform portion, the second telescoping shaft including a first end attached relative to the platform portion and a second end attached to a support bracket moveably attached relative to the support platform, and the support plate being supported relative to the support bracket; adjusting a center of rotation of a lumbar portion of a spine of the patient by coordinating the extension of the first arm portion, the first telescoping shaft, and the second telescoping shaft.

In one aspect, the present disclosure provides a method of adjusting a position of a patient supported on a surgical frame, the method including supporting upper legs of the patient on a support plate; extending a first arm portion to adjust a position of a platform portion relative to a portion of the surgical frame, the first arm portion including a first end attached relative to the portion of the surgical frame and a second end attached relative to the platform portion; extending a telescoping shaft to adjust a position of the support plate relative to the platform portion, the telescoping shaft including a first end attached relative to the platform portion and a second end attached to a support bracket moveably attached relative to the support platform, and the support plate being supported relative to the support bracket; and adjusting a center of rotation of a lumbar portion of a spine of the patient by coordinating the extension of the first arm portion and the telescoping shaft.

In one aspect, the present disclosure provides a method of adjusting a position of a patient supported on a surgical frame, the method including positioning the patient on the surgical frame by supporting upper legs of the patient on a support plate; pivoting an arm portion relative to a portion of the surgical frame to adjust a position of a platform portion relative to a portion of the surgical frame, the arm portion including a first end pivotally attached relative to the portion of the surgical frame and a second end attached relative to the platform portion; extending a first telescoping shaft to adjust a position of the platform portion relative to the arm portion, the first telescoping shaft including a first end attached relative to the arm portion and a second end attached relative to the platform portion; and extending a second telescoping shaft to adjust a position of the support plate relative to the platform portion, the second telescoping shaft including a first end attached relative to the platform portion and a second end attached to a support bracket moveably attached relative to the support platform, and the support plate being supported relative to the support bracket.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 39 is a table illustrating extension amounts for the first arm portion, the first telescoping shaft portion, and the second telescoping shaft portion;

Figure 1:
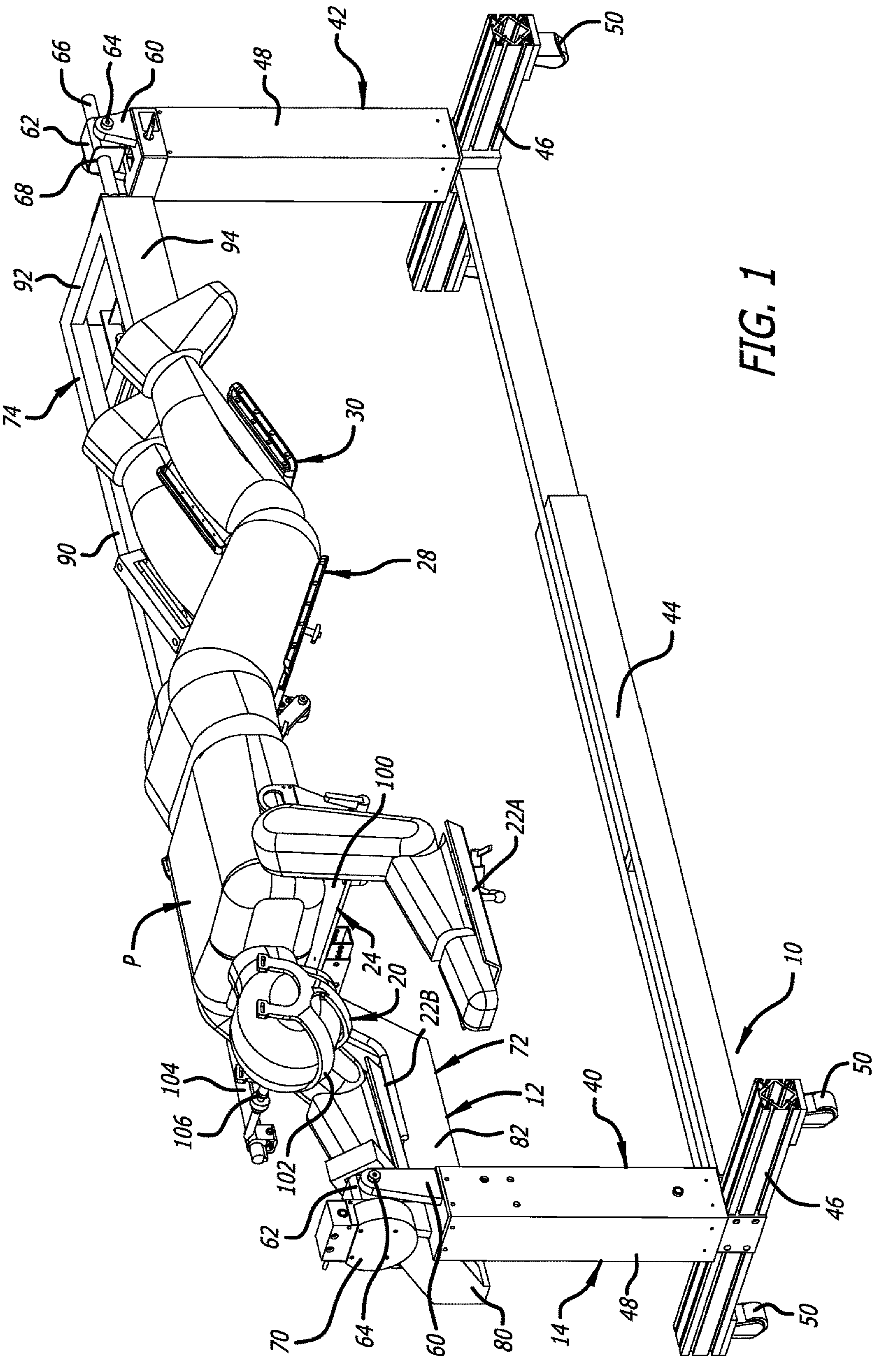
FIG. 1 is a top perspective view that illustrates a prior art surgical frame with a patient positioned thereon in a prone position.
Figure 2:
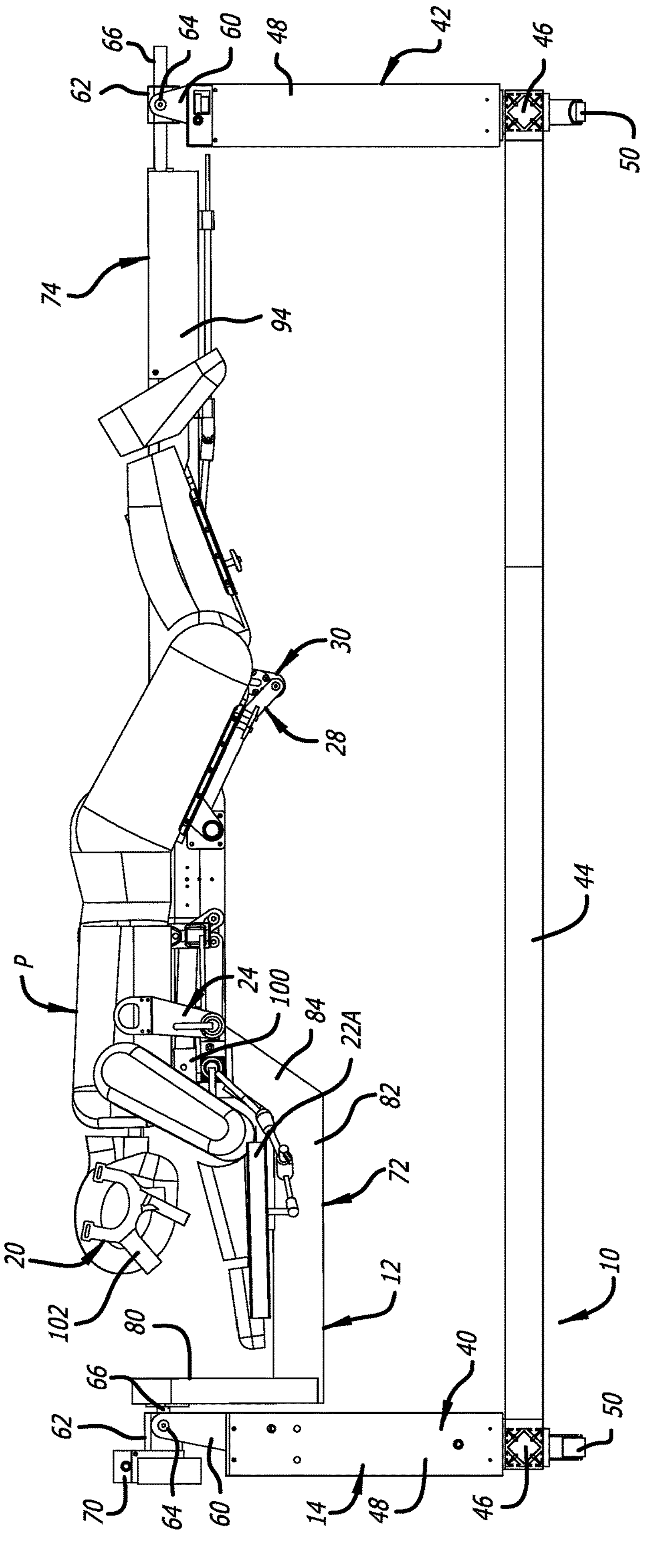
FIG. 2 is a side elevational view that illustrates the surgical frame of FIG. 1 with the patient positioned thereon in a prone position.
Figure 3:
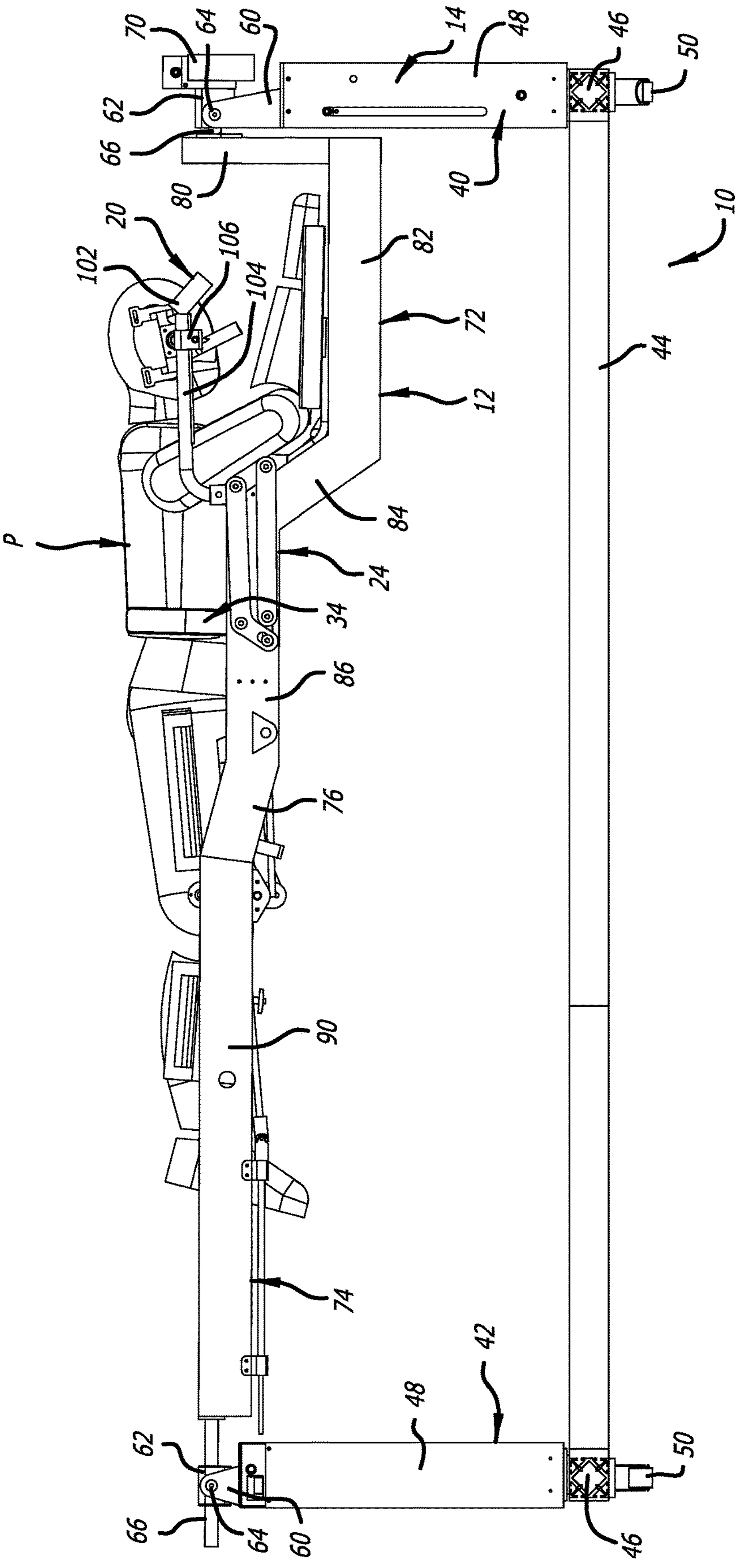
FIG. 3 is another side elevational view that illustrates the surgical frame of FIG. 1 with the patient positioned thereon in a prone position.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

FIGS. 1-26 depict a prior art embodiment and components of a surgical support frame generally indicated by the numeral 10. FIGS. 1-26 were previously described in U.S. Ser. No. 15/239,256, which is hereby incorporated by reference herein in its entirety. Furthermore, FIGS. 27-30 were previously described in U.S. Ser. No. 15/639,080, which is hereby incorporated by reference herein in its entirety.

As discussed below, the surgical frame 10 serves as an exoskeleton to support the body of the patient P as the patient's body is manipulated thereby, and, in doing so, serves to support the patient P such that the patient's spine does not experience unnecessary torsion.

The surgical frame 10 is configured to provide a relatively minimal amount of structure adjacent the patient's spine to facilitate access thereto and to improve the quality of imaging available before and during surgery. Thus, the surgeon's workspace and imaging access are thereby increased. Furthermore, radiolucent or low magnetic susceptibility materials can be used in constructing the structural components adjacent the patient's spine in order to further enhance imaging quality.

The surgical frame 10 has a longitudinal axis and a length therealong. As depicted in FIGS. 1-5, for example, the surgical frame 10 includes an offset structural main beam 12 and a support structure 14. The offset main beam 12 is spaced from the ground by the support structure 14. As discussed below, the offset main beam 12 is used in supporting the patient P on the surgical frame 10 and various support components of the surgical frame 10 that directly contact the patient P (such as a head support 20, arm supports 22A and 22B, torso-lift supports 24 and 160, a sagittal adjustment assembly 28 including a pelvic-tilt mechanism 30 and a leg adjustment mechanism 32, and a coronal adjustment assembly 34). As discussed below, an operator such as a surgeon can control actuation of the various support components to manipulate the position of the patient's body. Soft straps (not shown) are used with these various support components to secure the patient P to the frame and to enable either manipulation or fixation of the patient P. Reusable soft pads can be used on the load-bearing areas of the various support components.

Figure 4:
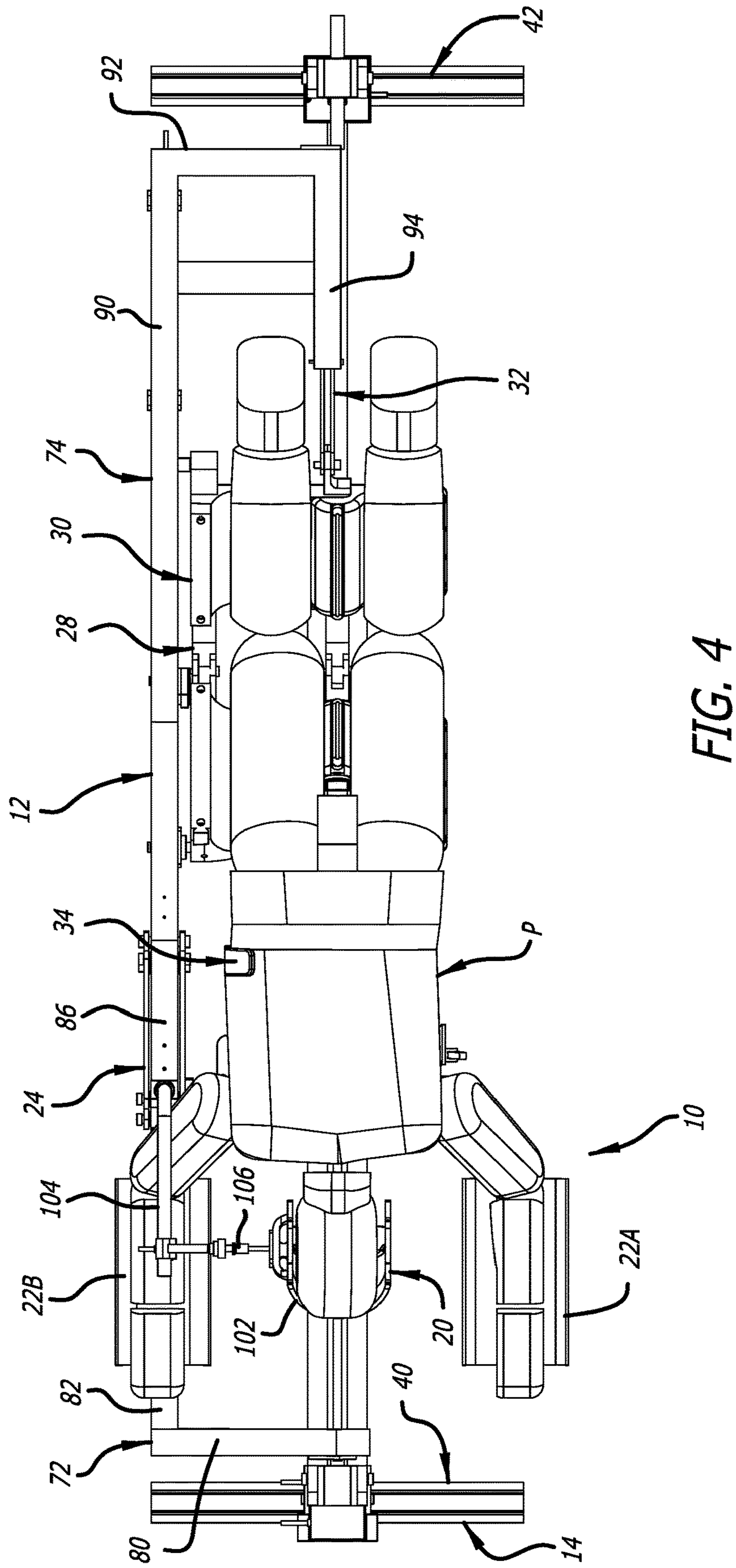
FIG. 4 is a top plan view that illustrates the surgical frame of FIG. 1 with the patient positioned thereon in a prone position.
Figure 5:
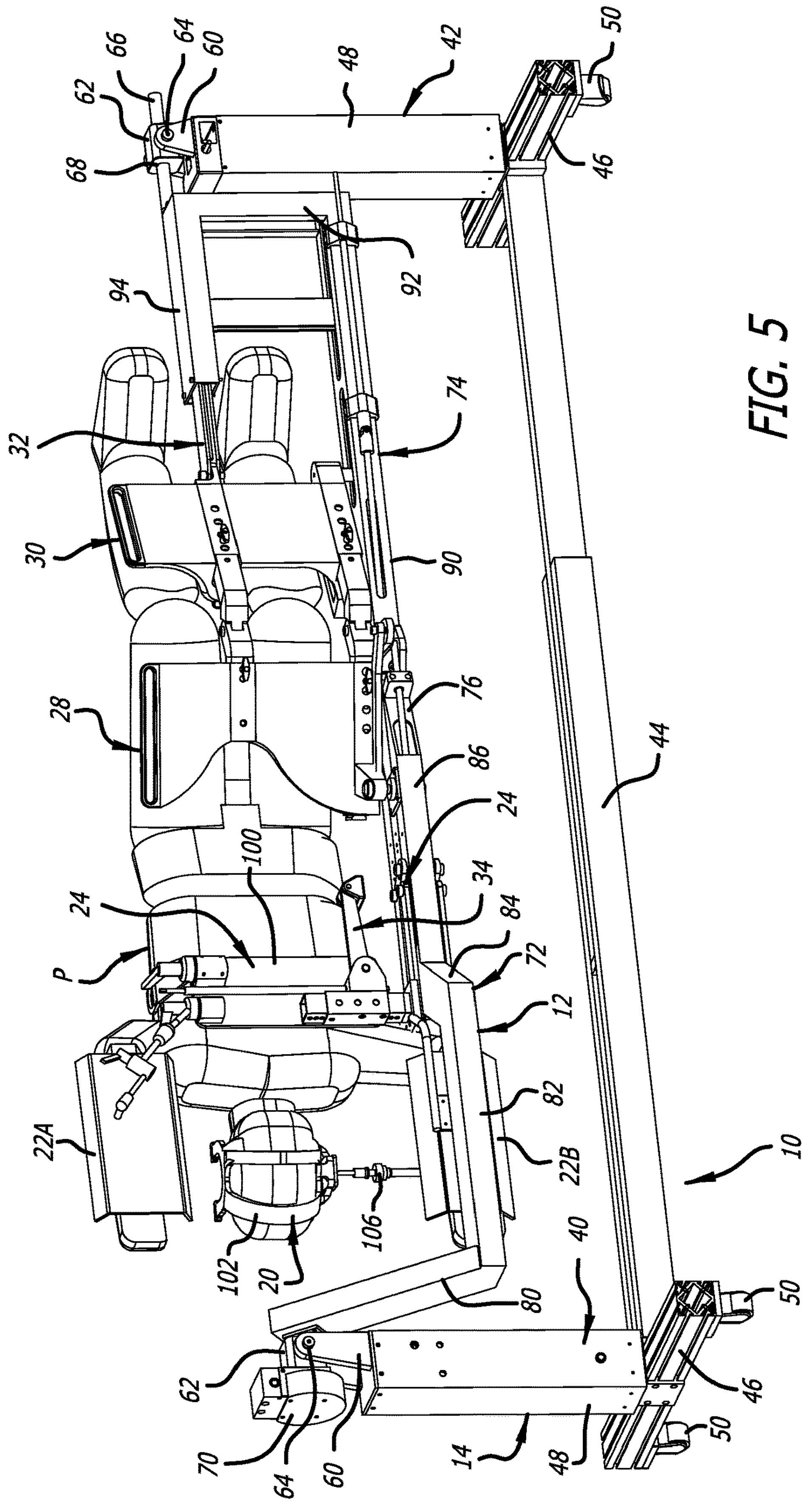
FIG. 5 is a top perspective view that illustrates the surgical frame of FIG. 1 with the patient positioned thereon in a lateral position.

The offset main beam 12 is used to facilitate rotation of the patient P. The offset main beam 12 can be rotated a full 360° before and during surgery to facilitate various positions of the patient P to afford various surgical pathways to the patient's spine depending on the surgery to be performed. For example, the offset main beam 12 can be positioned to place the patient P in a prone position (e.g., FIGS. 1-4), a lateral position (e.g., FIG. 5), and in a position 45° between the prone and lateral positions. Furthermore, the offset main beam 12 can be rotated to afford anterior, posterior, lateral, anterolateral, and posterolateral pathways to the spine. As such, the patient's body can be flipped numerous times before and during surgery without compromising sterility or safety. The various support components of the surgical frame 10 are strategically placed to further manipulate the patient's body into position before and during surgery. Such intraoperative manipulation and positioning of the patient P affords a surgeon significant access to the patient's body. To illustrate, when the offset main beam 12 is rotated to position the patient P in a lateral position, as depicted in FIG. 5, the head support 20, the arm supports 22A and 22B, the torso-lift support 24, the sagittal adjustment assembly 28, and/or the coronal adjustment assembly 34 can be articulated such that the surgical frame 10 is OLIF-capable or DLIF-capable.

As depicted in FIG. 1, for example, the support structure 14 includes a first support portion 40 and a second support portion 42 interconnected by a cross member 44. Each of the first and second support portions 40 and 42 include a horizontal portion 46 and a vertical support post 48. The horizontal portions 46 are connected to the cross member 44, and casters 50 can be attached to the horizontal portions 46 to facilitate movement of the surgical frame 10.

The vertical support posts 48 can be adjustable to facilitate expansion and contraction of the heights thereof. Expansion and contraction of the vertical support posts 48 facilitates raising and lowering, respectively, of the offset main beam 12. As such, the vertical support posts 48 can be adjusted to have equal or different heights. For example, the vertical support posts 48 can be adjusted such that the vertical support post 48 of the second support portion 42 is raised 12 inches higher than the vertical support post 48 of the first support portion 40 to place the patient P in a reverse Trendelenburg position.

Furthermore, cross member 44 can be adjustable to facilitate expansion and contraction of the length thereof. Expansion and contraction of the cross member 44 facilitates lengthening and shortening, respectively, of the distance between the first and second support portions 40 and 42.

The vertical support post 48 of the first and second support portions 40 and 42 have heights at least affording rotation of the offset main beam 12 and the patient P positioned thereon. Each of the vertical support posts 48 include a clevis 60, a support block 62 positioned in the clevis 60, and a pin 64 pinning the clevis 60 to the support block 62. The support blocks 62 are capable of pivotal movement relative to the clevises 60 to accommodate different heights of the vertical support posts 48. Furthermore, axles 66 extending outwardly from the offset main beam 12 are received in apertures 68 formed on the support blocks 62. The axles 66 define an axis of rotation of the offset main beam 12, and the interaction of the axles 66 with the support blocks 62 facilitate rotation of the offset main beam 12.

Furthermore, a servomotor 70 can be interconnected with the axle 66 received in the support block 62 of the first support portion 40. The servomotor 70 can be computer controlled and/or operated by the operator of the surgical frame 10 to facilitate controlled rotation of the offset main beam 12. Thus, by controlling actuation of the servomotor 70, the offset main beam 12 and the patient P supported thereon can be rotated to afford the various surgical pathways to the patient's spine.

As depicted in FIGS. 1-5, for example, the offset main beam 12 includes a forward portion 72 and a rear portion 74. The forward portion 72 supports the head support 20, the arm supports 22A and 22B, the torso-lift support 24, and the coronal adjustment assembly 34, and the rear portion 74 supports the sagittal adjustment assembly 28. The forward and rear portions 72 and 74 are connected to one another by connection member 76 shared therebetween. The forward portion 72 includes a first portion 80, a second portion 82, a third portion 84, and a fourth portion 86. The first portion 80 extends transversely to the axis of rotation of the offset main beam 12, and the second and fourth portions 82 and 86 are aligned with the axis of rotation of the offset main beam 12. The rear portion 74 includes a first portion 90, a second portion 92, and a third portion 94. The first and third portions 90 and 94 are aligned with the axis of rotation of the offset main beam 12, and the second portion 92 extends transversely to the axis of rotation of the offset main beam 12.

The axles 66 are attached to the first portion 80 of the forward portion 72 and to the third portion 94 of the rear portion 74. The lengths of the first portion 80 of the forward portion 72 and the second portion 92 of the rear portion 74 serve in offsetting portions of the forward and rear portions 72 and 74 from the axis of rotation of the offset main beam 12. This offset affords positioning of the cranial-caudal axis of patient P approximately aligned with the axis of rotation of the offset main beam 12.

Programmable settings controlled by a computer controller (not shown) can be used to maintain an ideal patient height for a working position of the surgical frame 10 at a near-constant position through rotation cycles, for example, between the patient positions depicted in FIGS. 1 and 5. This allows for a variable axis of rotation between the first portion 40 and the second portion 42.

Figure 6:
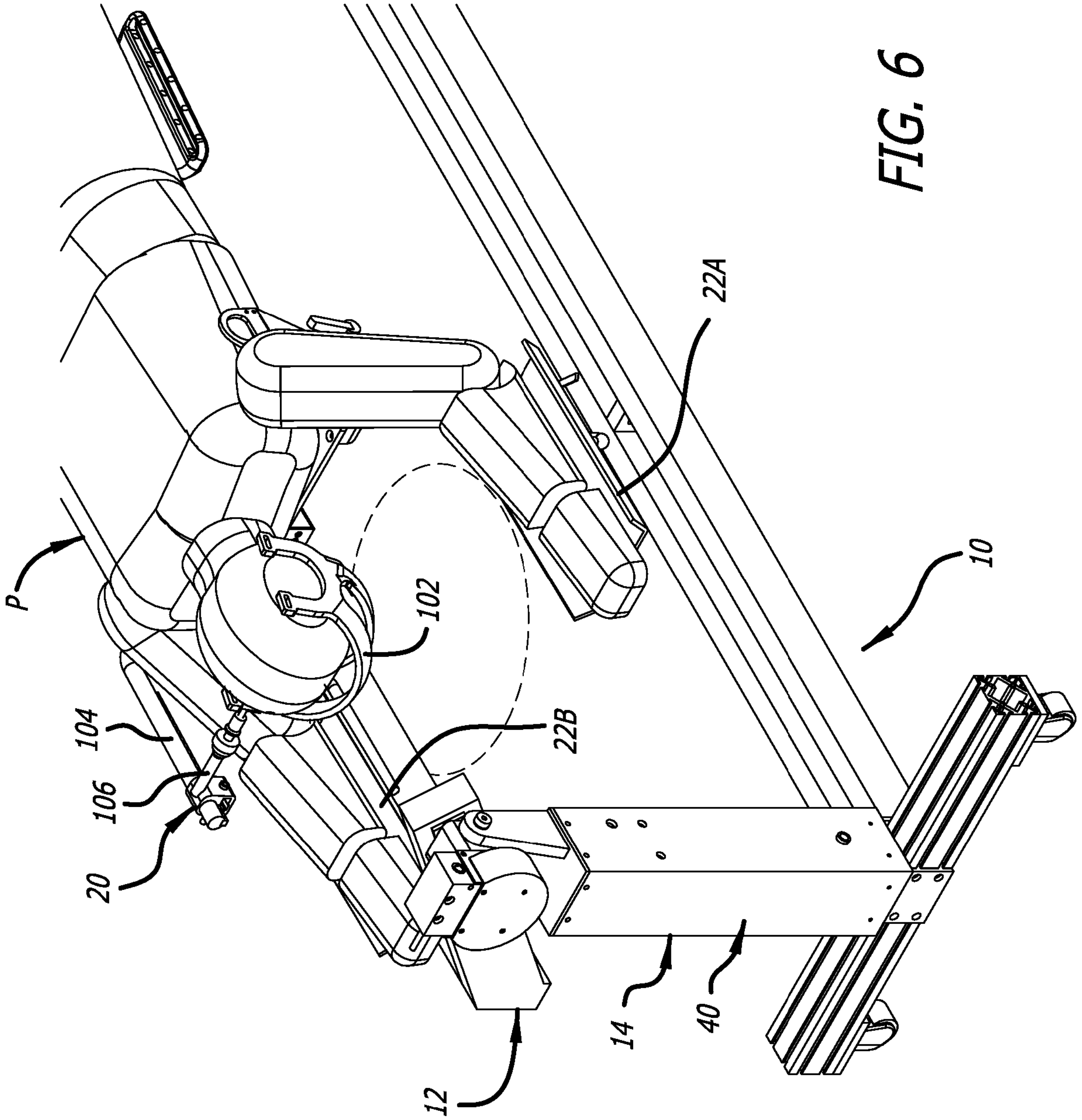
FIG. 6 is a top perspective view that illustrates portions of the surgical frame of FIG. 1 showing an area of access to the head of the patient positioned thereon in a prone position.

As depicted in FIG. 5, for example, the head support 20 is attached to a chest support plate 100 of the torso-lift support 24 to support the head of the patient P. If the torso-lift support 24 is not used, the head support 20 can be directly attached to the forward portion 72 of the offset main beam 12. As depicted in FIGS. 4 and 6, for example, the head support 20 further includes a facial support cradle 102, an axially adjustable head support beam 104, and a temple support portion 106. Soft straps (not shown) can be used to secure the patient P to the head support 20. The facial support cradle 102 includes padding across the forehead and cheeks, and provides open access to the mouth of the patient P. The head support 20 also allows for imaging access to the cervical spine. Adjustment of the head support 20 is possible via adjusting the angle and the length of the head support beam 104 and the temple support portion 106.

As depicted in FIG. 5, for example, the arm supports 22A and 22B contact the forearms and support the remainder of the arms of the patient P, with the first arm support 22A and the second arm support 22B attached to the chest support plate 100 of the torso-lift support 24. If the torso-lift support 24 is not used, the arm supports 22A and 22B can both be directly attached to the offset main beam 12. The arm supports 22A and 22B are positioned such that the arms of the patient P are spaced away from the remainder of the patient's body to provide access (FIG. 6) to at least portions of the face and neck of the patient P, thereby providing greater access to the patient.

Figure 7:
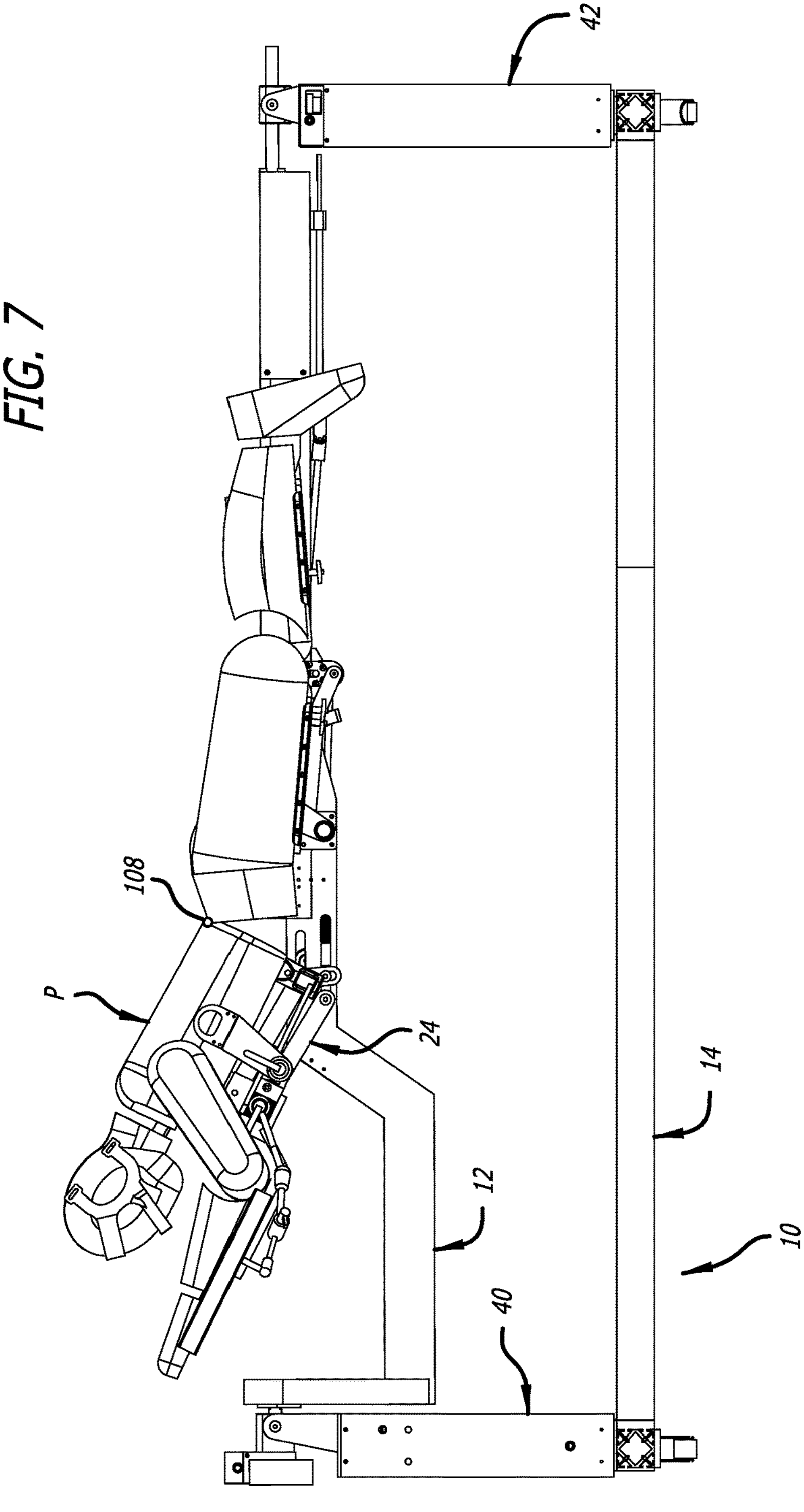
FIG. 7 is a side elevational view that illustrates the surgical frame of FIG. 1 showing a torso-lift support supporting the patient in a lifted position.
Figure 8:
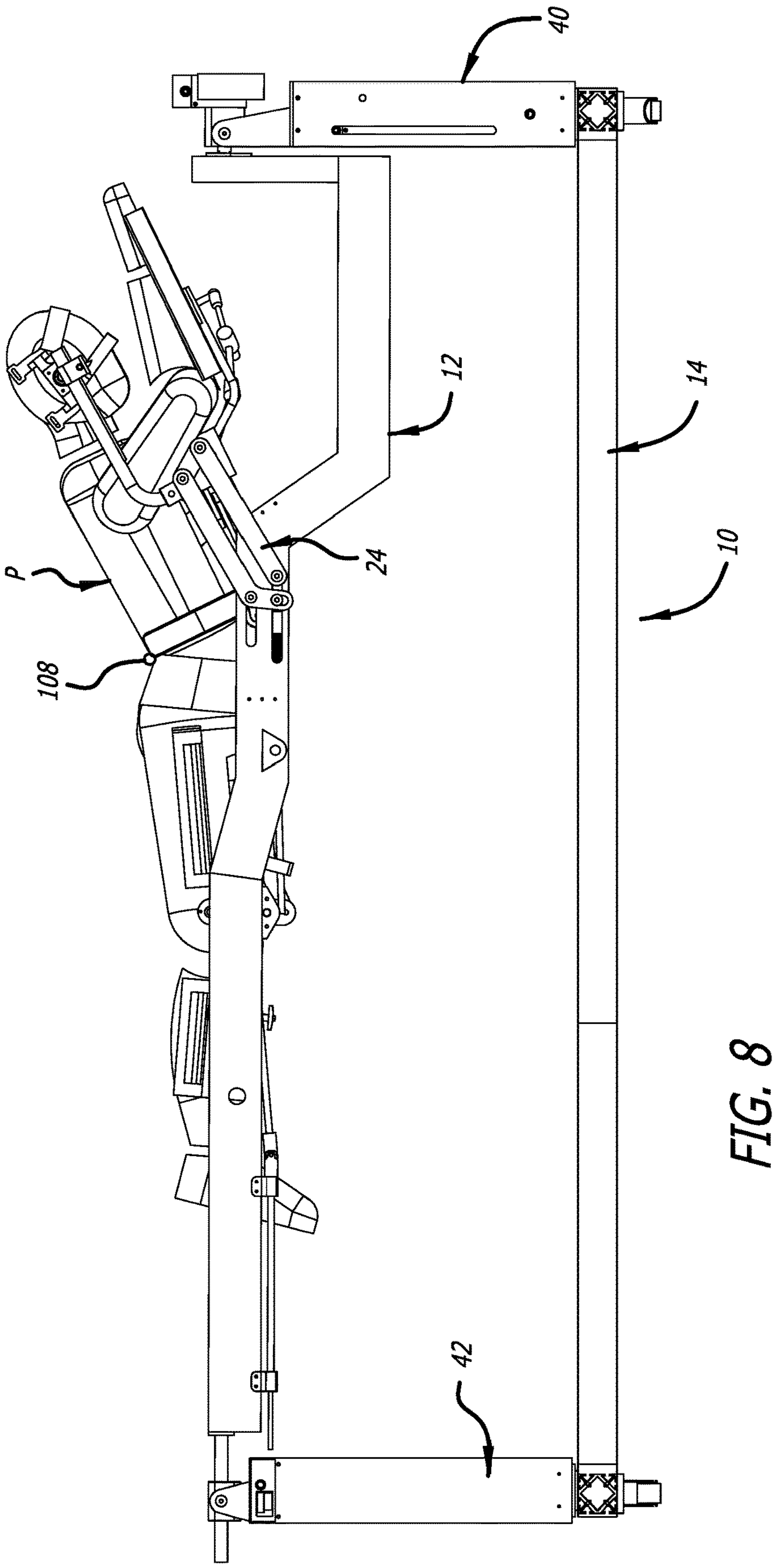
FIG. 8 is another side elevational view that illustrates the surgical frame of FIG. 1 showing the torso-lift support supporting the patient in the lifted position.
Figure 9:
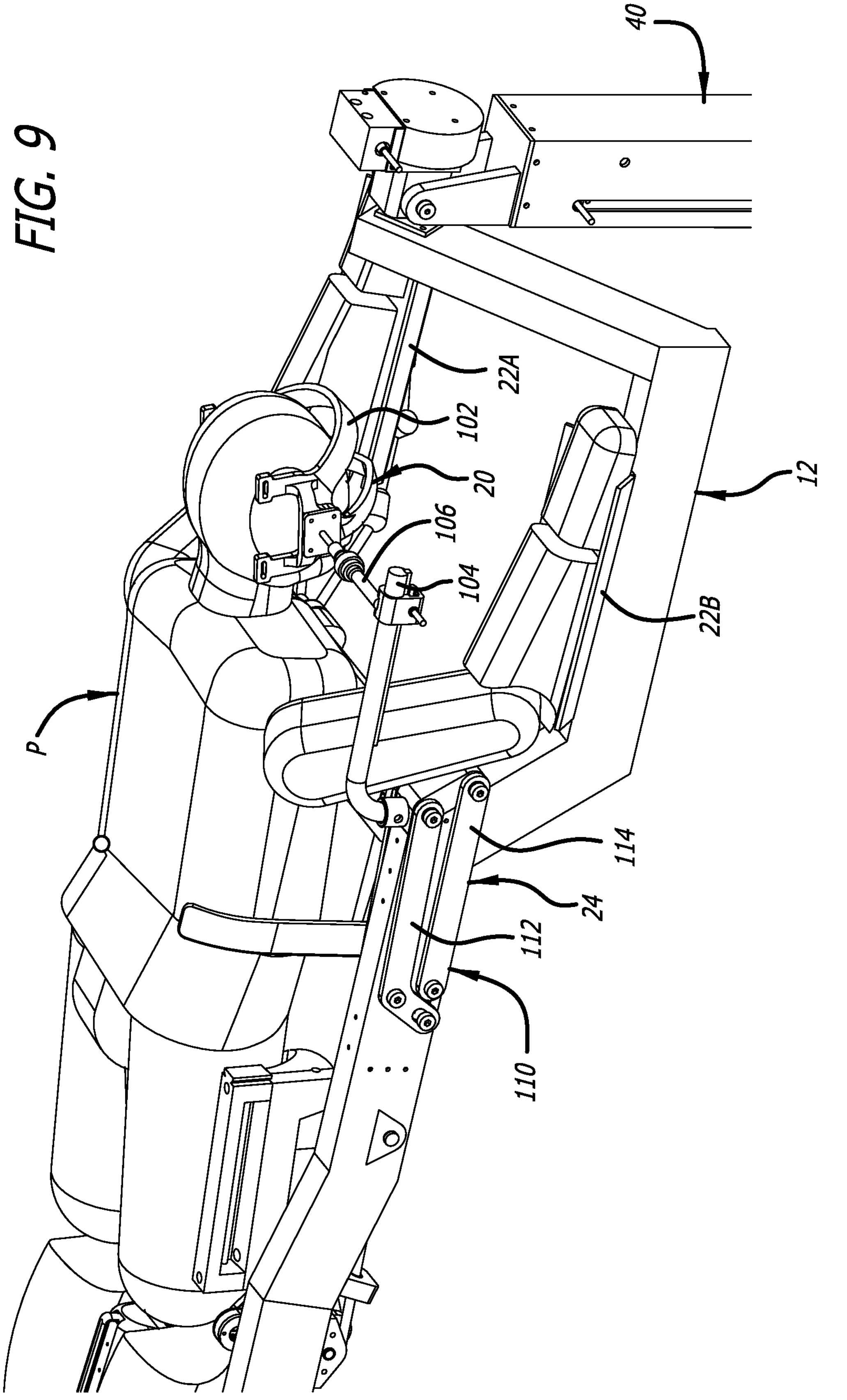
FIG. 9 is an enlarged top perspective view that illustrates portions of the surgical frame of FIG. 1 showing the torso-lift support supporting the patient in an unlifted position.

As depicted in FIGS. 7-12, for example, the surgical frame 10 includes a torso-lift capability for lifting and lowering the torso of the patient P between an uplifted position and a lifted position, which is described in detail below with respect to the torso-lift support 24. As depicted in FIGS. 7 and 8, for example, the torso-lift capability has an approximate center of rotation ("COR") 108 that is located at a position anterior to the patient's spine about the L2 of the lumbar spine, and is capable of elevating the upper body of the patient at least an additional six inches when measured at the chest support plate 100.

As depicted in FIGS. 9-12, for example, the torso-lift support 24 includes a "crawling" four-bar mechanism 110 attached to the chest support plate 100. Soft straps (not shown) can be used to secure the patient P to the chest support plate 100. The head support 20 and the arm supports 22A and 22B are attached to the chest support plate 100, thereby moving with the chest support plate 100 as the chest support plate 100 is articulated using the torso-lift support 24. The fixed COR 108 is defined at the position depicted in FIGS. 7 and 8. Appropriate placement of the COR 108 is important so that spinal cord integrity is not compromised (i.e., overly compressed or stretched) during the lift maneuver performed by the torso-lift support 24.

Figure 10:
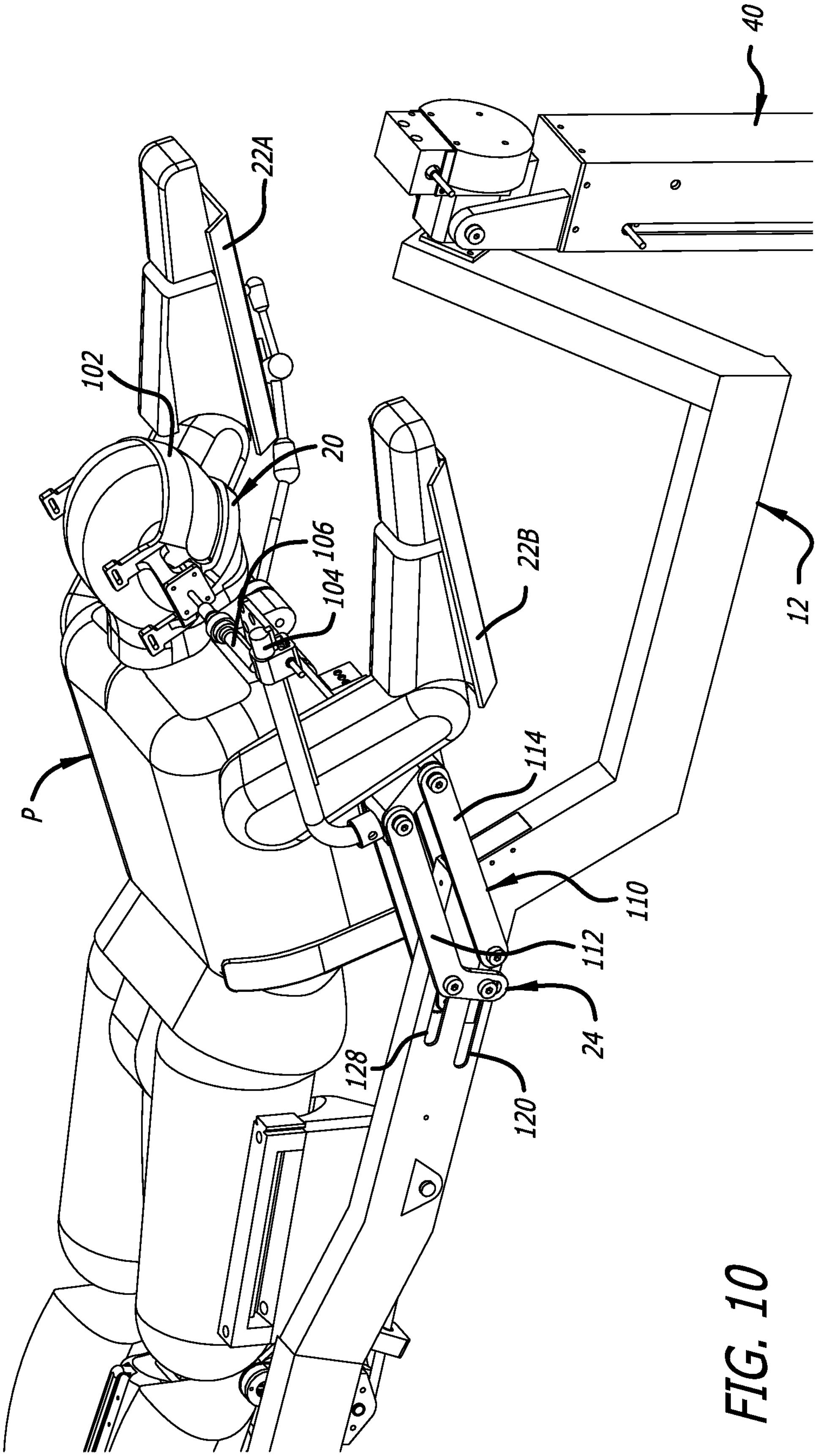
FIG. 10 is an enlarged top perspective view that illustrates portions of the surgical frame of FIG. 1 showing the torso-lift support supporting the patient in the lifted position.
Figure 11:
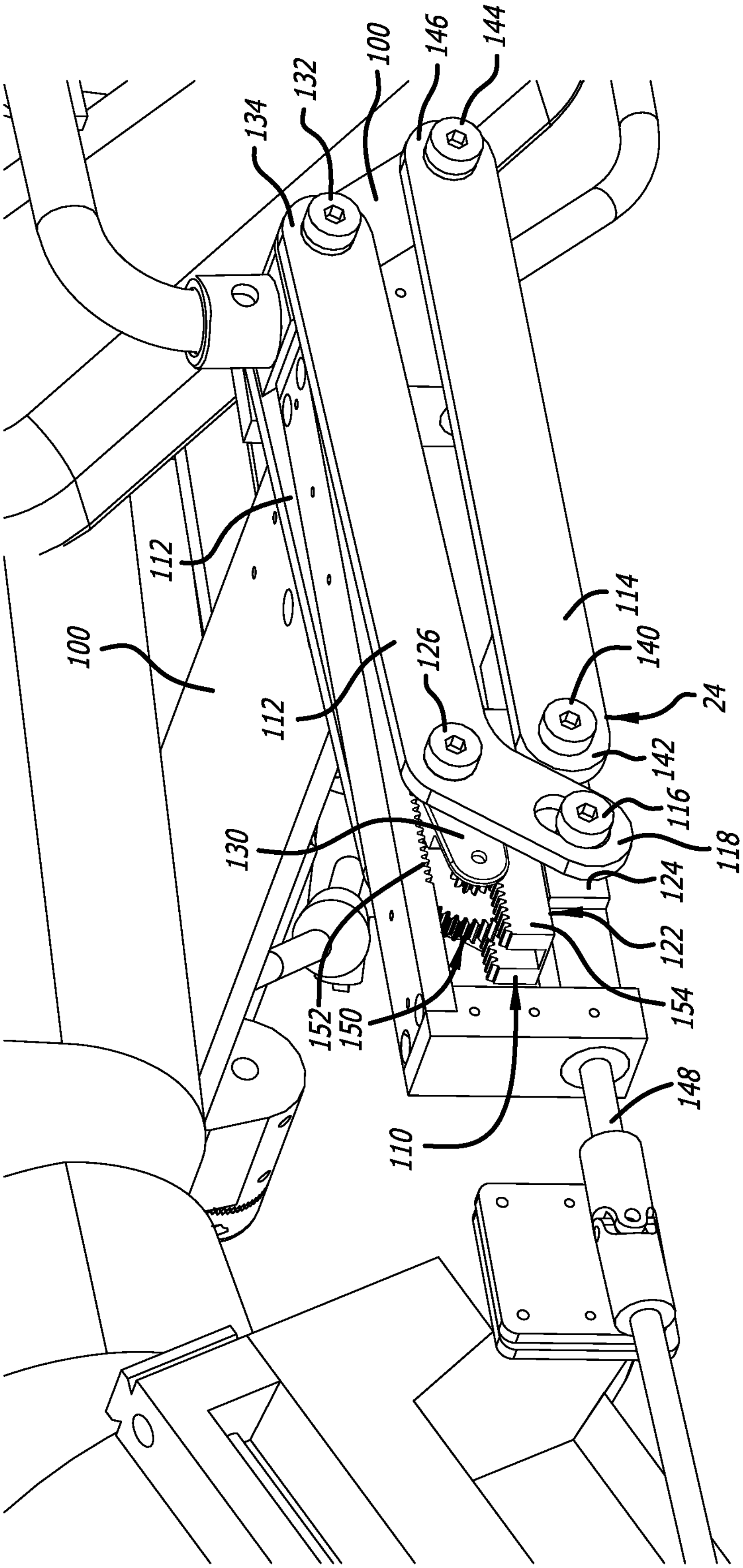
FIG. 11 is an enlarged top perspective view that illustrates componentry of the torso-lift support in the unlifted position.
Figure 12:
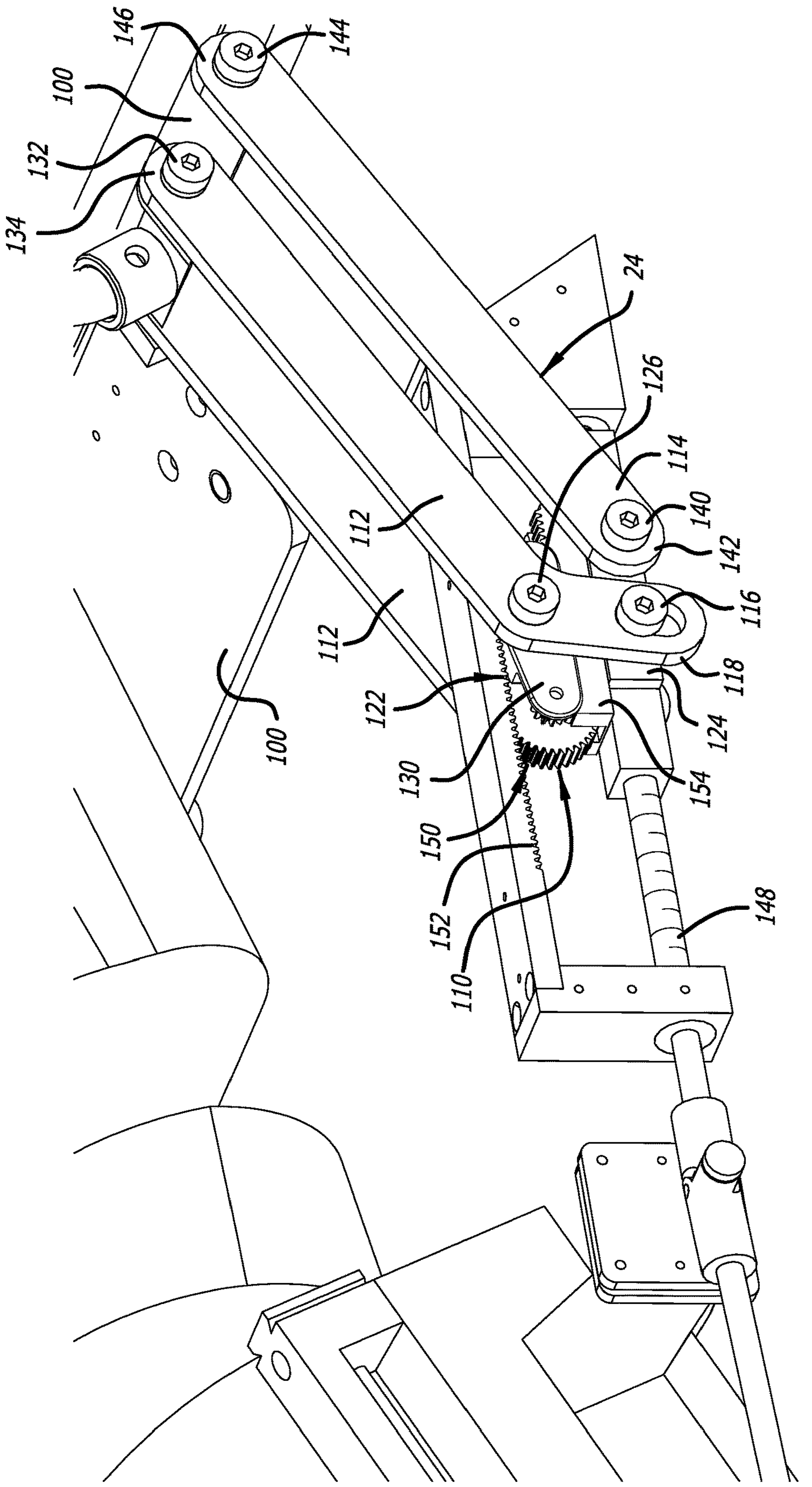
FIG. 12 is an enlarged top perspective view that illustrates the componentry of the torso-lift support in the lifted position.

As depicted in FIGS. 10-12, for example, the four-bar mechanism 110 includes first links 112 pivotally connected between offset main beam 12 and the chest support plate 100, and second links 114 pivotally connected between the offset main beam 12 and the chest support plate 100. As depicted in FIGS. 11 and 12, for example, in order to maintain the COR 108 at the desired fixed position, the first and second links 112 and 114 of the four-bar mechanism 110 crawl toward the first support portion 40 of the support structure 14, when the patient's upper body is being lifted. The first and second links 112 and 114 are arranged such that neither the surgeon's workspace nor imaging access are compromised while the patient's torso is being lifted.

As depicted in FIGS. 11 and 12, for example, each of the first links 112 define an L-shape, and includes a first pin 116 at a first end 118 thereof. The first pin 116 extends through first elongated slots 120 defined in the offset main beam 12, and the first pin 116 connects the first links 112 to a dual rack and pinion mechanism 122 via a drive nut 124 provided within the offset main beam 12, thus defining a lower pivot point thereof. Each of the first links 112 also includes a second pin 126 positioned proximate the corner of the L-shape. The second pin 126 extends through second elongated slots 128 defined in the offset main beam 12, and is linked to a carriage 130 of rack and pinion mechanism 122. Each of the first links 112 also includes a third pin 132 at a second end 134 that is pivotally attached to chest support plate 100, thus defining an upper pivot point thereof.

As depicted in FIGS. 11 and 12, for example, each of the second links 114 includes a first pin 140 at a first end 142 thereof. The first pin 140 extends through the first elongated slot 120 defined in the offset main beam 12, and the first pin 140 connects the second links 114 to the drive nut 124 of the rack and pinion mechanism 122, thus defining a lower pivot point thereof. Each of the second links 114 also includes a second pin 144 at a second end 146 that is pivotally connected to the chest support plate 100, thus defining an upper pivot point thereof.

As depicted in FIGS. 11 and 12, the rack and pinion mechanism 122 includes a drive screw 148 engaging the drive nut 124. Coupled gears 150 are attached to the carriage 130. The larger of the gears 150 engage an upper rack 152 (fixed within the offset main beam 12), and the smaller of the gears 150 engage a lower rack 154. The carriage 130 is defined as a gear assembly that floats between the two racks 152 and 154.

As depicted in FIGS. 11 and 12, the rack and pinion mechanism 122 converts rotation of the drive screw 148 into linear translation of the first and second links 112 and 114 in the first and second elongated slots 120 and 128 toward the first portion 40 of the support structure 14. As the drive nut 124 translates along drive screw 148 (via rotation of the drive screw 148), the carriage 130 translates towards the first portion 40 with less travel due to the different gear sizes of the coupled gears 150. The difference in travel, influenced by different gear ratios, causes the first links 112 pivotally attached thereto to lift the chest support plate 100. Lowering of the chest support plate 100 is accomplished by performing this operation in reverse. The second links 114 are "idler" links (attached to the drive nut 124 and the chest support plate 100) that controls the tilt of the chest support plate 100 as it is being lifted and lowered. All components associated with lifting while tilting the chest plate predetermine where COR 108 resides. Furthermore, a servomotor (not shown) interconnected with the drive screw 148 can be computer controlled and/or operated by the operator of the surgical frame 10 to facilitate controlled lifting and lowering of the chest support plate 100. A safety feature can be provided, enabling the operator to read and limit a lifting and lowering force applied by the torso-lift support 24 in order to prevent injury to the patient P. Moreover, the torso-lift support 24 can also include safety stops (not shown) to prevent over-extension or compression of the patient P, and sensors (not shown) programmed to send patient position feedback to the safety stops.

Figure 13A:
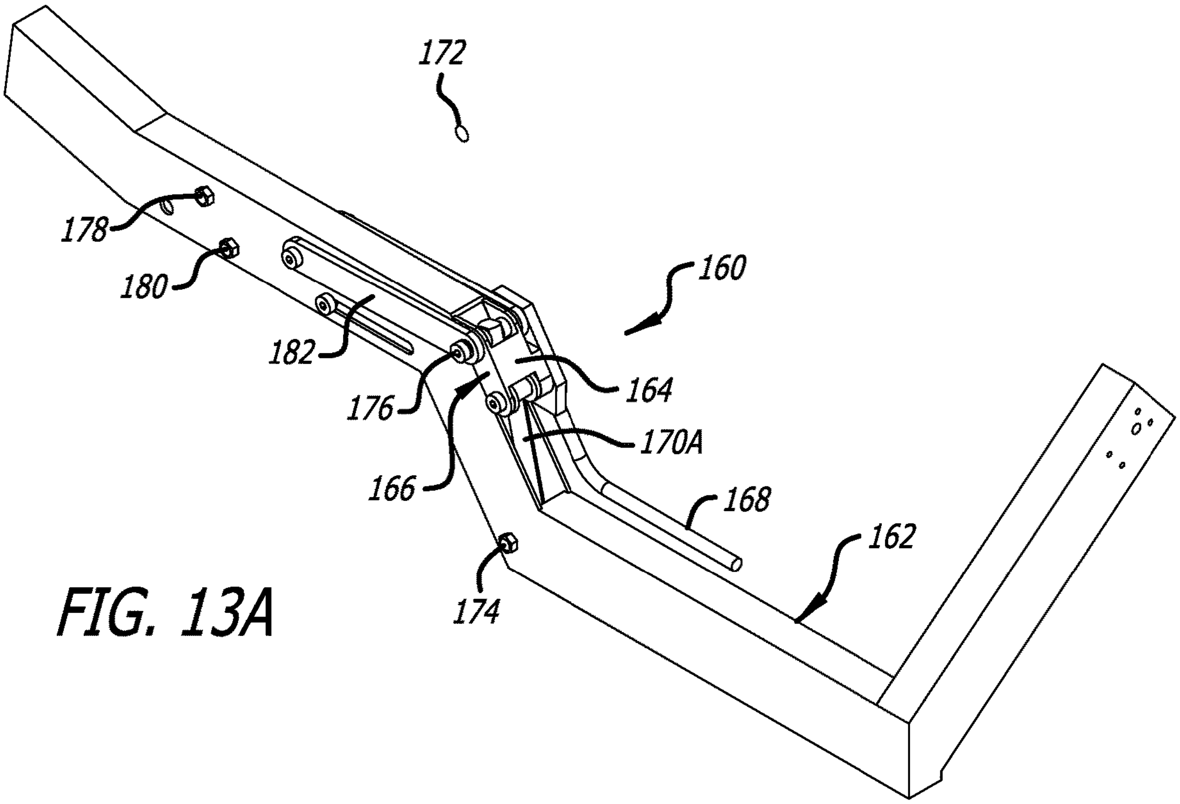
FIG. 13A is a perspective view of an embodiment that illustrates a structural offset main beam for use with another embodiment of a torso-lift support showing the torso-lift support in a retracted position.

An alternative preferred embodiment of a torso-lift support is generally indicated by the numeral 160 in FIGS. 13A-15. As depicted in FIGS. 13A-13C, an alternate offset main beam 162 is utilized with the torso-lift support 160. Furthermore, the torso-lift support 160 has a support plate 164 pivotally linked to the offset main beam 162 by a chest support lift mechanism 166. An arm support rod/plate 168 is connected to the support plate 164, and the second arm support 22B. The support plate 164 is attached to the chest support plate 100, and the chest support lift mechanism 166 includes various actuators 170A, 170B, and 170C used to facilitate positioning and repositioning of the support plate 164 (and hence, the chest support plate 100).

Figure 13B:
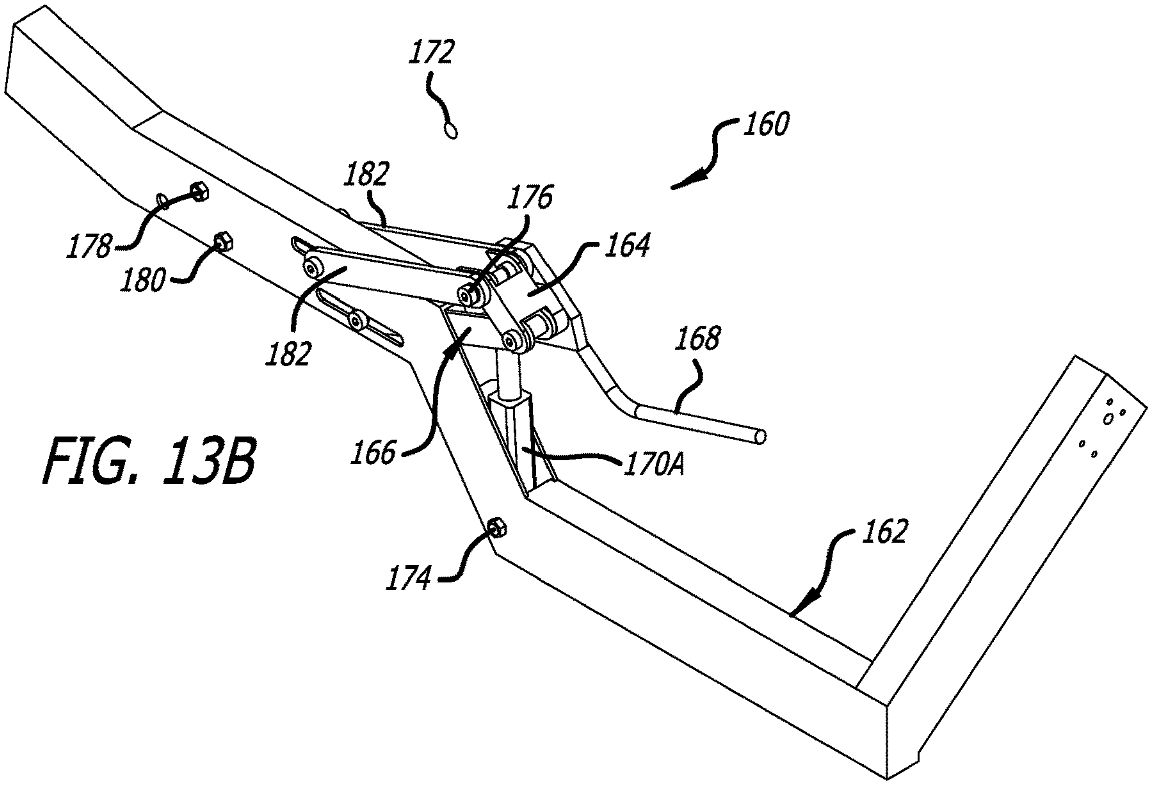
FIG. 13B is a perspective view similar to FIG. 13A showing the torso-lift support at half travel.
Figure 13C:
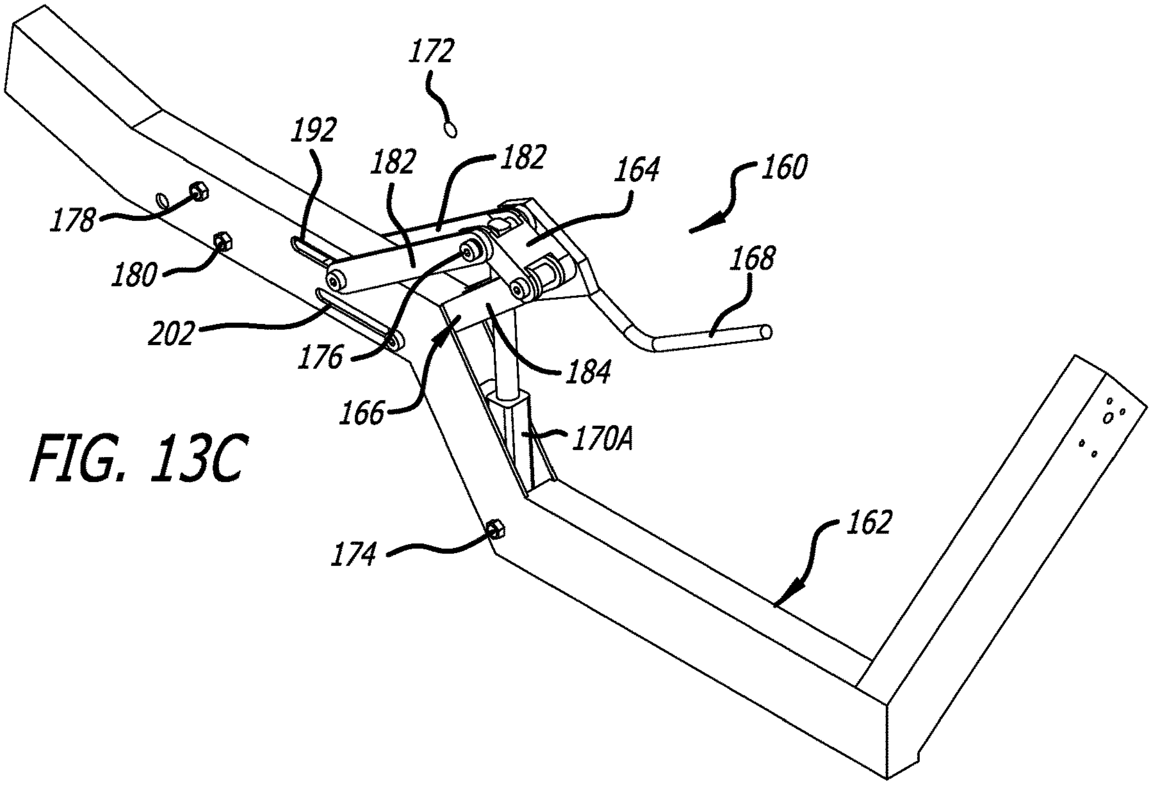
FIG. 13C is a perspective view similar to FIGS. 13A and 13B showing the torso-lift support at full travel.

As discussed below, the torso-lift support 160 depicted in FIGS. 13A-15 enables a COR 172 thereof to be programmably altered such that the COR 172 can be a fixed COR or a variable COR. As their names suggest, the fixed COR stays in the same position as the torso-lift support 160 is actuated, and the variable COR moves between a first position and a second position as the torso-lift support 160 is actuated between its initial position and final position at full travel thereof. Appropriate placement of the COR 172 is important so that spinal cord integrity is not compromised (i.e., overly compressed or stretched). Thus, the support plate 164 (and hence, the chest support plate 100) follows a path coinciding with a predetermined COR 172 (either fixed or variable). FIG. 13A depicts the torso-lift support 160 retracted, FIG. 13B depicts the torso-lift support 160 at half travel, and FIG. 13C depicts the torso-lift support 160 at full travel.

Figure 14:
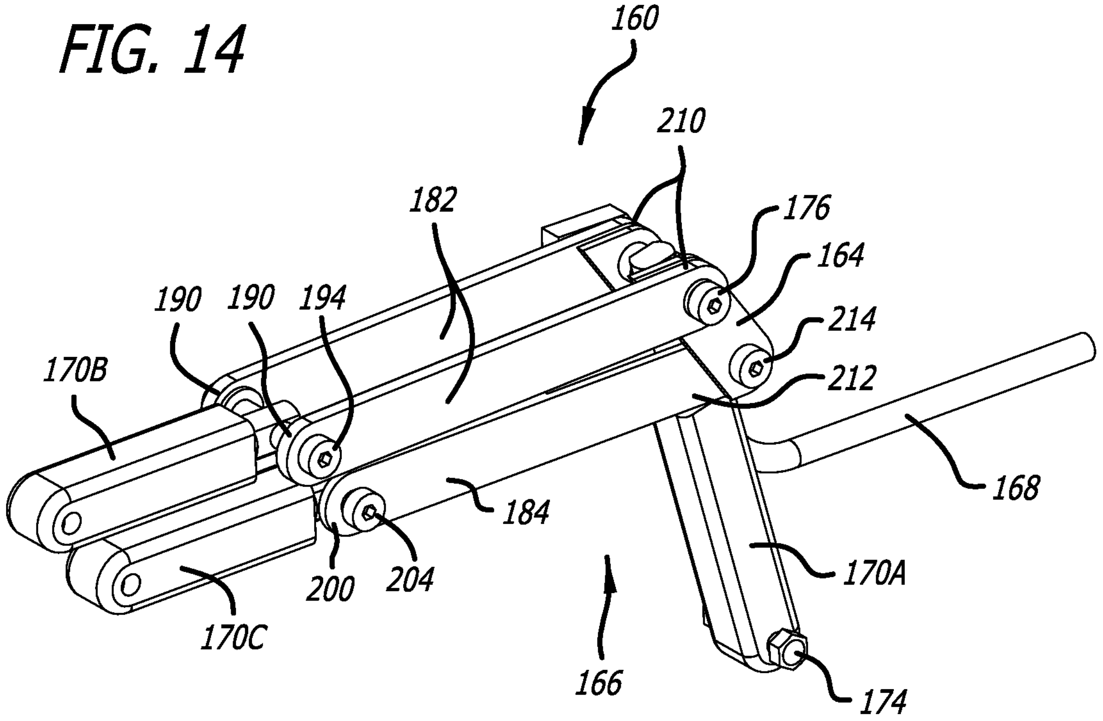
FIG. 14 is a perspective view that illustrates a chest support lift mechanism of the torso-lift support of FIGS. 13A-13C with actuators thereof retracted.
Figure 15:
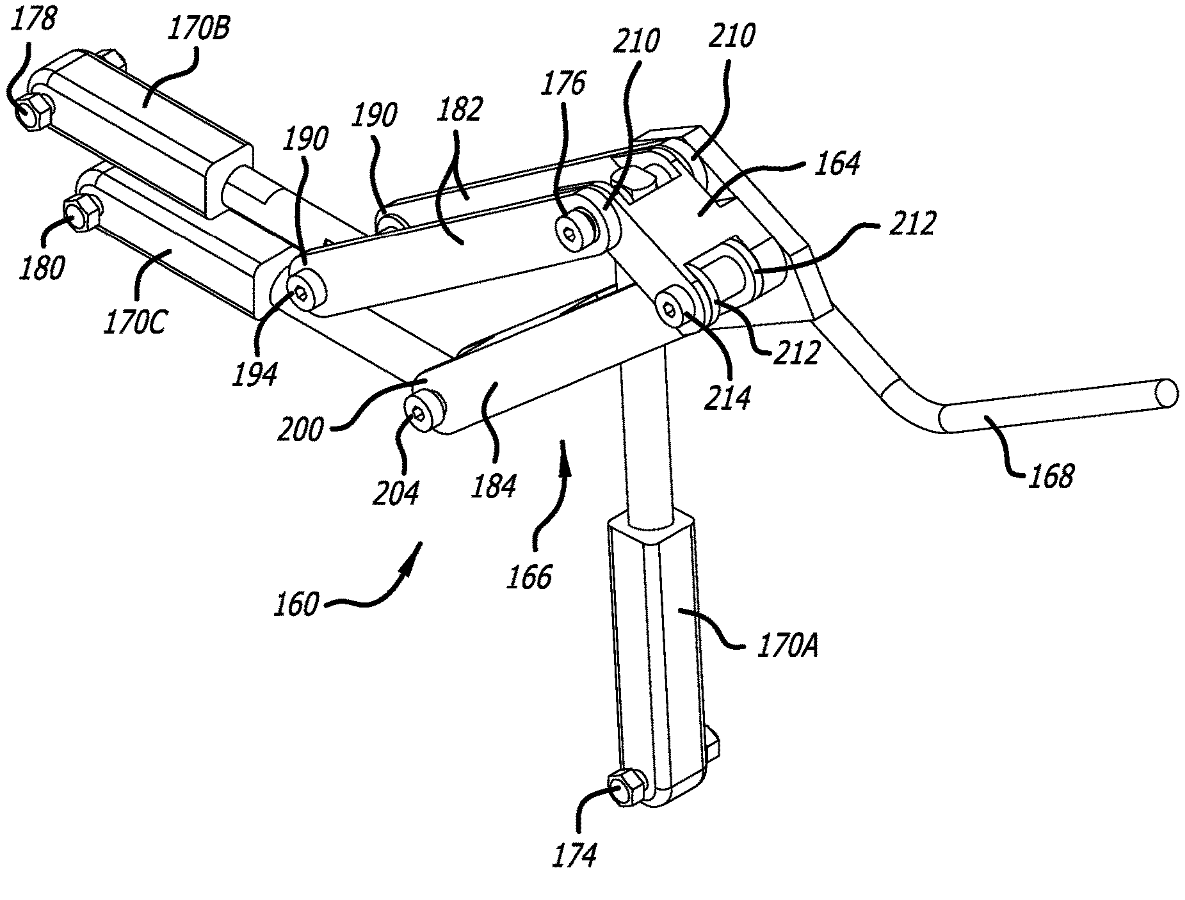
FIG. 15 is another perspective view that illustrates a chest support lift mechanism of the torso-lift support of FIGS. 13A-13C with the actuators thereof extended.

As discussed above, the chest support lift mechanism 166 includes the actuators 170A, 170B, and 170C to position and reposition the support plate 164 (and hence, the chest support plate 100). As depicted in FIGS. 14 and 15, for example, the first actuator 170A, the second actuator 170B, and the third actuator 170C are provided. Each of the actuators 170A, 170B, and 170C are interconnected with the offset main beam 12 and the support plate 164, and each of the actuators 170A, 170B, and 170C are moveable between a retracted and extended position. As depicted in FIGS. 13A-13C, the first actuator 170A is pinned to the offset main beam 162 using a pin 174 and pinned to the support plate 164 using a pin 176. Furthermore, the second and third actuators 170B and 170C are received within the offset main beam 162. The second actuator 170B is interconnected with the offset main beam 162 using a pin 178, and the third actuator 170C is interconnected with the offset main beam 162 using a pin 180.

The second actuator 170B is interconnected with the support plate 164 via first links 182, and the third actuator 170C is interconnected with the support plate 164 via second links 184. First ends 190 of the first links 182 are pinned to the second actuator 170B and elongated slots 192 formed in the offset main beam 162 using a pin 194, and first ends 200 of the second links 184 are pinned to the third actuator 170C and elongated slots 202 formed in the offset main beam 162 using a pin 204. The pins 194 and 204 are moveable within the elongated slots 192 and 202. Furthermore, second ends 210 of the first links 182 are pinned to the support plate 164 using the pin 176, and second ends 212 of the second links 184 are pinned to the support plate 164 using a pin 214. To limit interference therebetween, as depicted in FIGS. 13A-13C, the first links 182 are provided on the exterior of the offset main beam 162, and, depending on the position thereof, the second links 184 are positioned on the interior of the offset main beam 162.

Actuation of the actuators 170A, 170B, and 170C facilitates movement of the support plate 164. Furthermore, the amount of actuation of the actuators 170A, 170B, and 170C can be varied to affect different positions of the support plate 164. As such, by varying the amount of actuation of the actuators 170A, 1706, and 170C, the COR 172 thereof can be controlled. As discussed above, the COR 172 can be predetermined, and can be either fixed or varied. Furthermore, the actuation of the actuators 170A, 170B, and 170C can be computer controlled and/or operated by the operator of the surgical frame 10, such that the COR 172 can be programmed by the operator. As such, an algorithm can be used to determine the rates of extension of the actuators 170A, 1706, and 170C to control the COR 172, and the computer controls can handle implementation of the algorithm to provide the predetermined COR. A safety feature can be provided, enabling the operator to read and limit a lifting force applied by the actuators 170A, 170B, and 170C in order to prevent injury to the patient P. Moreover, the torso-lift support 160 can also include safety stops (not shown) to prevent over-extension or compression of the patient P, and sensors (not shown) programmed to send patient position feedback to the safety stops.

FIGS. 16-23 depict portions of the sagittal adjustment assembly 28. The sagittal adjustment assembly 28 can be used to distract or compress the patient's lumbar spine during or after lifting or lowering of the patient's torso by the torso-lift supports. The sagittal adjustment assembly 28 supports and manipulates the lower portion of the patient's body. In doing so, the sagittal adjustment assembly 28 is configured to make adjustments in the sagittal plane of the patient's body, including tilting the pelvis, controlling the position of the upper and lower legs, and lordosing the lumbar spine.

Figure 16:
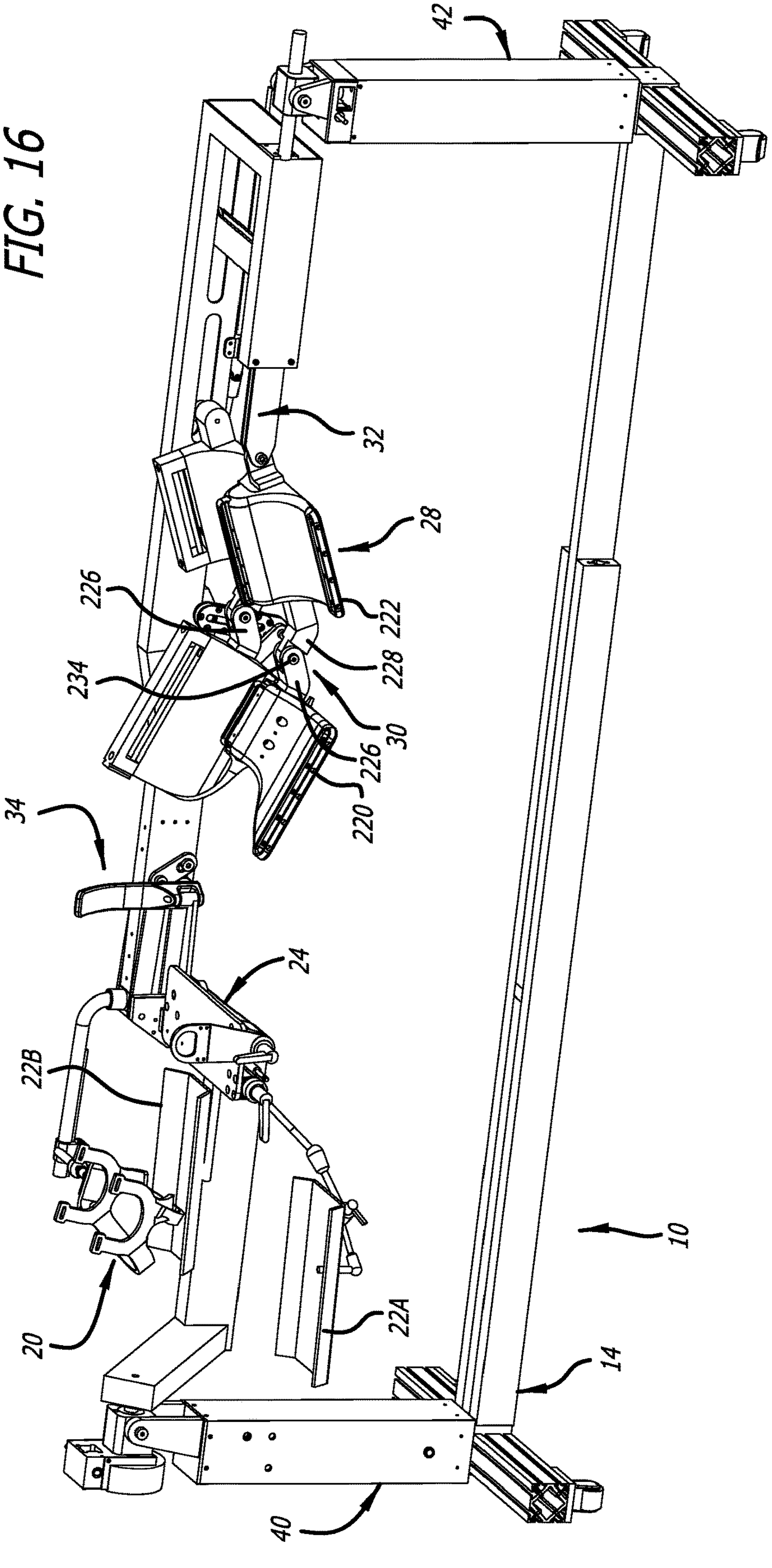
FIG. 16 is a top perspective view that illustrates the surgical frame of FIG. 1.
Figure 17:
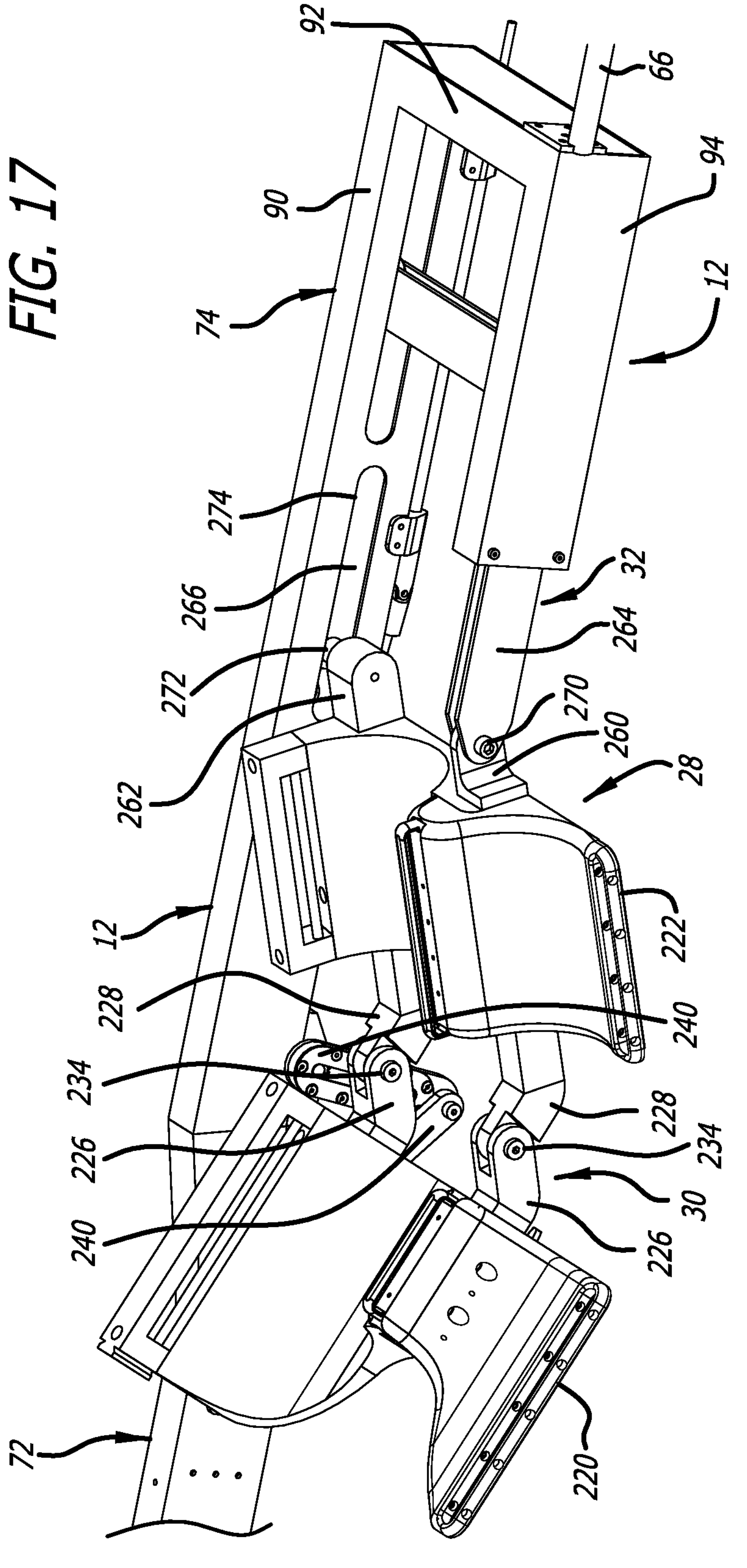
FIG. 17 is an enlarged top perspective view that illustrates portions of the surgical frame of FIG. 1 showing a sagittal adjustment assembly including a pelvic-tilt mechanism and leg adjustment mechanism.

As depicted in FIGS. 16 and 17, for example, the sagittal adjustment assembly 28 includes the pelvic-tilt mechanism 30 for supporting the thighs and lower legs of the patient P. The pelvic-tilt mechanism 30 includes a thigh cradle 220 configured to support the patient's thighs, and a lower leg cradle 222 configured to support the patient's shins. Different sizes of thigh and lower leg cradles can be used to accommodate different sizes of patients, i.e., smaller thigh and lower leg cradles can be used with smaller patients, and larger thigh and lower leg cradles can be used with larger patients. Soft straps (not shown) can be used to secure the patient P to the thigh cradle 220 and the lower leg cradle 222. The thigh cradle 220 and the lower leg cradle 222 are moveable and pivotal with respect to one another and to the offset main beam 12. To facilitate rotation of the patient's hips, the thigh cradle 220 and the lower leg cradle 222 can be positioned anterior and inferior to the patient's hips.

Figure 18:
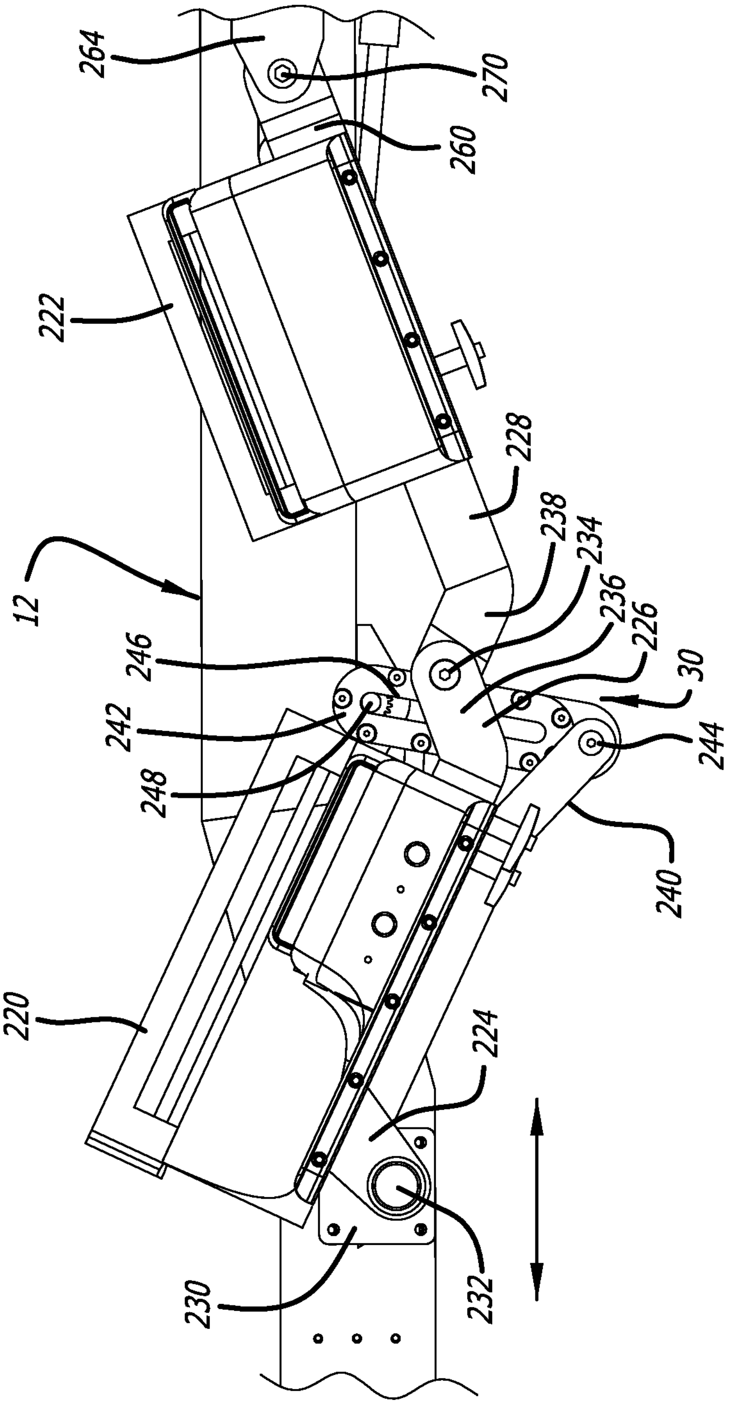
FIG. 18 is an enlarged side elevational view that illustrates portions of the surgical frame of FIG. 1 showing the pelvic-tilt mechanism.
Figure 25:
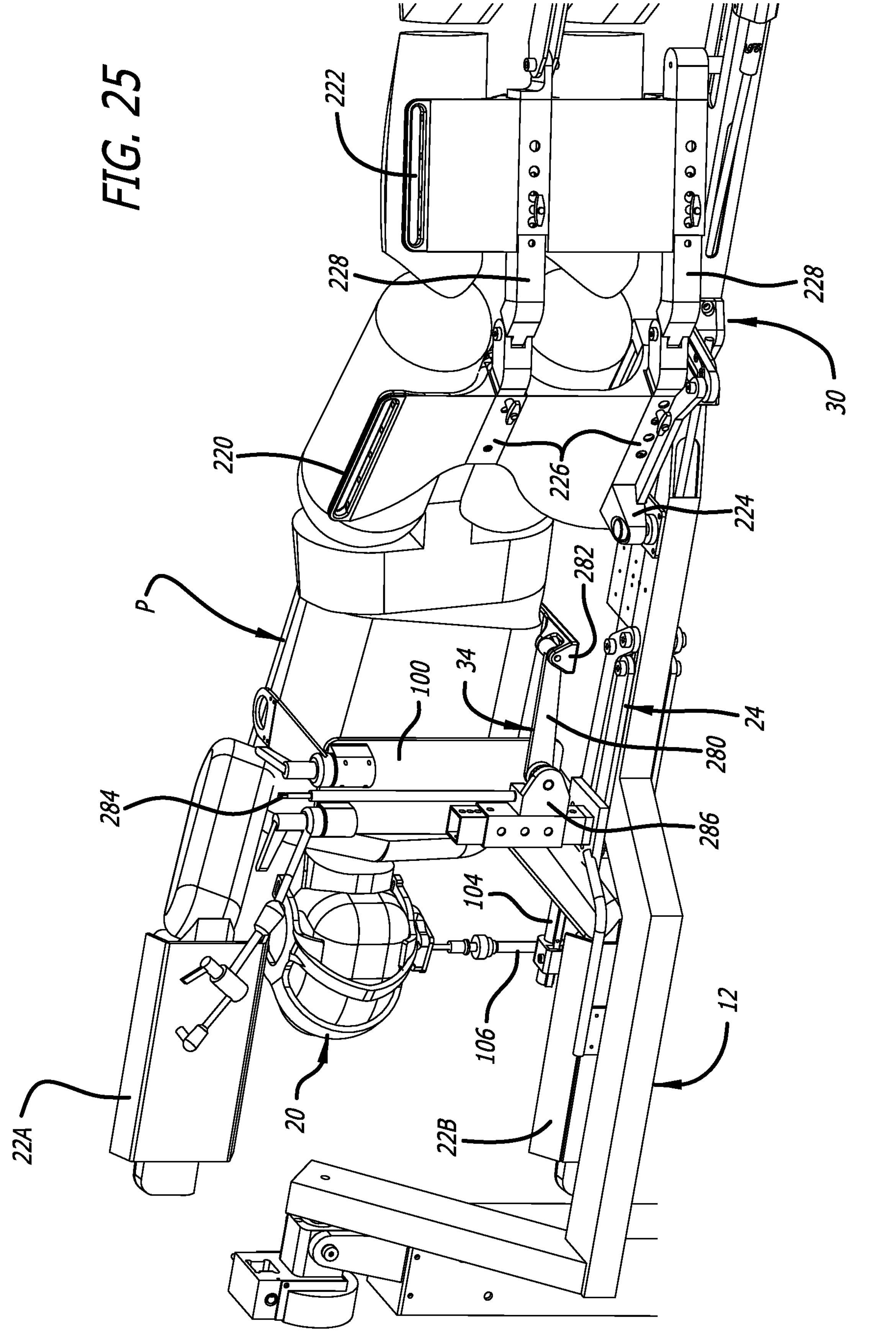
FIG. 25 is a top perspective view that illustrates portions of the surgical frame of FIG. 1 showing operation of the coronal adjustment assembly.

As depicted in FIGS. 18 and 25, for example, a first support strut 224 and second support struts 226 are attached to the thigh cradle 220. Furthermore, third support struts 228 are attached to the lower leg cradle 222. The first support strut 224 is pivotally attached to the offset main beam 12 via a support plate 230 and a pin 232, and the second support struts 226 are pivotally attached to the third support struts 228 via pins 234. The pins 234 extend through angled end portions 236 and 238 of the second and third support struts 226 and 228, respectively. Furthermore, the lengths of second and third support struts 226 and 228 are adjustable to facilitate expansion and contraction of the lengths thereof.

To accommodate patients with different torso lengths, the position of the thigh cradle 220 can be adjustable by moving the support plate 230 along the offset main beam 12. Furthermore, to accommodate patients with different thigh and lower leg lengths, the lengths of the second and third support struts 226 and 228 can be adjusted.

Figure 19:
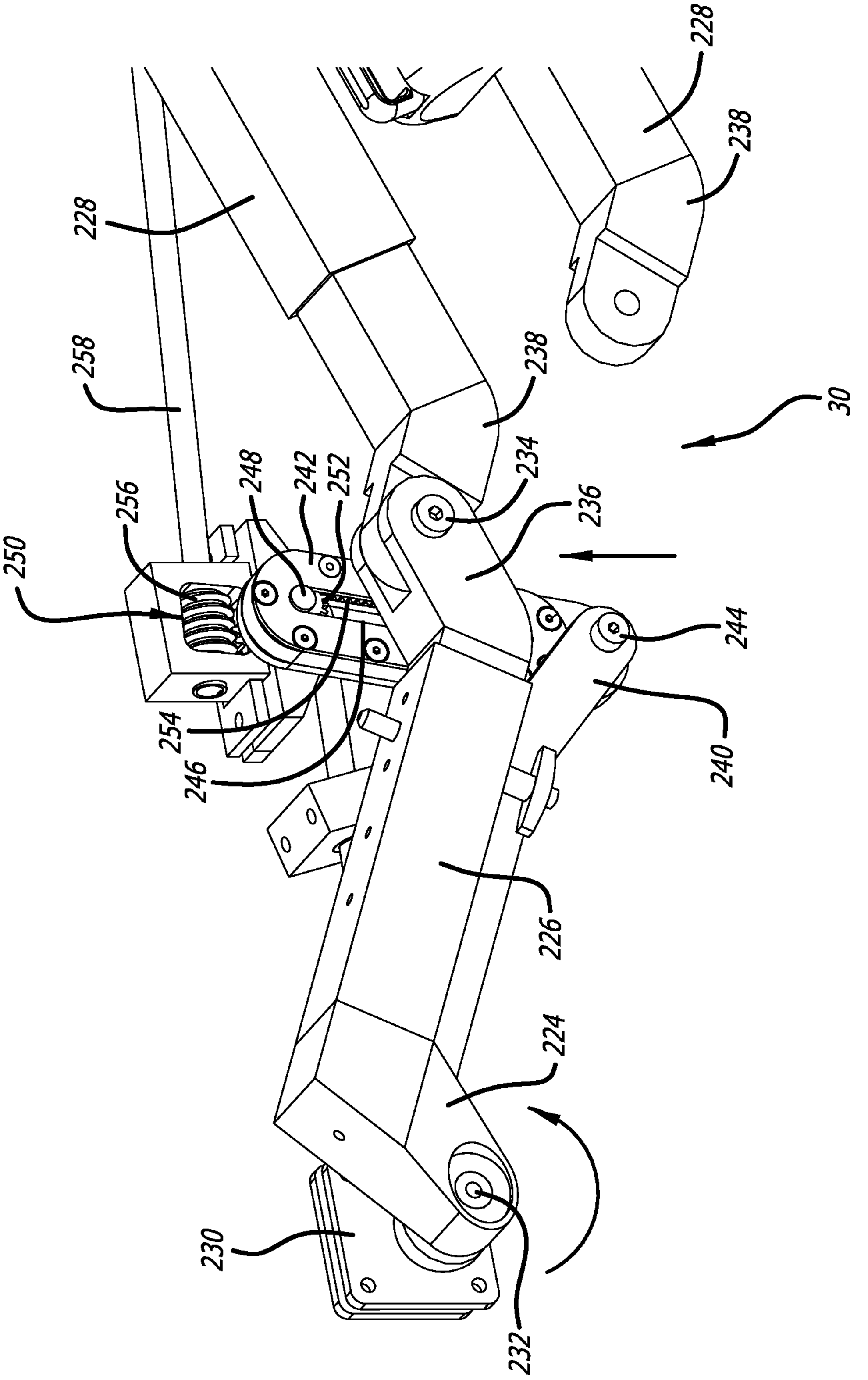
FIG. 19 is an enlarged perspective view that illustrates componentry of the pelvic-tilt mechanism.
Figure 20:
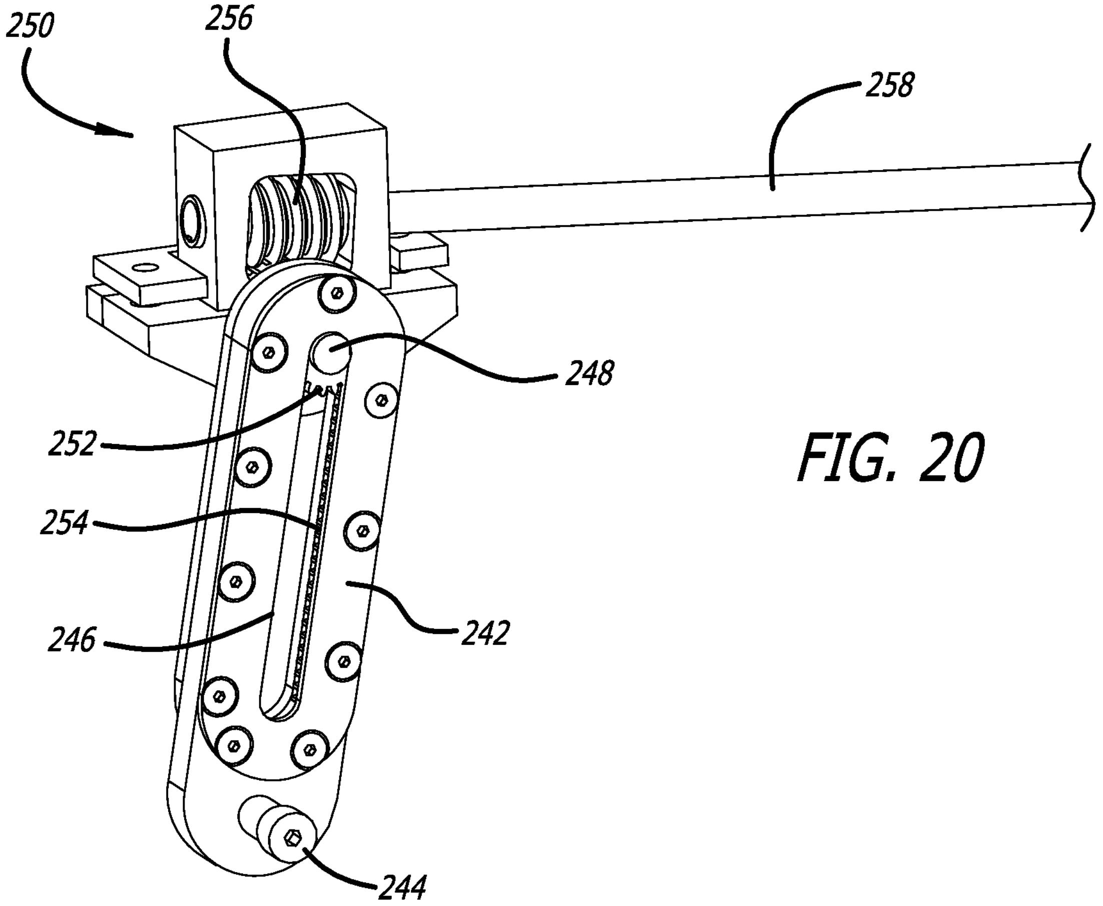
FIG. 20 is an enlarged perspective view that illustrates a captured rack and a worm gear assembly of the componentry of the pelvic-tilt mechanism.
Figure 21:
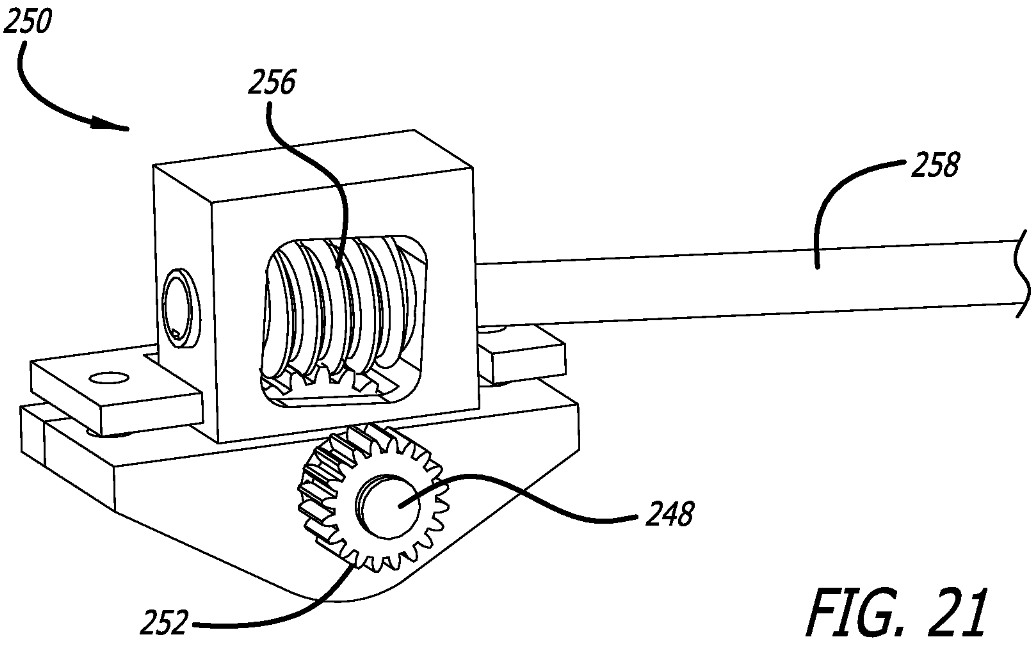
FIG. 21 is an enlarged perspective view that illustrates the worm gear assembly of FIG. 20.

To control the pivotal angle between the second and third support struts 226 and 228 (and hence, the pivotal angle between the thigh cradle 220 and lower leg cradle 222), a link 240 is pivotally connected to a captured rack 242 via a pin 244. The captured rack 242 includes an elongated slot 246, through which is inserted a worm gear shaft 248 of a worm gear assembly 250. The worm gear shaft 248 is attached to a gear 252 provided on the interior of the captured rack 242. The gear 252 contacts teeth 254 provided inside the captured rack 242, and rotation of the gear 252 (via contact with the teeth 254) causes motion of the captured rack 242 upwardly and downwardly. The worm gear assembly 250, as depicted in FIGS. 19-21, for example, includes worm gears 256 which engage a drive shaft 258, and which are connected to the worm gear shaft 248.

The worm gear assembly 250 also is configured to function as a brake, which prevents unintentional movement of the sagittal adjustment assembly 28. Rotation of the drive shaft 258 causes rotation of the worm gears 256, thereby causing reciprocal vertical motion of the captured rack 242. The vertical reciprocal motion of the captured rack 242 causes corresponding motion of the link 240, which in turn pivots the second and third support struts 226 and 228 to correspondingly pivot the thigh cradle 220 and lower leg cradle 222. A servomotor (not shown) interconnected with the drive shaft 258 can be computer controlled and/or operated by the operator of the surgical frame 10 to facilitate controlled reciprocal motion of the captured rack 242.

The sagittal adjustment assembly 28 also includes the leg adjustment mechanism 32 facilitating articulation of the thigh cradle 220 and the lower leg cradle 222 with respect to one another. In doing so, the leg adjustment mechanism 32 accommodates the lengthening and shortening of the patient's legs during bending thereof. As depicted in FIG. 17, for example, the leg adjustment mechanism 32 includes a first bracket 260 and a second bracket 262 attached to the lower leg cradle 222. The first bracket 260 is attached to a first carriage portion 264, and the second bracket 262 is attached to a second carriage portion 266 via pins 270 and 272, respectively. The first carriage portion 264 is slidable within third portion 94 of the rear portion 74 of the offset main beam 12, and the second carriage portion 266 is slidable within the first portion 90 of the rear portion 74 of the offset main beam 12. An elongated slot 274 is provided in the first portion 90 to facilitate engagement of the second bracket 262 and the second carriage portion 266 via the pin 272. As the thigh cradle 220 and the lower leg cradle 222 articulate with respect to one another (and the patient's legs bend accordingly), the first carriage 264 and the second carriage 266 can move accordingly to accommodate such movement.

Figure 22:
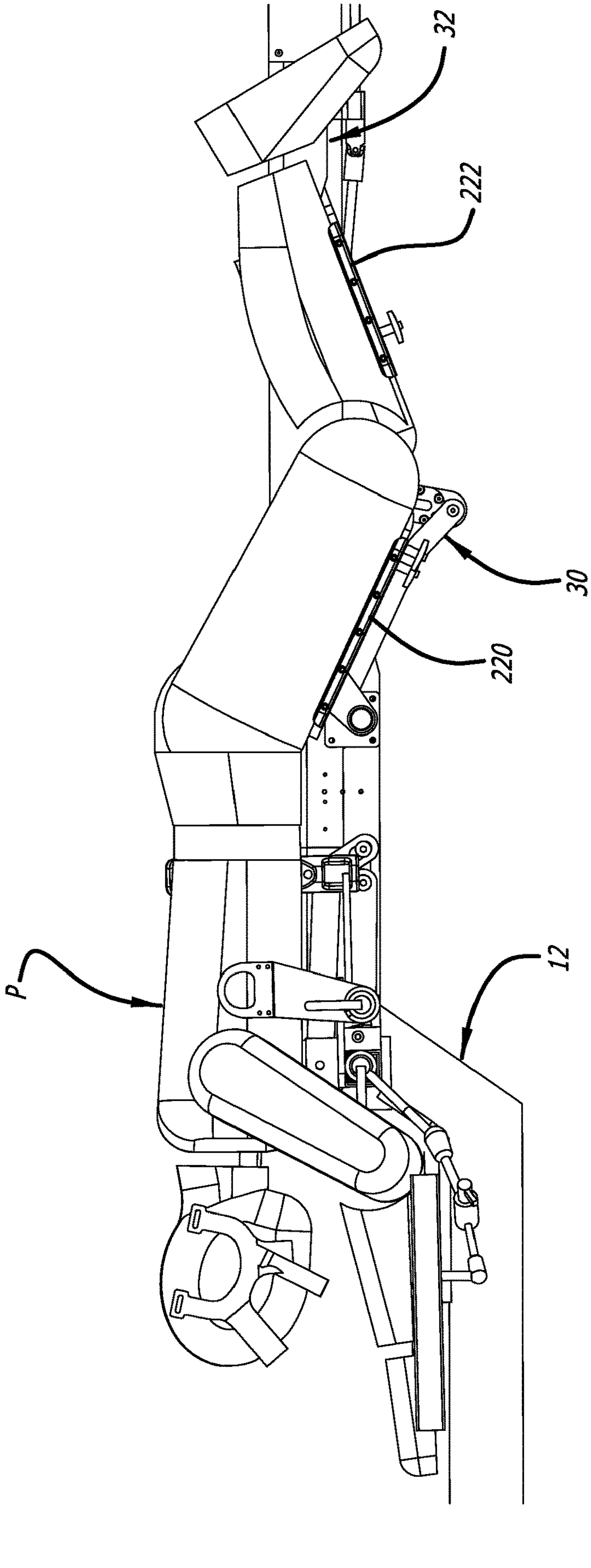
FIG. 22 is a side elevational view that illustrates portions of the surgical frame of FIG. 1 showing the patient positioned thereon and the pelvic-tilt mechanism of the sagittal adjustment assembly in the flexed position.
Figure 23:
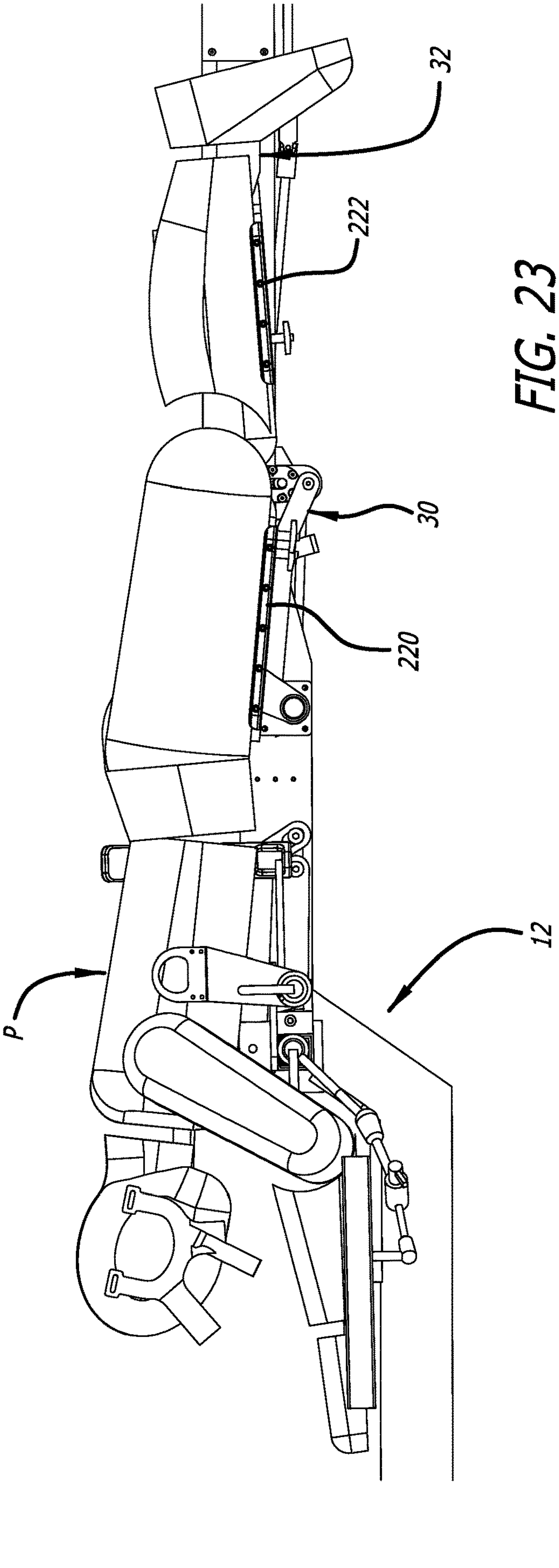
FIG. 23 is another side elevational view that illustrates portions of the surgical frame of FIG. 1 showing the patient positioned thereon and the pelvic-tilt mechanism of the sagittal adjustment assembly in the fully extended position.

The pelvic-tilt mechanism 30 is movable between a flexed position and a fully extended position. As depicted in FIG. 22, in the flexed position, the lumbar spine is hypo-lordosed. This opens the posterior boundaries of the lumbar vertebral bodies and allows for easier placement of any interbody devices. The lumbar spine stretches slightly in this position. As depicted in FIG. 23, in the extended position, the lumbar spine is lordosed. This compresses the lumbar spine. When posterior fixation devices, such as rods and screws, are placed, optimal sagittal alignment can be achieved. During sagittal alignment, little to negligible angle change occurs between the thighs and the pelvis. The pelvic-tilt mechanism 30 also can hyper-extend the hips as a means of lordosing the spine, in addition to tilting the pelvis. One of ordinary skill will recognize, however, that straightening the patient's legs does not lordose the spine. Leg straightening is a consequence of rotating the pelvis while maintaining a fixed angle between the pelvis and the thighs.

The sagittal adjustment assembly 28, having the configuration described above, further includes an ability to compress and distract the spine dynamically while in the lordosed or flexed positions. The sagittal adjustment assembly 28 also includes safety stops (not shown) to prevent over-extension or compression of the patient, and sensors (not shown) programmed to send patient position feedback to the safety stops.

Figure 24:
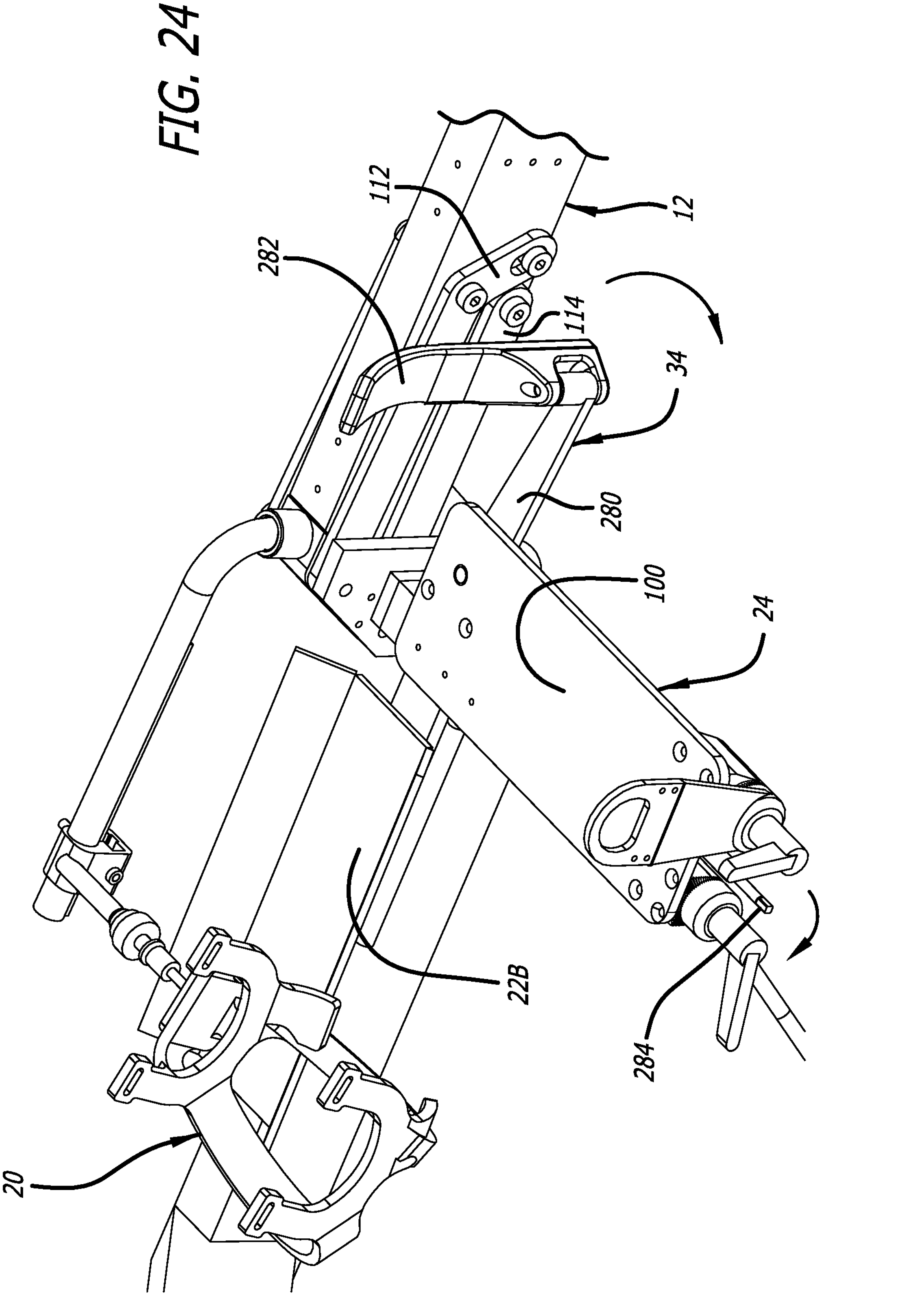
FIG. 24 is an enlarged top perspective view that illustrates portions of the surgical frame of FIG. 1 showing a coronal adjustment assembly.
Figure 26:
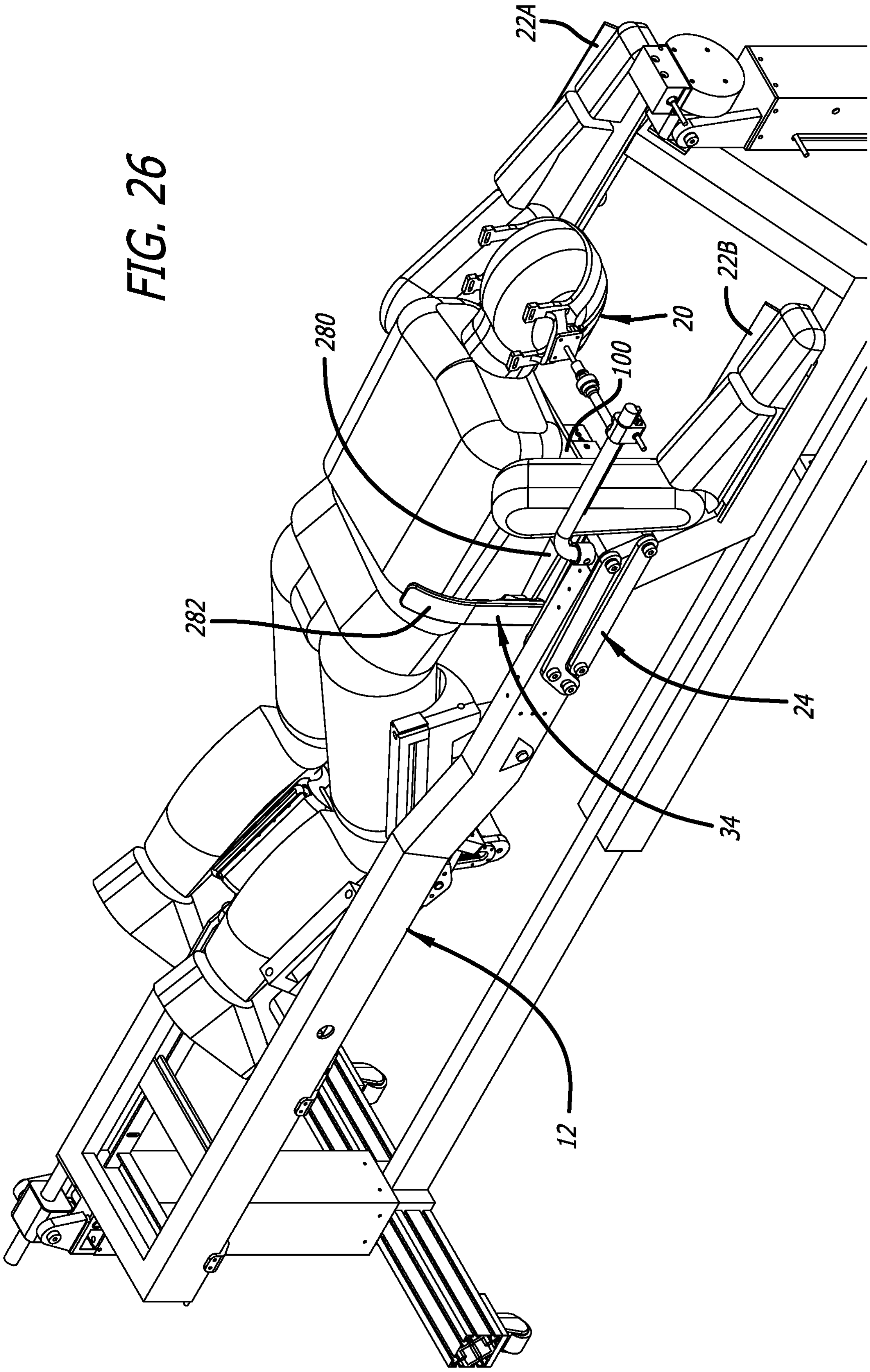
FIG. 26 is a top perspective view that illustrates a portion of the surgical frame of FIG. 1 showing operation of the coronal adjustment assembly.
Figure 27:
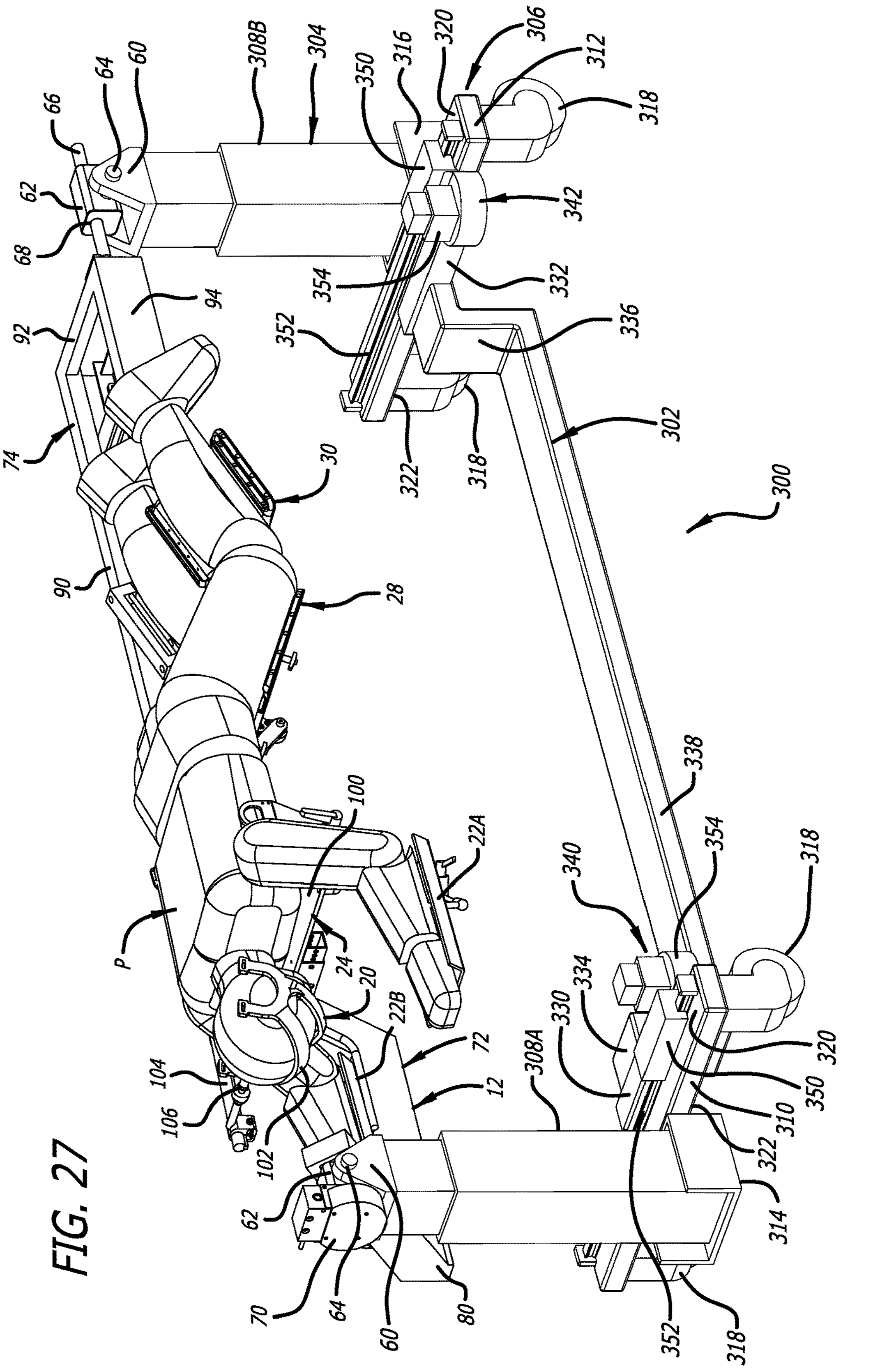
FIG. 27 is a top perspective view that illustrates a prior art surgical frame in accordance with an embodiment of the present invention with the patient positioned thereon in a prone position showing a translating beam thereof in a first position.

As depicted in FIGS. 24-26, for example, the coronal adjustment assembly 34 is configured to support and manipulate the patient's torso, and further to correct a spinal deformity, including but not limited to a scoliotic spine. As depicted in FIGS. 24-26, for example, the coronal adjustment assembly 34 includes a lever 280 linked to an arcuate radiolucent paddle 282. As depicted in FIGS. 24 and 25, for example, a rotatable shaft 284 is linked to the lever 280 via a transmission 286, and the rotatable shaft 284 projects from an end of the chest support plate 100. Rotation of the rotatable shaft 284 is translated by the transmission 286 into rotation of the lever 280, causing the paddle 282, which is linked to the lever 280, to swing in an arc. Furthermore, a servomotor (not shown) interconnected with the rotatable shaft 284 can be computer controlled and/or operated by the operator of the surgical frame 10 to facilitate controlled rotation of the lever 280.

As depicted in FIG. 24, for example, adjustments can be made to the position of the paddle 282 to manipulate the torso and straighten the spine. As depicted in FIG. 25, when the offset main beam 12 is positioned such that the patient P is positioned in a lateral position, the coronal adjustment assembly 34 supports the patient's torso. As further depicted in FIG. 26, when the offset main beam 12 is positioned such that the patient P is positioned in a prone position, the coronal adjustment assembly 34 can move the torso laterally, to correct a deformity, including but not limited to a scoliotic spine. When the patient is strapped in via straps (not shown) at the chest and legs, the torso is relatively free to move and can be manipulated. Initially, the paddle 282 is moved by the lever 280 away from the offset main beam 12. After the paddle 282 has been moved away from the offset main beam 12, the torso can be pulled with a strap towards the offset main beam 12. The coronal adjustment assembly 34 also includes safety stops (not shown) to prevent over-extension or compression of the patient, and sensors (not shown) programmed to send patient position feedback to the safety stops.

A preferred embodiment of a surgical frame incorporating a translating beam is generally indicated by the numeral 300 in FIGS. 27-30. Like the surgical frame 10, the surgical frame 300 serves as an exoskeleton to support the body of the patient P as the patient's body is manipulated thereby. In doing so, the surgical frame 300 serves to support the patient P such that the patient's spine does not experience unnecessary stress/torsion.

The surgical frame 300 includes translating beam 302 that is generally indicated by the numeral 302 in FIGS. 27-30. The translating beam 302 is capable of translating motion affording it to be positioned and repositioned with respect to portions of the remainder of the surgical frame 300. As discussed below, the positioning and repositioning of the translating beam 302, for example, affords greater access to a patient receiving area A defined by the surgical frame 300, and affords greater access to the patient P by a surgeon and/or a surgical assistant (generally indicated by the letter S in FIG. 30) via access to either of the lateral sides $L_1$ and $L_2$ (FIG. 30) of the surgical frame 300.

As discussed below, by affording greater access to the patient receiving area A, the surgical frame 300 affords transfer of the patient P from and to a surgical table/gurney. Using the surgical frame 300, the surgical table/gurney can be conventional, and there is no need to lift the surgical table/gurney over portions of the surgical frame 300 to afford transfer of the patient P thereto.

The surgical frame 300 is configured to provide a relatively minimal amount of structure adjacent the patient's spine to facilitate access thereto and to improve the quality of imaging available before, during, and even after surgery. Thus, the workspace of a surgeon and/or a surgical assistant and imaging access are thereby increased. The workspace, as discussed below, can be further increased by positioning and repositioning the translating beam 302. Furthermore, radiolucent or low magnetic susceptibility materials can be used in constructing the structural components adjacent the patient's spine in order to further enhance imaging quality.

The surgical frame 300, as depicted in FIGS. 27-30, is similar to the surgical frame 10 except that surgical frame 300 includes a support structure 304 having a support platform 306 incorporating the translating beam 302. The surgical frame 300 incorporates the offset main beam 12 and the features associated therewith from the surgical table 300. As such, the element numbering used to describe the surgical frame 10 is also applicable to portions of the surgical frame 300.

Rather than including the cross member 44, and the horizontal portions 46 and the vertical portions 48 of the first and second support portions 40 and 42, the support structure 304 includes the support platform 306, a first vertical support post 308A, and a second vertical support post 308B. As depicted in FIGS. 27-30, the support platform 306 extends from adjacent one longitudinal end to adjacent the other longitudinal end of the surgical frame 300, and the support platform 306 supports the first vertical support post 308A at the one longitudinal end and supports the second vertical support post 308B at the other longitudinal end.

As depicted in FIGS. 27-30, the support platform 306 (in addition to the translating beam 302) includes a first end member 310, a second end member 312, a first support bracket 314, and a second support bracket 316. Casters 318 are attached to the first and second end members 310 and 312. The first end member 310 and the second end member 312 each include an upper surface 320 and a lower surface 322. The casters 318 can be attached to the lower surface of each of the first and second end members 310 and 312 at each end thereof, and the casters 318 can be spaced apart from one another to afford stable movement of the surgical frame 300. Furthermore, the first support bracket 314 supports the first vertical support post 308A, and the second support bracket 316 supports the vertical second support post 308B.

The translating beam 302 is interconnected with the first and second end members 310 and 312 of the support platform 306, and as depicted in FIGS. 27-30, the translating beam 302 is capable of movement with respect to the first and second end members 310 and 312. The translating beam 302 includes a first end member 330, a second end member 332, a first L-shaped member 334, a second L-shaped member 336, and a cross member 338. The first L-shaped member 334 is attached to the first end member 330 and the cross member 338, and the second L-shaped member 336 is attached to the second end member 332 and the cross member 338. Portions of the first and second L-shaped members 334 and 336 extend downwardly relative to the first and second end members 330 and 332 such that the cross member 338 is positioned vertically below the first and second end member 330 and 332. The vertical position of the cross member 338 relative to the remainder of the surgical frame 300 lowers the center of gravity of the surgical frame 300, and in doing so, serves in adding to the stability of the surgical frame 300.

The translating beam 302, as discussed above, is capable of being positioned and repositioned with respect to portions of the remainder of the surgical frame 300. To that end, the support platform 306 includes a first translation mechanism 340 and a second translation mechanism 342. The first translation mechanism 340 facilitates attachment between the first end members 310 and 330, and the second translation mechanism 342 facilitates attachment between the second end members 312 and 332. The first and second translation mechanism 340 and 342 also facilitate movement of the translating beam 302 relative to the first end member 310 and the second end member 312.

The first and second translation mechanisms 340 and 342 can each include a transmission 350 and a track 352 for facilitating movement of the translating beam 302. The tracks 352 are provided on the upper surface 320 of the first and second end members 310 and 312, and the transmissions 350 are interoperable with the tracks 352. The first and second transmission mechanisms 340 and 342 can each include an electrical motor 354 or a hand crank (not shown) for driving the transmissions 350. Furthermore, the transmissions 350 can include, for example, gears or wheels driven thereby for contacting the tracks 352. The interoperability of the transmissions 350, the tracks 352, and the motors 354 or hand cranks form a drive train for moving the translating beam 302. The movement afforded by the first and second translation mechanism 340 and 342 allows the translating beam 302 to be positioned and repositioned relative to the remainder of the surgical frame 300.

The surgical frame 300 can be configured such that operation of the first and second translation mechanism 340 and 342 can be controlled by an operator such as a surgeon and/or a surgical assistant. As such, movement of the translating beam 302 can be effectuated by controlled automation. Furthermore, the surgical frame 300 can be configured such that movement of the translating beam 302 automatically coincides with the rotation of the offset main beam 12. By tying the position of the translating beam 302 to the rotational position of the offset main beam 12, the center of gravity of the surgical frame 300 can be maintained in positions advantageous to the stability thereof.

During use of the surgical frame 300, access to the patient receiving area A and the patient P can be increased or decreased by moving the translating beam 302 between the lateral sides $L_1$ and $L_2$ of the surgical frame 300. Affording greater access to the patient receiving area A facilitates transfer of the patient P between the surgical table/gurney and the surgical frame 300. Furthermore, affording greater access to the patient P facilitates ease of access by a surgeon and/or a surgical assistant to the surgical site on the patient P.

Figure 28:
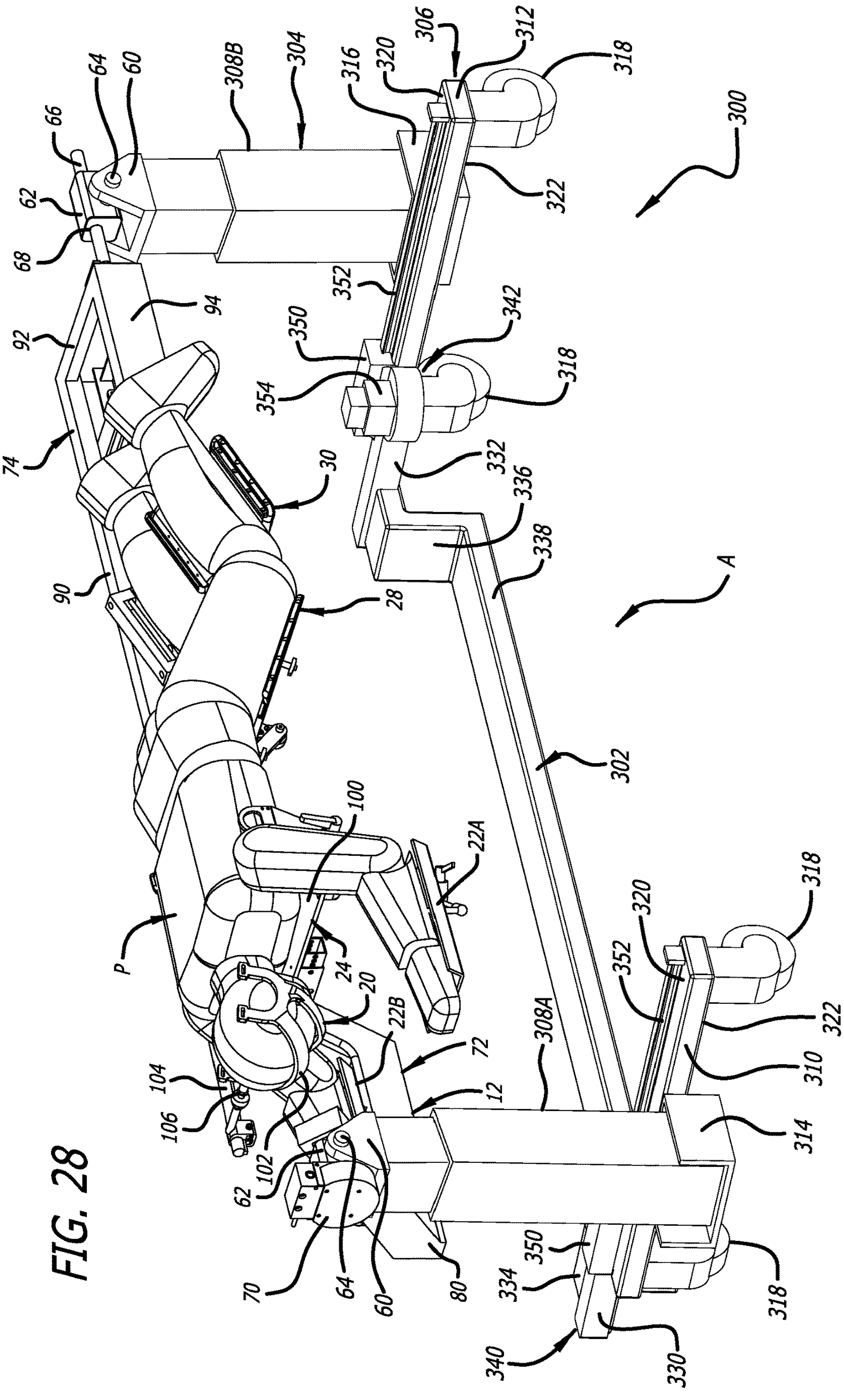
FIG. 28 is another top perspective view that illustrates the surgical frame of FIG. 27 with the patient in a prone position showing the translating beam thereof in a second position.
Figure 29:
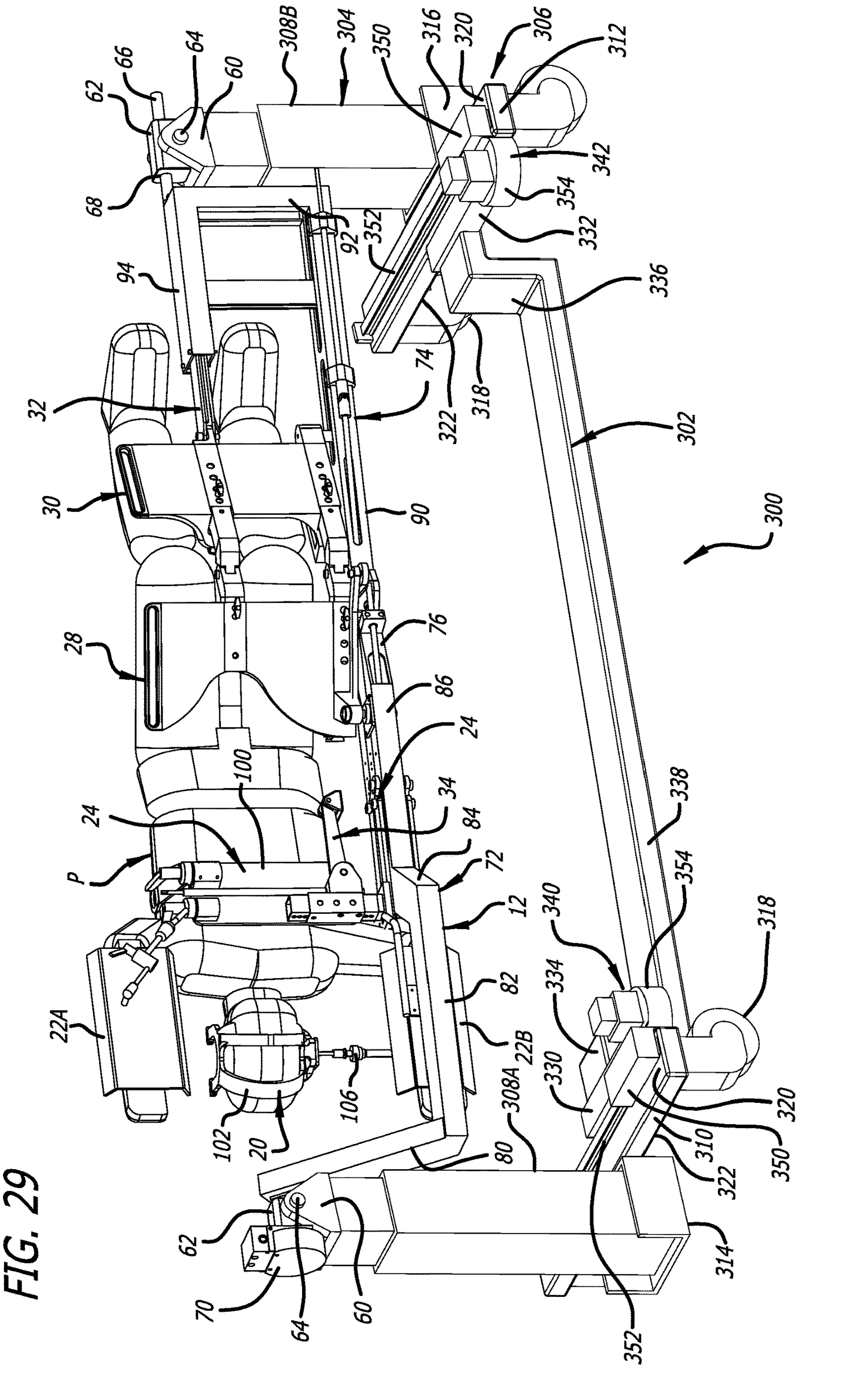
FIG. 29 is yet another top perspective view that illustrates the surgical frame of FIG. 27 with the patient in a lateral position showing the translating beam thereof in a third position.
Figure 30:
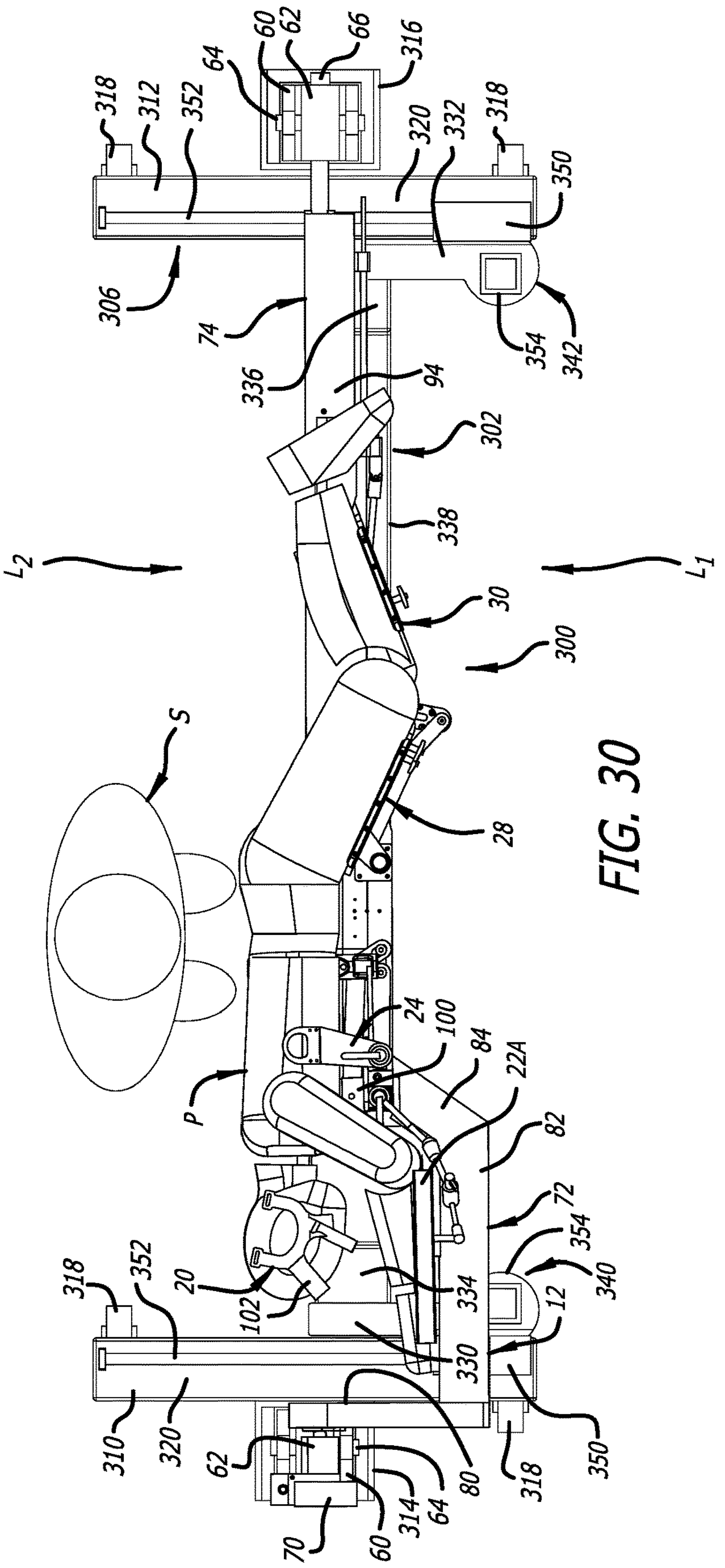
FIG. 30 is a top plan view that illustrates the surgical frame of FIG. 27 with the patient in a lateral position showing the translating beam thereof in the third position.
Figure 31:
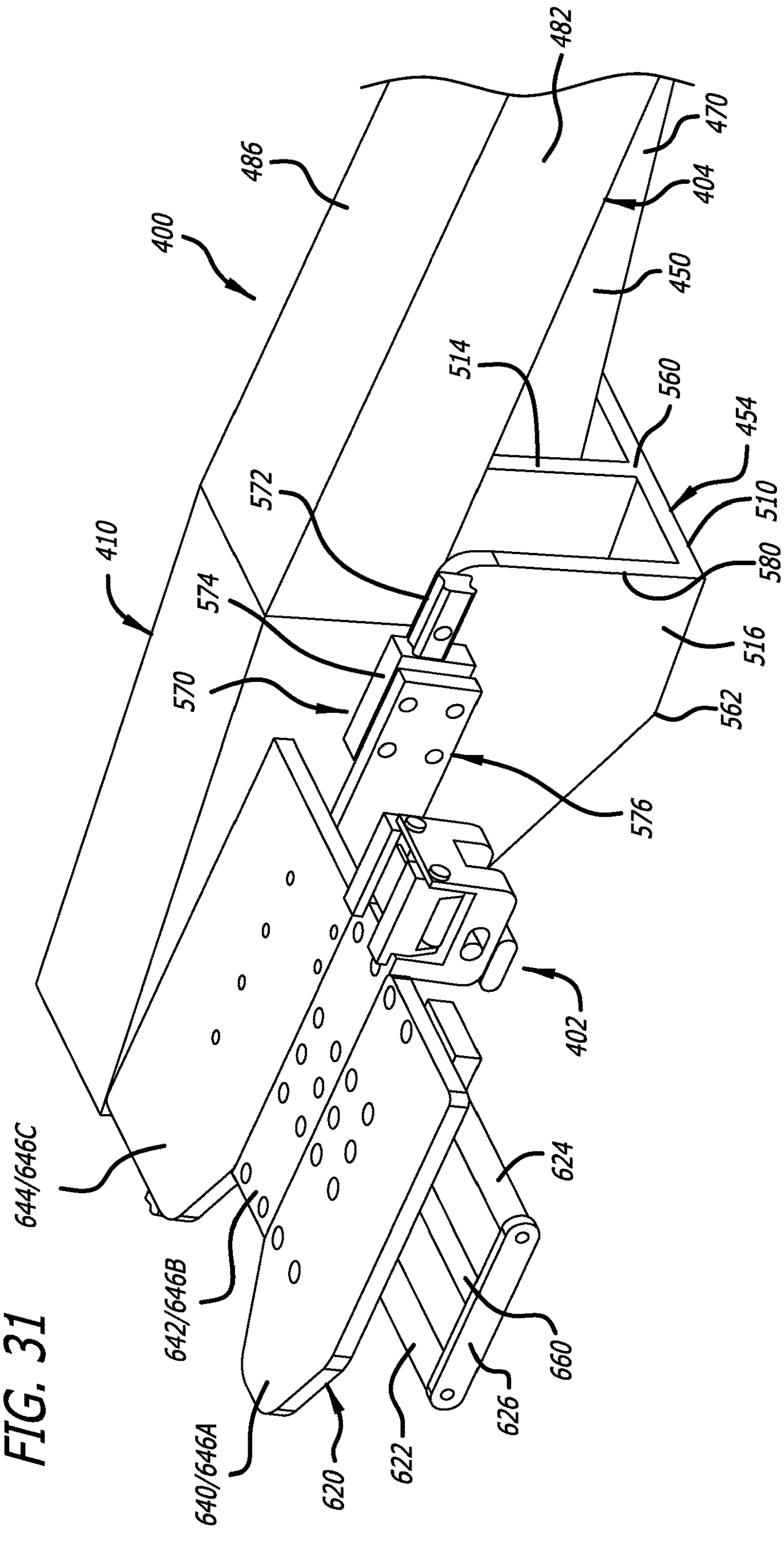
FIG. 31 is a top, side perspective view that illustrates a portion of a main beam of a surgical frame, and a portion of a reconfigurable upper leg support of a first embodiment of the present disclosure.

The translating beam 302 is moveable using the first and second translation mechanisms 340 and 342 between a first terminal position (FIG. 28) and a second terminal position (FIGS. 29 and 30). The translating beam 302 is positionable at various positions (FIG. 27) between the first and second terminal positions. When the translating beam 302 is in the first terminal position, as depicted in FIG. 28, the translating beam 302 and its cross member 338 are positioned on the lateral side $L_1$ of the surgical frame 300. Furthermore, when the translating beam 302 is in the second terminal position, as depicted in FIGS. 29 and 30, the translating beam 302 and its cross member 338 are positioned in the middle of the surgical frame 300.

With the translating beam 302 and its cross member 338 moved to be positioned at the lateral side $L_1$, the surgical table/gurney and the patient P positioned thereon can be positioned under the offset main beam 12 in the patient receiving area A to facilitate transfer of the patient P to or from the offset main beam 12. As such, the position of the translating beam 302 at the lateral side $L_1$ enlarges the patient receiving area A so that the surgical table/gurney can be received therein to allow such transfer to or from the offset main beam 12.

Furthermore, with the translating beam 302 and its cross member 338 moved to be in the middle of the surgical frame 300 (FIGS. 29 and 30), a surgeon and/or a surgical assistant can have access to the patient P from either of the lateral sides $L_1$ or $L_2$. As such, the position of the translating beam 302 in the middle of the surgical frame 300 allows a surgeon and/or a surgical assistant to get close to the patient P supported by the surgical frame 300. As depicted in FIG. 30, for example, a surgeon and/or a surgical assistant can get close to the patient P from the lateral side $L_2$ without interference from the translating beam 302 and its cross member 338. The position of the translating beam 302 can be selected to accommodate access by both a surgeon and/or a surgical assistant by avoiding contact thereof with the feet and legs of a surgeon and/or a surgical assistant.

The position of the translating beam 302 and its cross member 338 can also be changed according to the rotational position of the offset main beam 12. To illustrate, the offset main beam 12 can be rotated a full 360° before, during, and even after surgery to facilitate various positions of the patient to afford various surgical pathways to the patient's spine depending on the surgery to be performed. For example, the offset main beam 12 can be positioned by the surgical frame 300 to place the patient P in a prone position (e.g., FIGS. 27 and 28), lateral positions (e.g., FIGS. 29 and 30), and in a position 45° between the prone and lateral positions. The translating beam 302 can be positioned to accommodate the rotational position of the offset main beam 12 to aid in the stability of the surgical frame 300. For example, when the patient P is in the prone position, the translating beam 302 can preferably be moved to the center of the surgical frame 300 underneath the patient P. Furthermore, when the patient P is in one of the lateral positions, the translating beam 302 can be moved toward one of the corresponding lateral sides $L_1$ and $L_2$ of the surgical frame 300 to position underneath the patient P. Such positioning of the translating beam 302 can serve to increase the stability of the surgical frame 300.

A portion of a surgical frame 400 incorporating an upper leg support 402 in accordance with a first embodiment of the present disclosure is described hereinbelow. The surgical frame 400 can incorporate the features of the above-discussed surgical frames, and the upper leg support 402 can also be incorporated in the above-discussed surgical frames. As discussed below, the upper leg support 402 is reconfigurable such reconfiguration can be done via articulation using manual adjustment or controlled automation of the componentry thereof. In addition to the upper legs of the patient P, the upper leg support 402 can be used to at least partially support the pelvic area of the patient P, and to facilitate manipulation of the lumbar spine of the patient P.

Like the surgical frames 10 and 300, the surgical frame 400 can serve as an exoskeleton to support the body of the patient P as the patient's body is manipulated thereby. In doing so, the surgical frame 400 serves to support the patient P such that the patient's spine does not experience unnecessary stress/torsion.

Like the surgical frame 300, the surgical frame 400 can include a translating beam 302 and a support structure 304 having a support platform 306 incorporating the translating beam 302. Besides the support platform 306, the support structure 304 can include a first vertical support portion 308A and a second vertical support portion 308B. The first vertical support portion 308A and the second vertical support portion 308B are capable of expansion and contraction.

As depicted in FIGS. 31-33B, the surgical frame 400 also incorporates a main beam 404 having a first end (not shown) attached relative to the first support portion 308A and a second end (not shown) attached relative to the second support portion 308B. Like in the surgical frame 300, the main beam includes a first portion (not shown) at the first end, a second portion (not shown) at the second end, and a third portion 410 extending between the first portion and the second portion. The main beam 404 is similar to the offset main beam 12, and, as discussed below, the main beam 404 can incorporate features associated with the offset main beam 12. To illustrate, the offset main beam 404, like the main beam 12, is used in supporting the patient P on the surgical frame 400 and includes various components similar to those incorporated in the surgical frames 10 and 300. For example, in addition to the upper leg support 402, the main beam 404 can incorporate a head support (not shown), a chest support (not shown), arm supports (not shown), and a lower leg support (not shown). The upper leg support 402, the chest support, the arm supports, and the lower leg support can be attached to the third portion 410 of the main beam 404.

An operator such as a surgeon can control actuation of the various support components to manipulate the position of the patient's body. Soft straps (not shown) are used with these various support components to secure the patient P to the frame and to enable either manipulation or fixation of the patient P. Furthermore, reusable soft pads can be used on the load-bearing areas of the various support components. Additionally, the main beam 404 can be rotated a full 360° before, during, and even after surgery to facilitate various positions of the patient P to afford various surgical pathways to the patient's spine depending on the surgery to be performed. For example, the main beam 404 can be positioned by the surgical frame 400 to place the patient P in a prone position, lateral positions, and in a position 45° between the prone and lateral positions.

Figure 36:
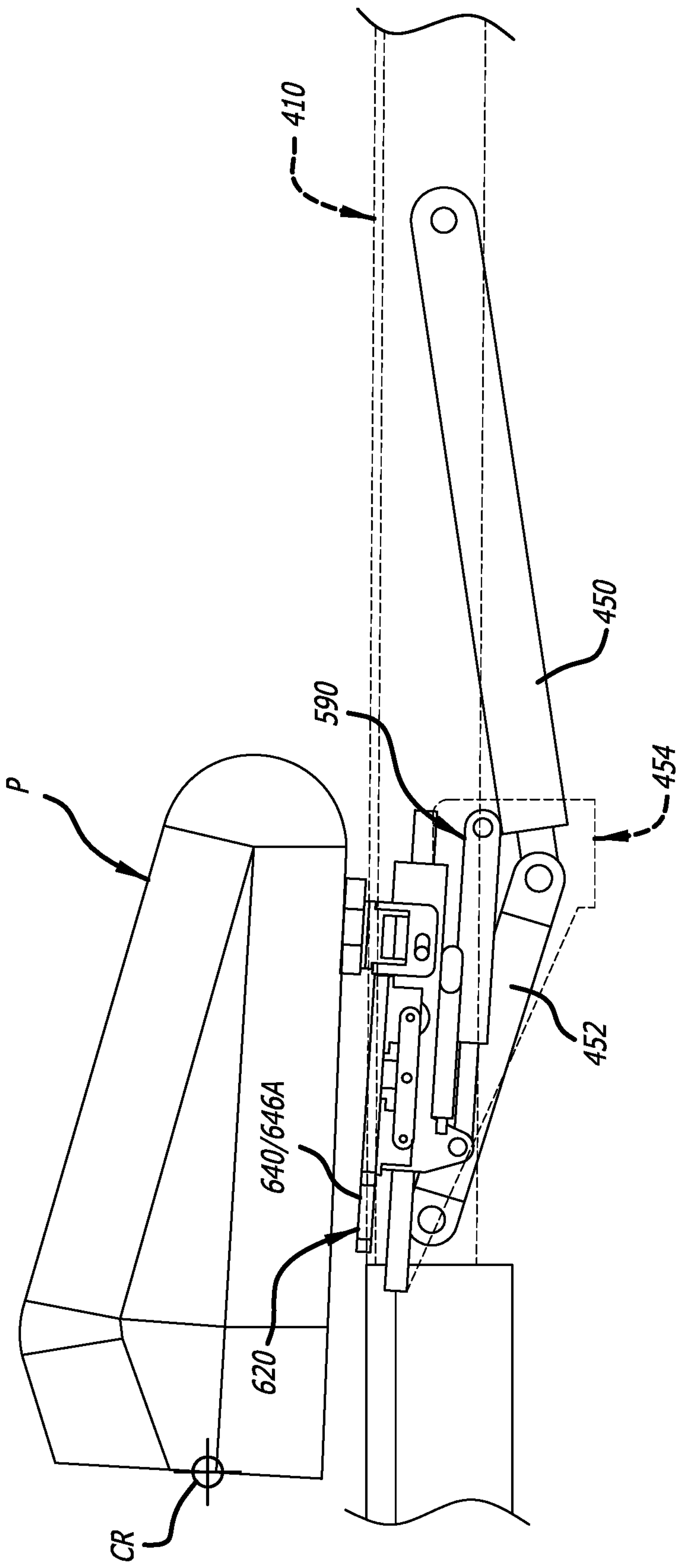
FIG. 36 is a side elevational view that illustrates the reconfigurable upper leg support of FIG. 31 showing a position of upper legs, hips, and lower back of a patient supported thereby with the upper leg support in the first position.
Figure 38:
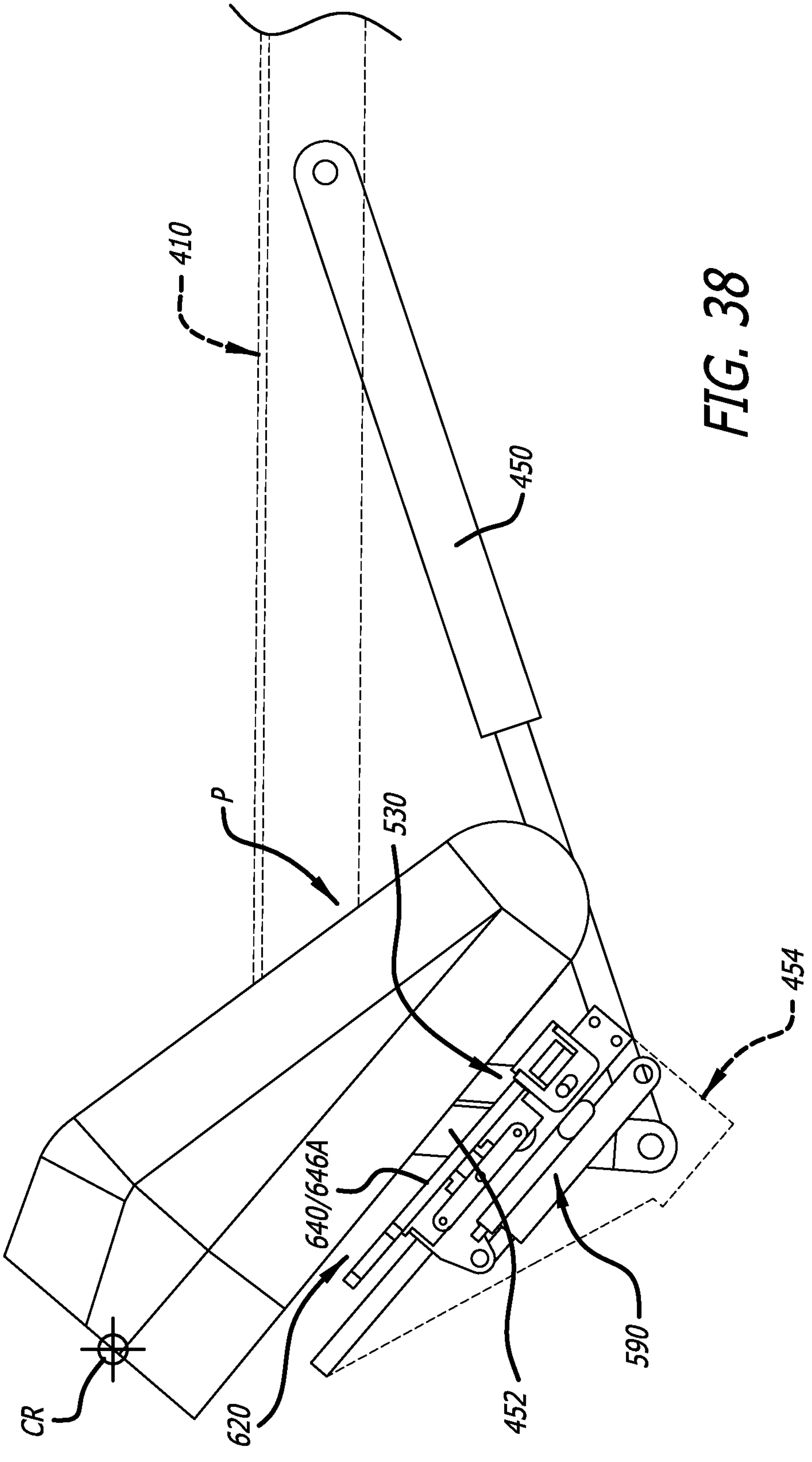
FIG. 38 is a side elevational view that illustrates the reconfigurable upper leg support of FIG. 31 showing a position of the upper legs, hips, and lower back of the patient supported thereby with the upper leg support in the second position.
Figure 40:
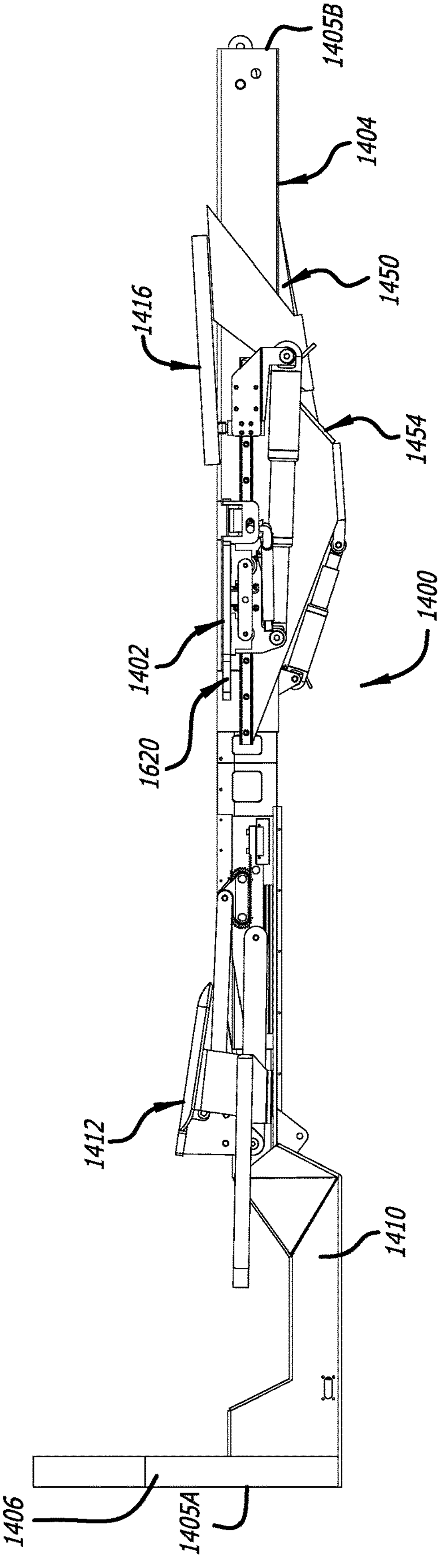
FIG. 40 is a side elevational view that illustrates a portion of a main beam of a surgical frame, and a reconfigurable upper leg support of second embodiment of the present disclosure.
Figure 41:
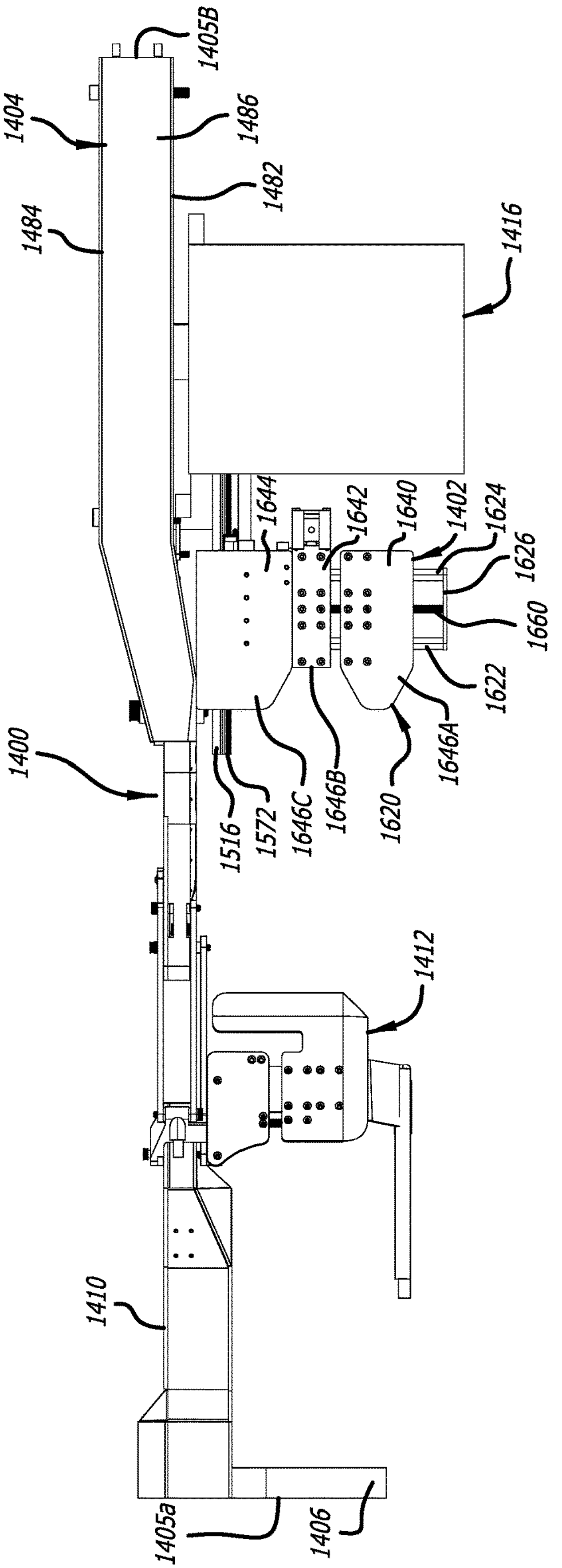
FIG. 41 is a top plan view that illustrates the reconfigurable upper leg support of FIG. 40 relative to the main beam.

The surgical frame 400 can be used to facilitate access to different parts of the spine of the patient P. In particular, the surgical frame 400 can be used to facilitate access to portions of the patient's lumbar spine. To illustrate, the patient P is simultaneously supported by the chest support and the upper leg support 402 on the main beam 404, and uninterrupted access is provided to portions of the patient's lumbar spine by the positions of the chest support and the upper leg support 402. The upper leg support 402 can be used to support the patient P during rotation of the main beam 404, and articulation of the other componentry of the surgical frame 400. Furthermore, the upper leg support 402, as depicted in FIGS. 36 and 38, is actuatable to facilitate positioning and repositioning thereof before, during, and after surgery to manipulate the patient P about an adjustable center of rotation CR located in and/or along a portion of the spine, including but not limited to the lumbar spine. As discussed below, the adjustable center of rotation CR is both adjustable to accommodate patients having different body sizes, and adjustable to facilitate, for example, flexing of the lumbar spine with the center of rotation CR location located above (posterior), within, or below (anterior) the lumbar spine to afford surgical access thereto with or without distribution or compression of the lumbar spine or portions thereof.

The main beam 404 is moveably attached relative to the first vertical support post 308A and the second vertical support post 308B. Like those of the surgical frames 10 and 300, the first vertical support post 308A and the second vertical support post 308B of the surgical frame 400 each include a clevis (not shown) supporting componentry facilitating rotation of the main beam 404. In addition to the clevis, the first vertical support post 308A includes a support block portion (not shown), a pin portion (not shown) pivotally attaching the support block portion to the clevis, and an axle portion (not shown) rotatably supported by the support block and interconnected to the first portion at the first end of the main beam 404. The support block portion, via interaction of the pin portion with the clevis, is capable of pivotal movement relative to the clevis to accommodate different heights for the first vertical support post 308A and the second vertical support post 308B. And the main beam 404, via interaction of the axle portion with the support block portion, is capable of rotational movement relative to the support block portion to accommodate rotation of the patient P supported by the main beam 404.

Furthermore, in addition to the clevis, the second vertical support post 308B includes a coupler (not shown) and a pin portion (not shown) pivotally attaching the coupler to the clevis. The coupler includes a base portion (not shown) that is pinned to the clevis with the pin portion, a body portion (not shown) that includes a transmission (not shown), a motor (not shown) that drives the transmission in the body portion, and a head portion (not shown) that is rotatable with respect to the body portion and driven rotationally by the transmission via the motor. The head portion is interconnected with the second portion at the second end of the main beam 404, and the head portion (via the transmission and the motor) can rotate the main beam 404 a full 360° before, during, and even after surgery to facilitate various positions of the patient P.

As depicted in FIGS. 31-34B, the upper leg support 402 can be attached to and incorporated into portions of the third portion 410 of the main beam 404. The upper leg support 402, as depicted in FIGS. 32B-38, can include a first arm portion 450, a second arm portion 452, and a platform portion 454. The first arm portion 450 includes a first end portion 460 and a second end portion 462, and the second arm portion 452 includes a first end portion 464 and a second end portion 466. The first end portion 460 and the second end portion 462 of the first arm portion 450 are pivotally attached, respectively, to the main beam 404 and the first end portion 464 of the second arm portion 452, and the first end portion 464 and the second end portion 466 of the second arm portion 452 are pivotally attached, respectively, to the second end portion 466 of the first arm portion 450 and the main beam 404.

The first arm portion 450 is extendable, and includes a base portion 470 that includes the first end portion 460 and an extendable portion 472 that includes the second end portion 462. The extendable portion 472 is moveable inwardly and outwardly relative to the base portion 470, and such inward and outward movement serves to pivot the first arm portion 450 relative to the main beam 404, pivot the first arm portion 450 and the second arm portion 452 relative to one another, and pivot the second arm portion 452 relative to the main beam 404. As discussed below, such pivotal movement serves in facilitating positioning and repositioning of the platform portion 454 relative to the main beam

404. To illustrate, increasing the amount of extension of the extendable portion 472 relative to the base portion 470 moves the platform portion 454 away from the third portion 410 of the main beam 404, and toward the first end and away from the second end.

Figure 32A:
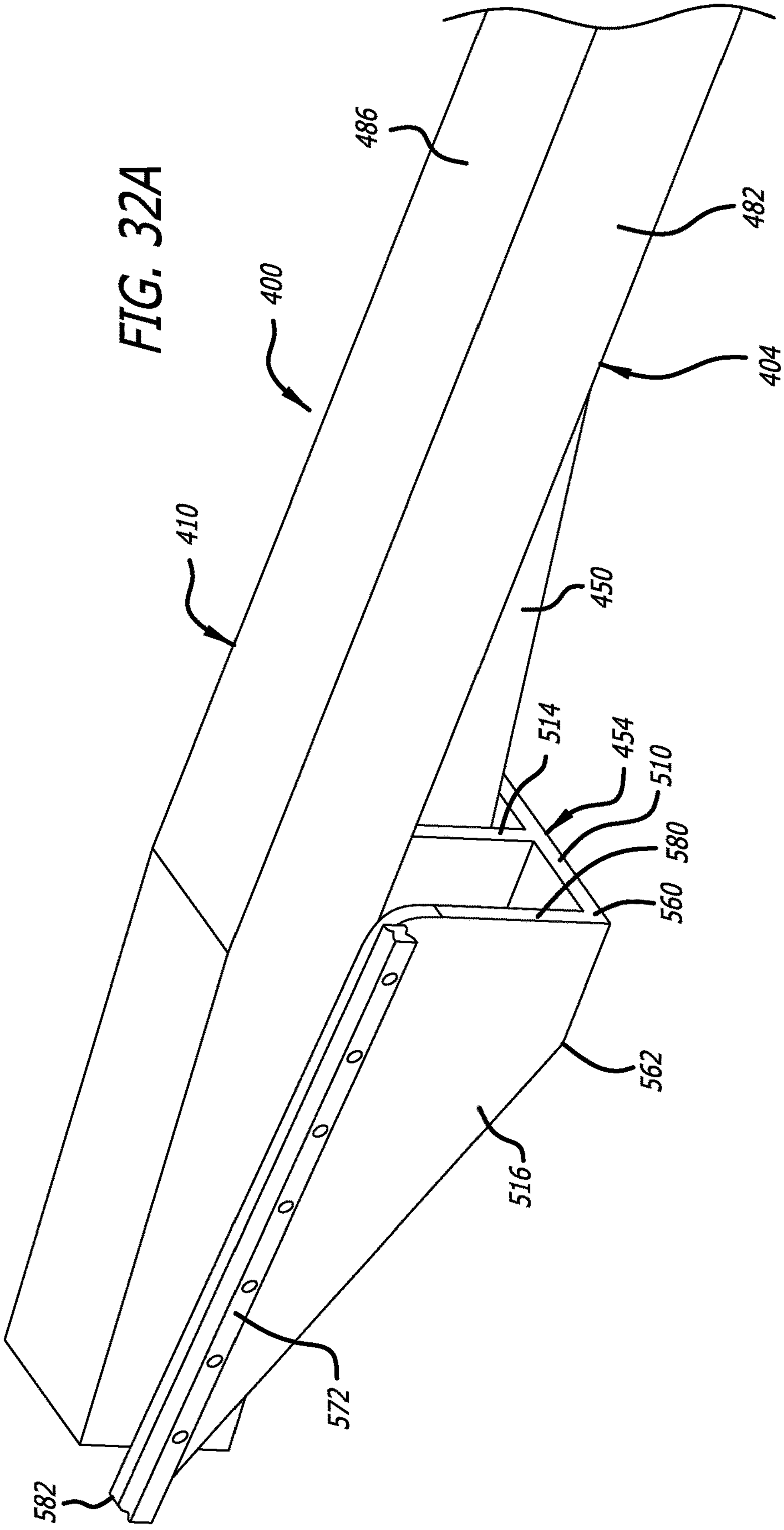
FIG. 32A is a top, side perspective view similar to FIG. 31 that illustrates a portion of the reconfigurable upper leg support of FIG. 31 relative to the main beam.
Figure 32B:
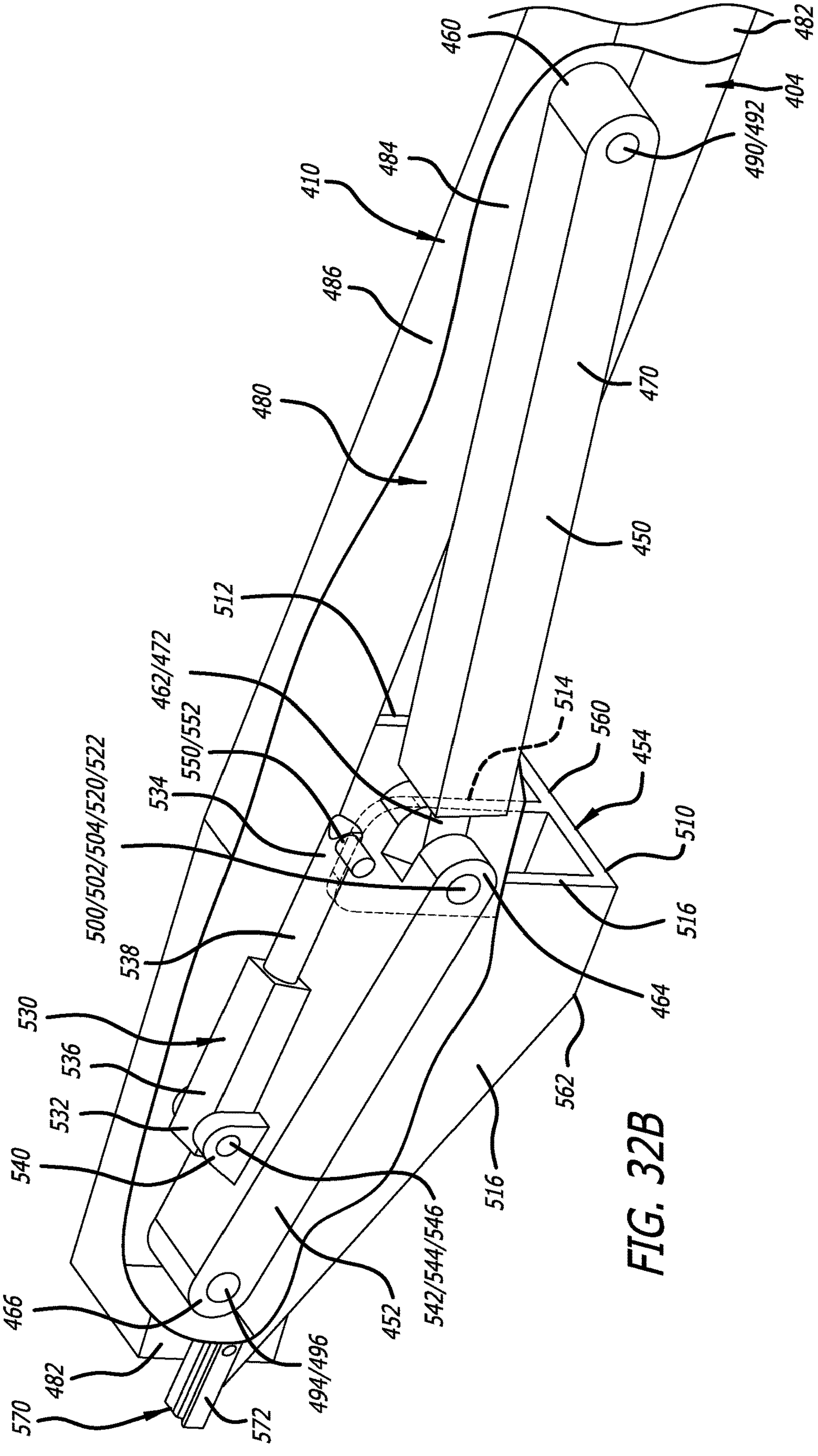
FIG. 32B is a fragmentary, top, side perspective view similar to FIG. 32A that illustrates a portion of the reconfigurable upper leg support of FIG. 31 relative to the main beam.
Figure 33A:
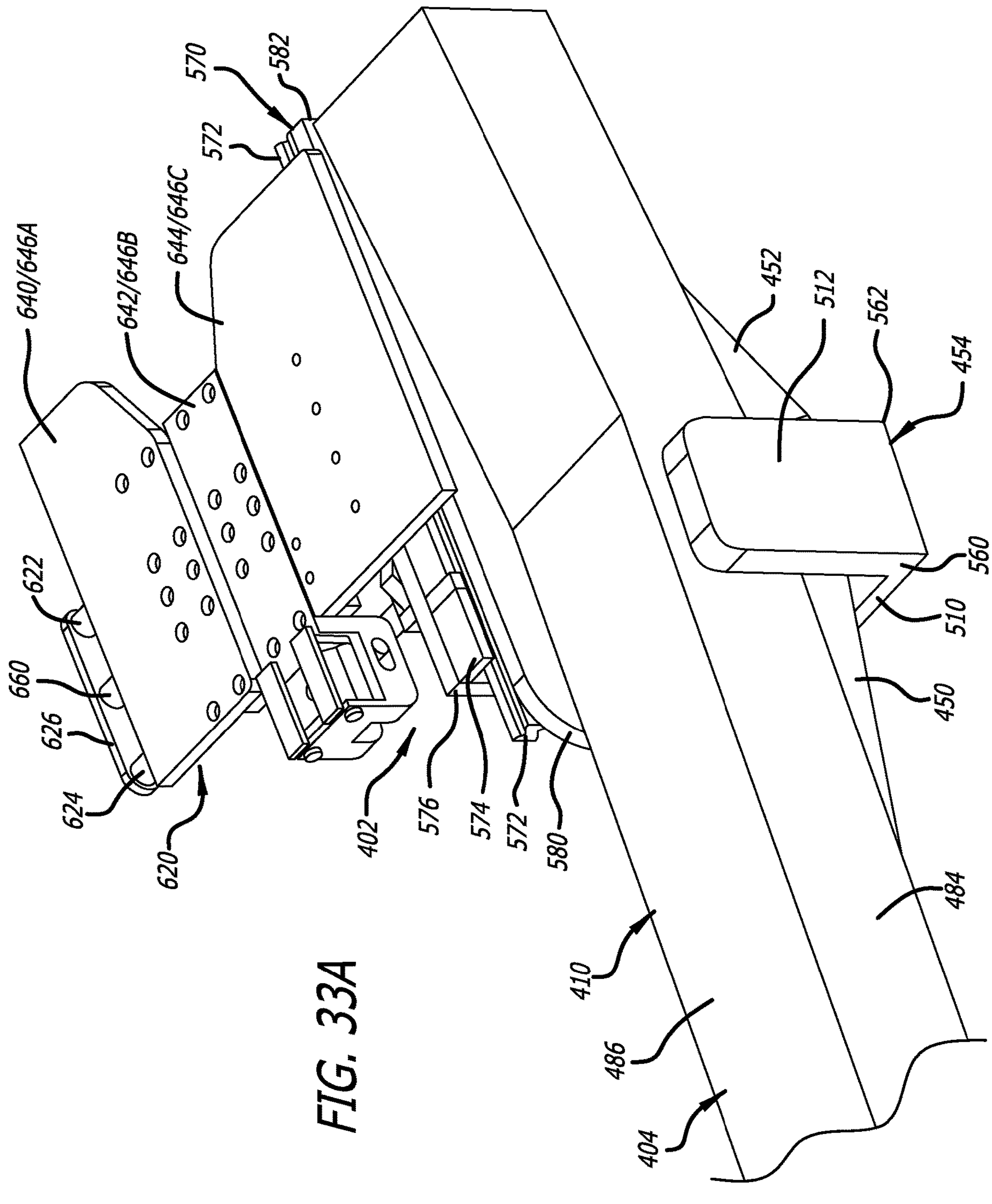
FIG. 33A is a top, side perspective view that illustrates a portion of the main beam, and a portion of the reconfigurable upper leg support of FIG. 31.
Figure 33B:
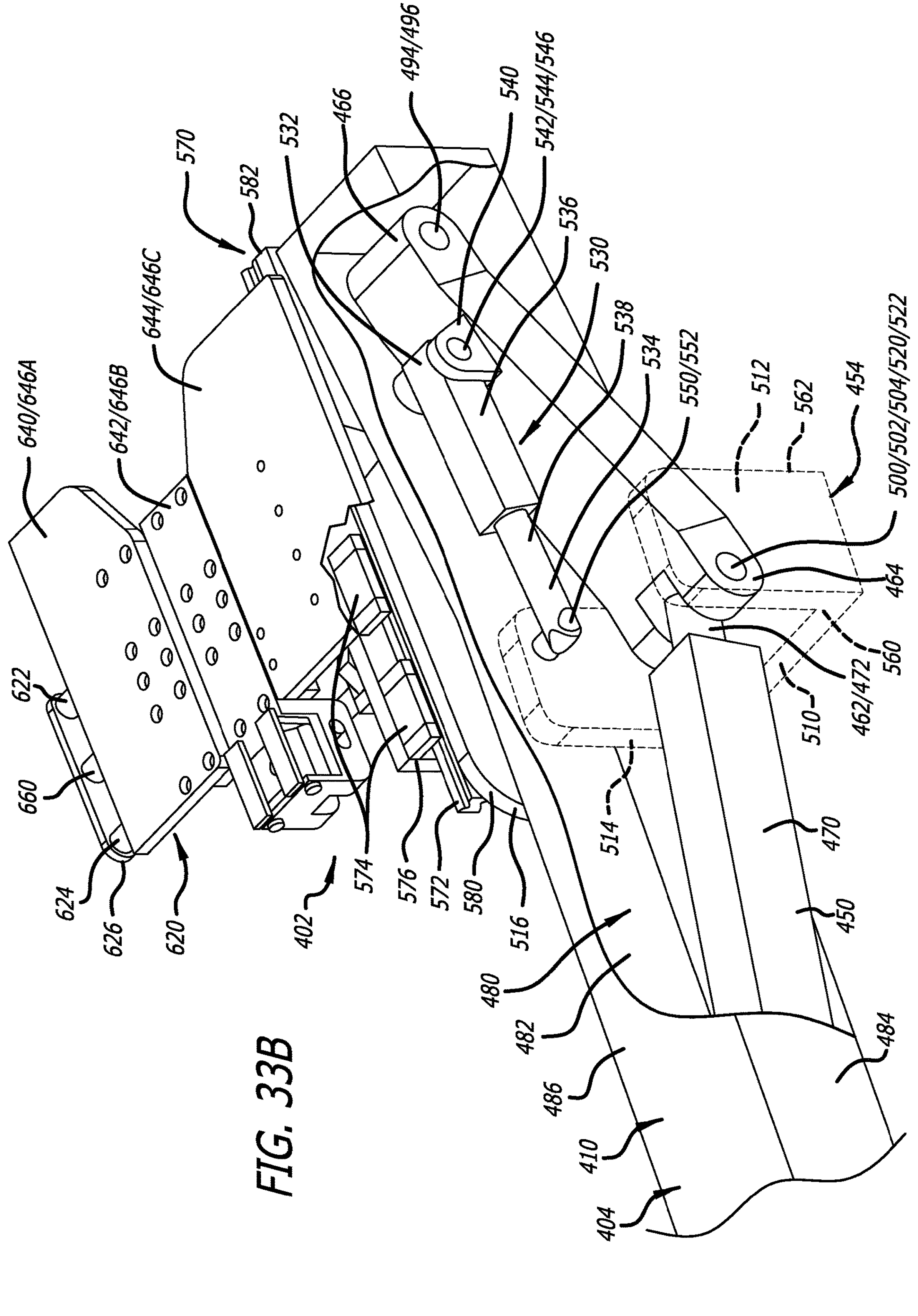
FIG. 33B is a fragmentary, top, side perspective view similar to FIG. 33A that illustrates a portion of the reconfigurable upper leg support of FIG. 31 relative to the main beam.

The third portion 410, as depicted in FIGS. 32B and 33B, includes an interior cavity 480 defined by a first sidewall portion 482, a second sidewall portion 484, and a connecting-wall portion 486 joining the first sidewall portion 482 and the second sidewall portion 484 to one another. Portions of the upper leg support 402 are received within the interior cavity 480. To illustrate, the first end portion 460 of the first arm portion 450 and the second end portion 466 of the second arm portion 452 are received with the cavity 480.

The first end portion 460 of the first arm portion 450, as depicted in FIG. 32B, includes an aperture 490 for receiving a pin 492 extending between the first sidewall portion 482 and the second sidewall portion 484 to facilitate pivotal attachment of the first arm portion 450 to the main beam 404, and the second end portion 466 of the second arm portion 452 includes an aperture 494 for receiving a pin 496 extending between the first sidewall portion 482 and the second sidewall portion 484 to facilitate pivotal attachment of the second arm portion 452 to the main beam 404. Furthermore, the second end portion 462 of the first arm portion 450 and the first end portion 464 of the second arm portion 452 can form a clevis-tang joint, wherein one of the second end portion 462 and the first end portion 464 is a clevis, and the other of the second end portion 462 and the first end portion 464 is a tang. As depicted in FIGS. 32B and 33B, the second end portion 462 is configured as a tang with an aperture 500 extending therethrough, and the first end portion 464 is configured as a clevis with apertures 502 extending therethrough. The aperture 500 and the apertures 502, as depicted in FIGS. 32B and 33B, are configured to receive a pin 504 to facilitate pivotal attachment of the first arm portion 450 and the second arm portion 452 to one another.

Additionally, the pin 504 is used in facilitating attachment of the platform portion 454 to the first arm portion 450 and the second arm portion 452. As depicted in FIGS. 32B and 33B, the platform portion 454 includes a base portion 510, a first upstanding portion 512, a second upstanding portion 514, and a third upstanding portion 516. Portions of the first upstanding portion 512 and the second upstanding portion 514 can be received in the interior cavity 480, and portions of the second end portion 462 of the first arm portion 450 and the first end portion 464 of the second arm portion 452 are received between the first upstanding portion 512 and the second upstanding portion 514. The first upstanding portion 512 includes an aperture 520, the second upstanding portion 514 includes an aperture 522, and each of the first aperture 520 and the second aperture 522 are configured to receive portions of the pin 504 to attach the second end portion 462 of the first arm portion 450 and the first end portion 464 of the second arm portion 452 to platform portion 454.

The extension of the extendable portion 472 relative to the base portion 470 serves in pivoting the first arm portion 450 and the second arm portion 452 relative to one another such that increasing the amount of extension decreases an angle between the first arm portion 450 and the second arm portion 452, and decreasing the amount of extension increases the angle between the first arm portion 450 and the second arm portion 452. Given that the platform portion 454 is attached to the second end portion 462 of the first arm portion 450 and the first end portion 464 of the second arm portion 452, increasing the amount of extension of the first arm portion 450 moves the platform portion 454 away from the third portion 410 of the main beam 404, and toward the first end and away from the second end, and decreasing the amount of extension of the first arm portion 450 moves the platform portion 454 toward the third portion 410 of the main beam 404, and away from the first end and toward the second end. Furthermore, when the extension of the first arm portion 450 is decreased, portions of the first upstanding portion 512 and the second upstanding portion 514 are drawn into the cavity 480. As discussed below, the movement of the platform portion 454 using the extension of the extendable portion 472 ultimately serves in adjusting the position of the patient's spine. Such adjustment can occur before, during, and/or after surgery using the surgical frame 400.

As depicted in FIGS. 32B and 33B, the upper leg support 402 also includes a telescoping shaft portion 530 that is connected between the second arm portion 452 and the platform portion 454. The telescoping shaft portion 530 is used to pivot the platform portion 454 relative to the first arm portion 450 and the second arm portion 452. The telescoping shaft portion 530 includes a first end portion 532, a second end portion 534, a base portion 536 including the first end portion 532, and an extendable portion 538 including the second end portion 534. As discussed below, the extendable portion 538 is moveable inwardly and outwardly relative to the base portion 536, and such inward and outward movement serves to pivot the platform portion 454.

To facilitate connection between the telescoping shaft portion 530 and the second arm portion 452, one of the first end portion 532 and the second arm portion 452 can form a clevis, and the other of the first end portion 532 and the second arm portion 452 can form a tang. Furthermore, to facilitate connection between the telescoping shaft portion 530 and the platform portion 454, one of the second end portion 534 and the platform portion 454 can form a clevis, and the other of the second end portion 534 and the platform portion 454 can form a tang. As depicted in FIGS. 32B and 33B, the second arm portion 452 includes a clevis 540 having apertures 542, the first end portion 532 is used as a tang having an aperture 544, and a pin 546 is received through the apertures 542 and 544 to join the telescoping shaft portion 530 to the second arm portion 542. Furthermore, as depicted in FIGS. 32B and 33B, the platform portion 454 includes a post 550, the second end portion 534 includes an aperture 552, and the post 550 is received in the aperture 552 to join the telescoping shaft portion 530 to the platform portion 454.

The extendable portion 538 is moveable inwardly and outwardly relative to the base portion 536, and such inward and outward movement serves to pivot the platform portion 454 relative to the first arm portion 450 and the second arm portion 452. Such pivotal movement serves in facilitating positioning and repositioning of the platform portion 454 relative to first arm portion 450 and the second arm portion 452. To illustrate, the base portion 510 of the platform portion 554 includes a first end 560 and a second end 562, and increasing the amount of extension of the extendable portion 538 relative to the base portion 536 moves the second end 562 away from the third portion 410 of the main beam 404. As discussed below, the movement of the platform portion 454 using the extension of the telescoping shaft portion 530 ultimately serves in adjusting the position of the patient's spine. Such adjustment can occur before, during, and/or after surgery using the surgical frame 400.

Figure 34A:
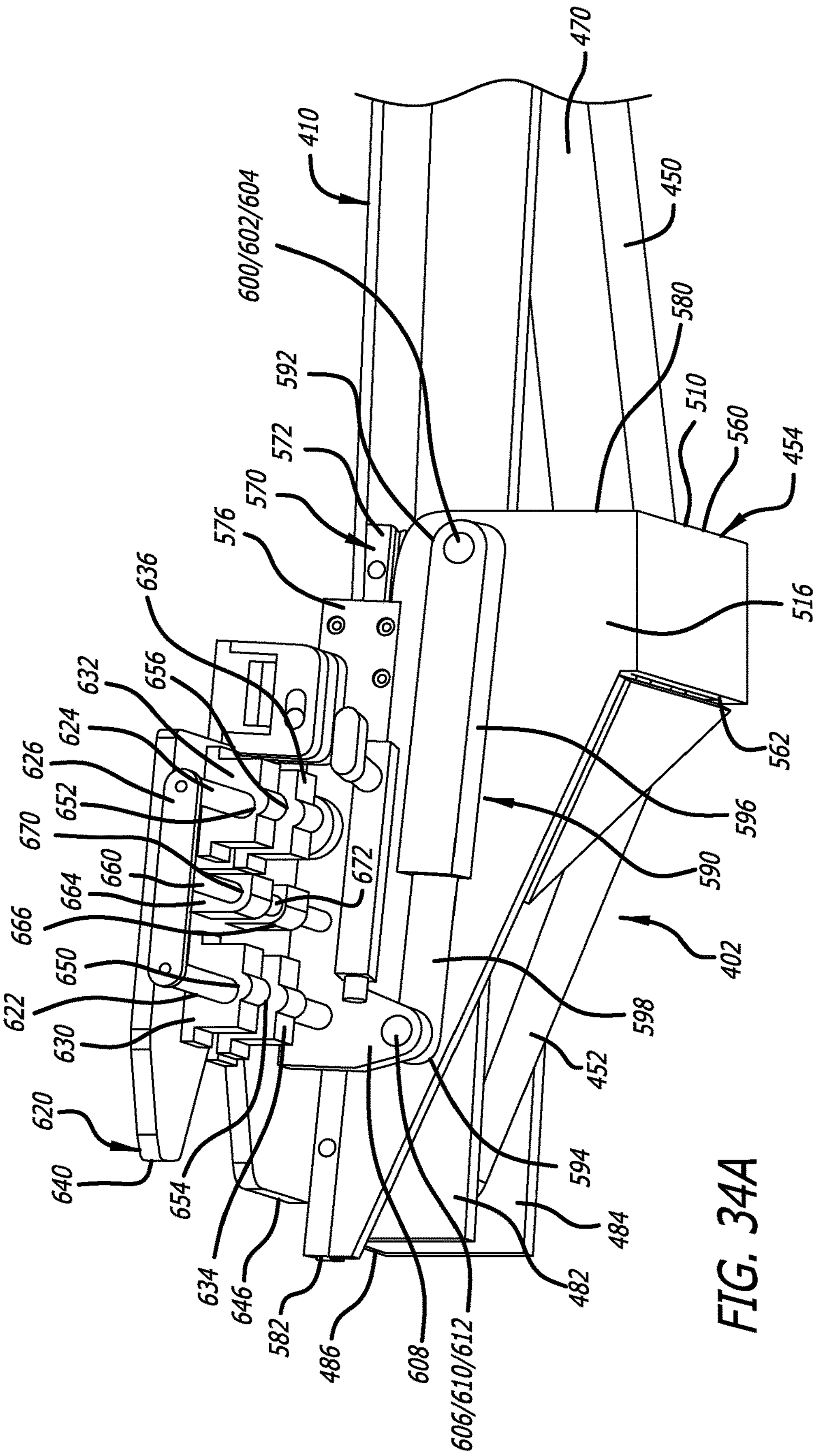
FIG. 34A is a bottom, side perspective view that illustrates a portion of the main beam, and a portion of the reconfigurable upper leg support of FIG. 31.
Figure 34B:
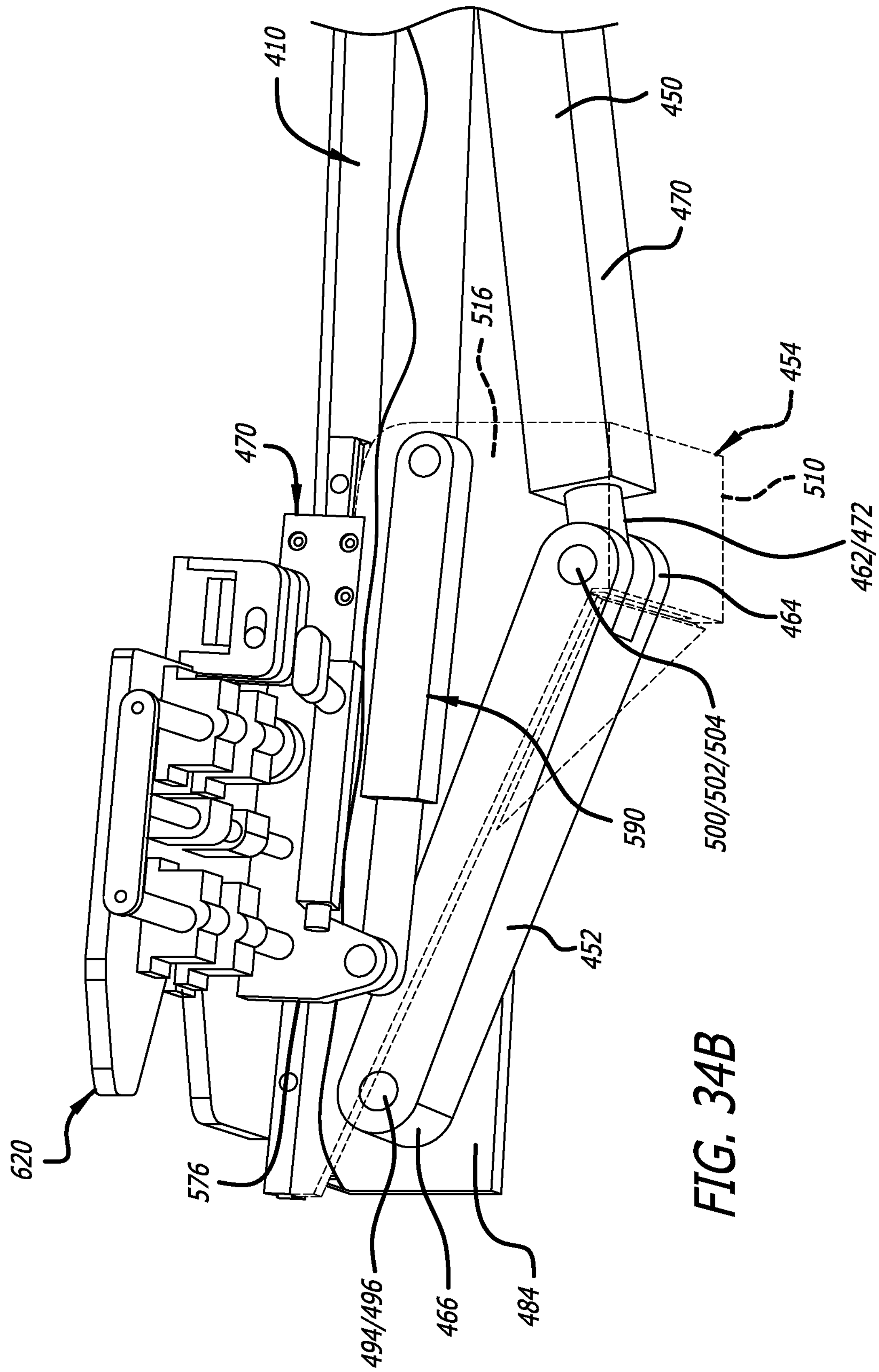
FIG. 34B is a fragmentary bottom, side perspective view similar to FIG. 34B that illustrates a portion of the reconfigurable upper leg support of FIG. 31 relative to the main beam.

As depicted in FIGS. 34A and 34B, the upper leg support 402 also includes a linear movement assembly 570. The linear movement assembly 570 includes a track portion 572 attached to the third upstanding portion 516, two trucks 574 moveable along the track portion 572, and a support bracket 576 attached to the two trucks 574. The third upstanding portion 516, as depicted in FIGS. 33A and 33B, includes a first end 580 and a second end 582, and is larger than the first upstanding portion 512 and the second upstanding portion 514. The third upstanding portion 516 is attached at and adjacent the first end 580 to the base portion 510, and extends from the base portion 510 toward the first portion of the main beam 404 to the second end 582. The third upstanding portion 516 supports the track portion 572, the two trucks 574, the support bracket 576, and additional components of the upper leg support 402.

The linear movement assembly 570, as depicted in FIGS. 34A and 34B, also includes a telescoping shaft portion 590 that is connected between the third upstanding portion 516 and the support bracket 576. The telescoping shaft portion 590 includes a first end portion 592, a second end portion 594, a base portion 596 including the first end portion 592, and an extendable portion 598 including the second end portion 594. To attach the telescoping shaft portion 590 to the third upstanding portion 516, the first end portion 592 of the telescoping shaft portion 590 can include an aperture 600, the third upstanding portion 516 can include an aperture 602, and a pin 604 can be received in the apertures 600 and 602. Furthermore, to attach the telescoping shaft portion 590 to the support bracket 576, the second end portion 594 of the telescoping shaft portion 590 can include an aperture 606, the support bracket 576 can include a projection 608 including an aperture 610, and a pin 612 can be received in the apertures 606 and 610.

The extendable portion 598 is moveable inwardly and outwardly relative to the base portion 596, and such inward and outward movement relative to the base portion 596 serves to move the support bracket 576 via movement of the two trucks 574 along the track portion 572 between at least a first position closer to the second end 582 of the main beam 404 to a second position closer to the first end 580 of the main beam 404. As discussed below, the movement of the support bracket 576 using the extension of the extendable portion 598 ultimately serves in adjusting the position of the patient's spine. Such adjustment can occur before, during, and/or after surgery using the surgical frame 400.

The upper leg support 402 also includes a support assembly 620 that is carried by the support bracket 576. The support assembly 620 includes a first support post 622, a second support post 624, and a connecting bracket 626 connecting the first support post 622 and the second support post 624 to one another. The support assembly 620 also includes a first support block 630, a second support block 632, a third support block 634, a fourth support block 636, a first support plate 640, a second support plate 642, and a third support plate 644. Each of the first support plate 640, the second support plate 642, and the third support plate 644 include upper surfaces 646A, 646B, and 646C, respectively, that can be used to contact the upper legs of the patient. The upper surfaces 646A and 646C can be covered with padding (not shown) for contacting portions of the patient's upper legs, and the padding can include pressure sensors (not shown) incorporated therein. The resulting pressure sensing padding can be used to determine if undue stress is placed on the patient P via articulation of the upper leg support 402.

The first support plate 640 and the second support plate 642, as discussed below, are moveable with respect to the support bracket 576 and the third support plate 644. As depicted in FIGS. 33A and 33B, the third support plate 644 is attached to the support bracket 576, and the second support plate 642 is positioned such that it can move underneath the third support plate 644. As such, during movement of the first support plate 640 and the second support plate 642, the area defined by the upper surfaces 646A, 646B, and 646C can be respectively decreased or increased as the second support plate 642 is moved under or out from under the third support plate 644.

As depicted in FIG. 34A, the first support plate 640 is attached to the first support block 630 and the second support block 632, and the first support block 630 is moveable along the first support post 622 and the second support block 632 is moveable along the second support post 624. Furthermore, the second support plate 642 is attached to the third support block 634 and the fourth support block 636, and the third support block 634 is moveable along the first support post 622 and the fourth support block 636 is moveable along the second support post 624.

The first and second support blocks 630 and 632 include apertures 650 and 652 for receiving the first and second support posts 622 and 624, respectively, and the third and fourth support blocks 634 and 636 include apertures 654 and 656 for receiving the first second support posts 622 and 624, respectively. The first support plate 640 and the second support plate 642 are moveable inwardly and outwardly relative to the support bracket 576 and the third support plate 644 with threads complementary to those of the threaded shaft via movement of the first and third support blocks 630 and 634 on the first support post 622 and via movement of the second and fourth support blocks 632 and 636 on the second support post 624.

The support assembly 620 also includes a threaded shaft 660 that is retained in position between the support bracket 576 and the connecting bracket 626. As discussed below, the threaded shaft 660 is used to constrain movement of the first support plate 640 and the second support plate 642 relative to the third support plate 644 and the main beam 404.

Furthermore, the first support plate 640 includes a first support collar 664 opposite from the upper surface 646A, and the second support plate 642 includes a second support collar 666 opposite from the upper surface 646B. The first support collar 664 includes a first aperture 670 that can include threads complementary to those of the threaded shaft 660, and the second support collar 666 includes a second aperture 672 that can include threads complementary to those of the threaded shaft 660. The threaded shaft 660 can be received in the first aperture 670 and the second aperture 672. The first support collar 664 and the second support collar 666 can include one or more latches (not shown) that can be engaged and disengaged from the threaded shaft 660 via actuation thereof. The one or more latches can be attached to the first support collar 664 and/or the second support collar 666, and a user can actuate the one or more latches to engage or disengage the threaded shaft 660 to correspondingly prevent movement or allow movement of the first support collar 664 and the second support collar 666 along the threaded shaft 660. When the one or more latches are engaged, the interactions of the one or more latches with the threaded shaft 660 prevent movement of the first support plate 640 and the second support plate 642 relative to the third support plate 644. When the one or more latches are disengaged, the first support plate 640 and the second support plate 642 can move relative to the third support plate 644. Rather than using the threaded shaft 660, a shaft with catches and/or teeth to which the one or more latches can be engaged and disengaged.

Alternatively, a motor/transmission/actuator (not shown) can be used to facilitate rotation of the threaded shaft 660, and rotation of the threaded shaft 660 and the interaction in the first aperture 670 and the second aperture 672 causes corresponding movement of the first support plate 640 and the second support plate 642. As such, rotation of the threaded shaft 660 via actuation of the motor/transmission/actuator is translated into movement of the first support plate 640 and the second support plate 642. To illustrate, the threads of the threaded shaft 660, the first aperture 670, and the second aperture 672 can be configured such that clockwise rotation of the threaded shaft 660 via actuation of the motor/transmission/actuator causes inward movement of the first support plate 640 and the second support plate 642, and counterclockwise rotation of the threaded shaft 660 via actuation of the motor/transmission/actuator causes outward movement of the first support plate 640 and the second support plate 642. The inward and outward movement of the first support plate 640 and the second support plate 642 is relative to the third support plate 644 and the main beam 404.

The movement of the first support plate 640 and the second support plate 642 ultimately serves in adjusting a total width of a combination of the first support plate 640, the second support plate 642, and the third support plate 644. Adjustment of the combined width of the first support plate 640, the second support plate 642, and the third support plate 644 affords the accommodation of differently sized patients on the upper leg support 402.

The movement of the componentry of the upper leg support 402 can be effectuated via manual adjustment and/or controlled automation. To illustrate, the first arm portion 450 includes the extendable portion 472 that is moveable with respect to the base portion 470 thereof, the telescoping shaft portion 530 includes the extendable portion 538 that is moveable with respect to the base portion 536 thereof, the telescoping shaft portion 590 includes the extendable portion 598 that is moveable with respect to the base portion 596 thereof, and the motor/transmission/actuator facilitates movement of the first support plate 640 and the second support plate 642 is relative to the third support plate 644 and the main beam 404.

Figure 35:
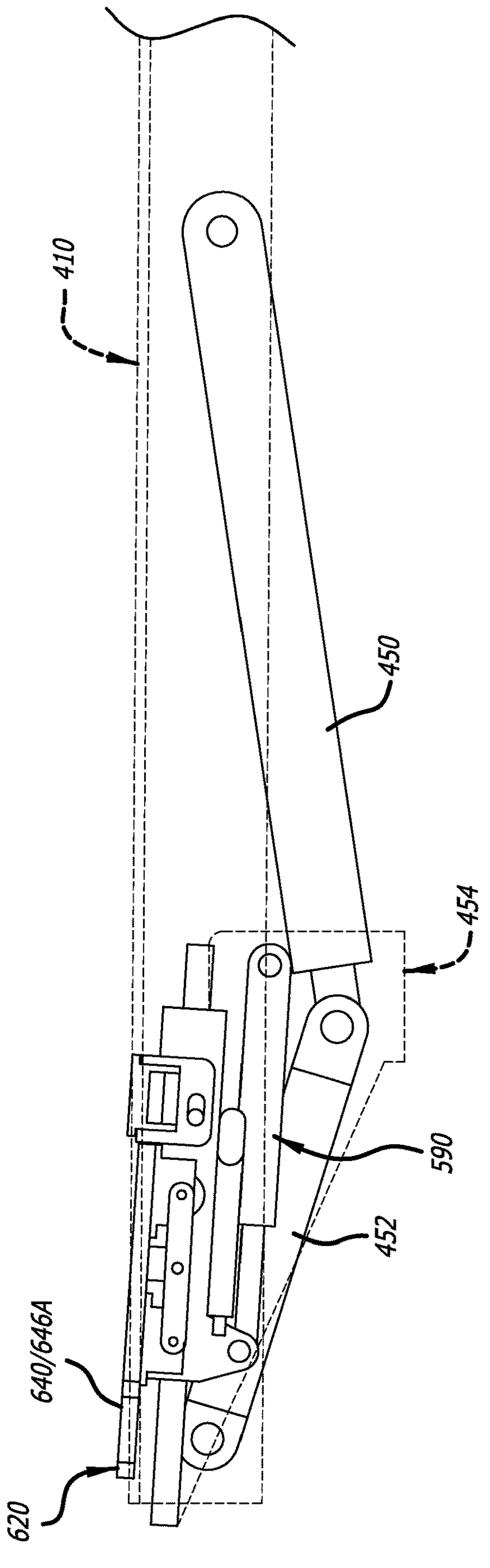
FIG. 35 is a side elevational view that illustrates the reconfigurable upper leg support of FIG. 31 with a first arm portion, a first telescoping shaft portion, and a second telescoping shaft portion adjusted to position the upper leg support in a first position.
Figure 37:
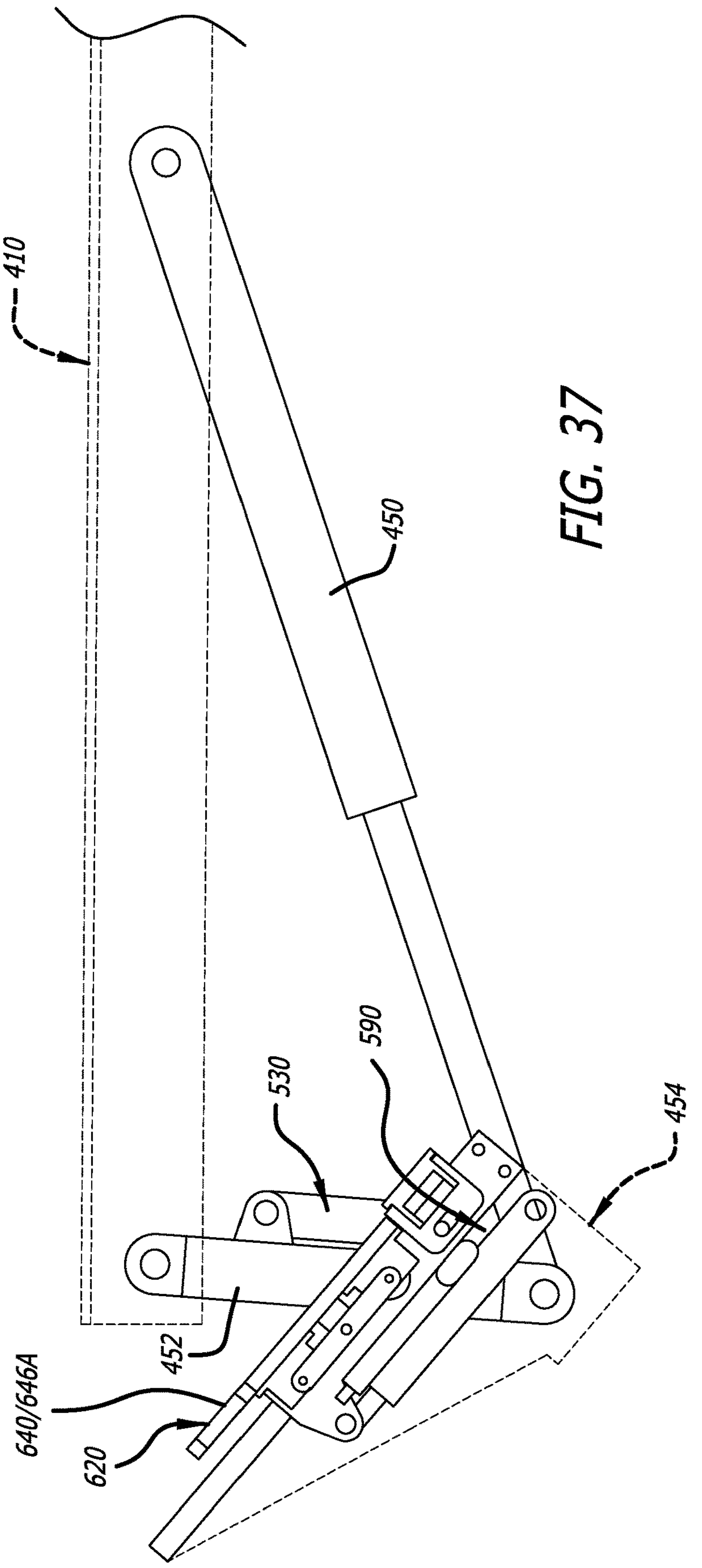
FIG. 37 is a side elevational view that illustrates the reconfigurable upper leg support of FIG. 31 with the first arm portion, the first telescoping shaft portion, and the second telescoping shaft portion adjusted to position the upper leg support in a second position.

Such reconfiguration of the upper leg support 402 can be actuated using the manual adjustment and/or the controlled automation, and as discussed below, the extension and retraction of the extendable portion 472, the extendable portion 538, and the extendable portion 598, as depicted in FIGS. 35 and 37, for example, via such actuation can be used to both adjust the adjustable center of rotation CR to accommodate patients having different body sizes, and to facilitate flexing of the lumbar spine to afford surgical access thereto via the manipulation of portions thereof. The extension/retraction of the extendable portion 472 serves to change the angle of the first arm portion 450 and the second arm portion 452 relative to one another, the extension/retraction of the extendable portion 538 serves to change the angle of the platform portion 454 relative to the second arm portion 452, and the extendable portion 598 serves to change position of the bracket 576 (which supports the first support plate 640, the second support plate 642, and the third support plate 644) relative to the platform portion 454.

Using the upper leg support 402, the position of the patient's upper legs can be altered, which correspondingly affects the flexure of the lumbar spine of the patient P, and care should be taken to prevent unwanted torsion thereof when manipulating the patient's spine. To illustrate, the amounts of extension/retraction of the extendable portion 472, the extendable portion 538, and the extendable portion 598 can be constrained with respect to one another to prevent unwanted torsion of the lumbar spine during articulation of the upper leg support 402. As such, the amounts of extension/retraction of the extendable portion 472, the extendable portion 538, and the extendable portion 598 can be contingent upon one another to facilitate such approximate preservation.

A controller (not shown) with a user interface (not shown) can be used to control the constrained/contingent extension and/or retraction of the extendable portion 472, the extendable portion 538, and the extendable portion 598 via the controlled automation. Furthermore, because patients' heights can vary, the amounts of extension/retraction of the extendable portion 472, the extendable portion 538, and the extendable portion 598 can be altered to accommodate these different heights while still being constrained/contingent upon one another to provide for the desired amount of distraction/compression of portions of the lumbar spine during articulation of the upper leg support 402.

The controller with input via the user interface can allow the user to select the desired center of rotation and the desired amount of manipulation or angulation of the segmental portions of the lumbar spine. To illustrate, the user interface can be used to display a graphical or actual representation of the patient's spine, and the user interface can permit the user to input the desired center of rotation and the desired amount of manipulation by, for example, highlighting a portion of the graphical or actual representation of the patient's spine on the user interface. The selection of the desired amount of manipulation can allow the user to select where the forces applied via the actuation of the extendable portion 472, the extendable portion 538, and the extendable portion 598 are applied during flexure of the patient's spine. In addition to or alternatively to use of the user interface, a navigation tool interconnected with the controller and/or the user interface can be positioned on or adjacent the patient's spine to facilitate inputting of the desired center of rotation and the desired amount of manipulation. The inputting of the desired center of rotation and the desired amount of manipulation can be done with the main beam 404 and the patient P supported on the main beam 404 in various rotational positions including, but not limited to, prone, lateral, and supine positions.

When the upper leg support 402 is articulated such that the lumbar spine of the patient P is in an unflexed neutral position, as depicted in FIG. 36, the controller can be used to extend/retract the extendable portion 472 (of the first arm portion 450), the extendable portion 538 (of the telescoping shaft portion 530), and the extendable portion 598 (of the telescoping shaft portion 590) such that the first arm portion 450, the telescoping shaft portion 530, and the telescoping shaft portion 590 have lengths of 24.862, 8.639, and 11.963 inches, respectively, that accommodate the height of the patient P. Furthermore, when the upper leg support 402 is articulated such that the lumbar spine of the patient P has a 30 degree flex, as depicted in FIG. 38, the controller can be used to extend/retract the extendable portion 472 (of the first arm portion 450), the extendable portion 538 (of the telescoping shaft portion 530), and the extendable portion 598 (of the telescoping shaft portion 590) such that the first arm portion 450, the telescoping shaft portion 530, and the telescoping shaft portion 590 have lengths of 40.375, 6.652, and 9.540 inches, respectively, that flex the lumbar spine of the patient P to afford surgical access thereto. Moreover, during the transition between the positions of FIGS. 36 and 38, the controller can serve to prevent unwanted torsion of the lumbar spine during articulation of the upper leg support 402 by properly adjusting the amounts of extension/retraction of the extendable portion 472, the extendable portion 538, and the extendable portion 598.

FIG. 39, for example, includes a table that illustrates the relative amounts of increase/decrease of the lengths of the first arm portion 450 (Cylinder 1), the telescoping shaft portion 530 (Cylinder 2), and the telescoping shaft portion 590 (Cylinder 3) via extension/retraction of the extendable portion 472, the extendable portion 538, and the extendable portion 598 for a patient P having a height of 6'3". As such, the upper leg support 402 provides an adjustable center of rotation CR located in the lumbar spine to accommodate patients having different body sizes, and also to afford surgical access to the lumbar spine via manipulation of portions thereof.

Thus, using the user interface of the controller, the operator of the surgical frame 400 can input the height of the patient P, and input the desired degree of flexure of the lumbar spine, and the controller can actuate the first arm portion 450 (to extend or retract the extendable portion 472), the telescoping shaft portion 530 (to extend or retract the extendable portion 538), and the telescoping shaft portion 590 (to extend or retract the extendable portion 598) the appropriate amounts to provide such flexion, while also preventing unwanted torsion of the patient's spine. As discussed above, the extension/retraction of the extendable portion 472 serves to change the angle of the first arm portion 450 and the second arm portion 452 relative to one another, the extension/retraction of the extendable portion 538 serves to change the angle of the platform portion 454 relative to the second arm portion 452, and the extendable portion 598 serves to change position of the bracket 576 (which supports the first support plate 640, the second support plate 642, and the third support plate 644) relative to the platform portion 454. During such manipulation of the patient's spine using the upper leg support 402, the lengths of the first arm portion 450, the telescoping shaft portion 530, and the telescoping shaft portion 590 may each alternatingly increase/decrease or decrease/increase to provide for the desired adjustable center of rotation CR. The operator can use the controller to manipulate the upper leg support 402 to flex the lumbar spine of the patient P into position for surgery, while simultaneously inhibiting the unwanted torsion of the patient's spine that may be caused by reconfiguration of the upper leg support 402.

A portion of a surgical frame 1400 incorporating an upper leg support 1402 in accordance with a second embodiment of the present disclosure is described hereinbelow. The surgical frame 1400 can incorporate the features of the above-discussed surgical frames, and the upper leg support 1402 can also be incorporated in the above-discussed surgical frames. As discussed below, the upper leg support 1402 is reconfigurable such reconfiguration can be done via articulation using manual adjustment or controlled automation of the componentry thereof. In addition to the upper legs of the patient P, the upper leg support 1402 can be used to at least partially support the pelvic area of the patient P, and to facilitate manipulation of the lumbar spine of the patient P.

Like the surgical frames 10 and 300, the surgical frame 1400 can serve as an exoskeleton to support the body of the patient P as the patient's body is manipulated thereby. In doing so, the surgical frame 1400 serves to support the patient P such that the patient's spine does not experience unnecessary stress/torsion.

Like the surgical frame 300, the surgical frame 1400 can include a translating beam 302 and a support structure 304 having a support platform 306 incorporating the translating beam 302. Besides the support platform 306, the support structure 304 can include a first vertical support portion 308A and a second vertical support portion 308B. The first vertical support portion 308A and the second vertical support portion 308B are capable of expansion and contraction.

As depicted in FIGS. 40-44, the surgical frame 1400 also incorporates a main beam 1404 having a first end 1405A attached relative to the first support portion 308A and a second end 1405B attached relative to the second support portion 308A. Like in the surgical frame 300, the main beam includes a first portion 1406 at the first end 1405A, a second portion (not shown) at the second end 1405B, and a third portion 1410 extending between the first portion 1406 and the second portion. The main beam 1404 is similar to the offset main beam 12, and, as discussed below, the main beam 1404 can incorporate features associated with the offset main beam 12. To illustrate, the offset main beam 1404, like the main beam 12, is used in supporting the patient P on the surgical frame 1400 and includes various components similar to those incorporated in the surgical frames 10 and 300. For example, in addition to the upper leg support 1402, the main beam 1404 can incorporate a head support (not shown), a chest support 1412, arm supports (not shown), and a lower leg support 1416. The upper leg support 1402, the chest support 1412, the arm supports, and the lower leg support 1416 can be attached to the third portion 1410 of the main beam 1404.

An operator such as a surgeon can control actuation of the various support components to manipulate the position of the patient's body. Soft straps (not shown) are used with these various support components to secure the patient P to the frame and to enable either manipulation or fixation of the patient P. Furthermore, reusable soft pads can be used on the load-bearing areas of the various support components. Additionally, the main beam 1404 can be rotated a full 360° before, during, and even after surgery to facilitate various positions of the patient P to afford various surgical pathways to the patient's spine depending on the surgery to be performed. For example, the main beam 1404 can be positioned by the surgical frame 1400 to place the patient P in a prone position, lateral positions, and in a position 45° between the prone and lateral positions.

The surgical frame 1400 can be used to facilitate access to different parts of the spine of the patient P. In particular, the surgical frame 1400 can be used to facilitate access to portions of the patient's lumbar spine. To illustrate, the patient P is simultaneously supported by the chest support 1412 and the upper leg support 1402 on the main beam 1404, and uninterrupted access is provided to portions of the patient's lumbar spine by the positions of the chest support 1412 and the upper leg support 1404. The upper leg support 402 can be used to support the patient P during rotation of the main beam 1404, and articulation of the other componentry of the surgical frame 1400. Furthermore, the upper leg support 1402 is actuatable to facilitate positioning and repositioning of the patient P before, during, and after surgery to manipulate the patient P about an adjustable center of rotation CR located in the lumbar spine. As discussed below, the adjustable center of rotation CR is both adjustable to accommodate patients having different body sizes, and adjustable to facilitate flexing of the lumbar spine to facilitate surgical access thereto via the manipulation of portions thereof.

The main beam 1404 is moveably attached relative to the first vertical support post 308A and the second vertical support post 308B. Like those of the surgical frames 10 and 300, the first vertical support post 308A and the second vertical support post 308B of the surgical frame 1400 each include a clevis (not shown) supporting componentry facilitating rotation of the main beam 1404. In addition to the clevis, the first vertical support post 308A includes a support block portion (not shown), a pin portion (not shown) pivotally attaching the support block portion to the clevis, and an axle portion (not shown) rotatably supported by the support block and interconnected to the first portion 1406 at the first end 1405A of the main beam 1404. The support block portion, via interaction of the pin portion with the clevis, is capable of pivotal movement relative to the clevis to accommodate different heights for the first vertical support post and the second vertical support post. And the main beam 1404, via interaction of the axle portion with the support block portion, is capable of rotational movement relative to the support block portion to accommodate rotation of the patient P supported by the main beam 1404.

Furthermore, in addition to the clevis, the second vertical support post 308B includes a coupler (not shown) and a pin portion (not shown) pivotally attaching the coupler to the clevis. The coupler includes a base portion (not shown) that is pinned to the clevis with the pin portion, a body portion (not shown) that includes a transmission (not shown), a motor (not shown) that drives the transmission in the body portion, and a head portion (not shown) that is rotatable with respect to the body portion and driven rotationally by the transmission via the motor. The head portion is interconnected with the second portion at the second end 1405B of the main beam 1404, and the head portion (via the transmission and the motor) can rotate the main beam 1404 a full 360° before, during, and even after surgery to facilitate various positions of the patient P.

As depicted in FIGS. 40-46, the upper leg support 1402 can be attached to and incorporated into portions of the third portion 1410 of the main beam 1404. The upper leg support 1402, as depicted in FIGS. 42-46, can include a first arm portion 1450, a second arm portion 1452, and a platform portion 1454. The first arm portion 1450 includes a first end portion 1460 and a second end portion 1462, and the second arm portion 1452 includes a first end portion 1464 and a second end portion 1466. The first end portion 1460 and the second end portion 1462 of the first arm portion 1450 are pivotally attached, respectively, to the main beam 1404 and the first end portion 1464 of the second arm portion 1452, and the first end portion 1464 and the second end portion 1466 of the second arm portion 1452 are pivotally attached, respectively, to the second end portion 1466 of the first arm portion 1450 and the main beam 1404.

The first arm portion 1450 is extendable, and includes a base portion 11470 that includes the first end portion 1460 and an extendable portion 1472 that includes the second end portion 1462. The extendable portion 1472 is moveable inwardly and outwardly relative to the base portion 1470, and such inward and outward movement serves to pivot the first arm portion 1450 relative to the main beam 1404, pivot the first arm portion 1450 and the second arm portion 1452 relative to one another, and pivot the second arm portion 1452 relative to the main beam 1404. As discussed below, such pivotal movement serves in facilitating positioning and repositioning of the platform portion 1454 relative to the main beam 1404. To illustrate, increasing the amount of extension of the extendable portion 1472 relative to the base portion 1470 moves the platform portion 1454 away from the third portion 1410 of the main beam 1404, and toward the first end 1405A and away from the second end 1405B.

Figure 42:
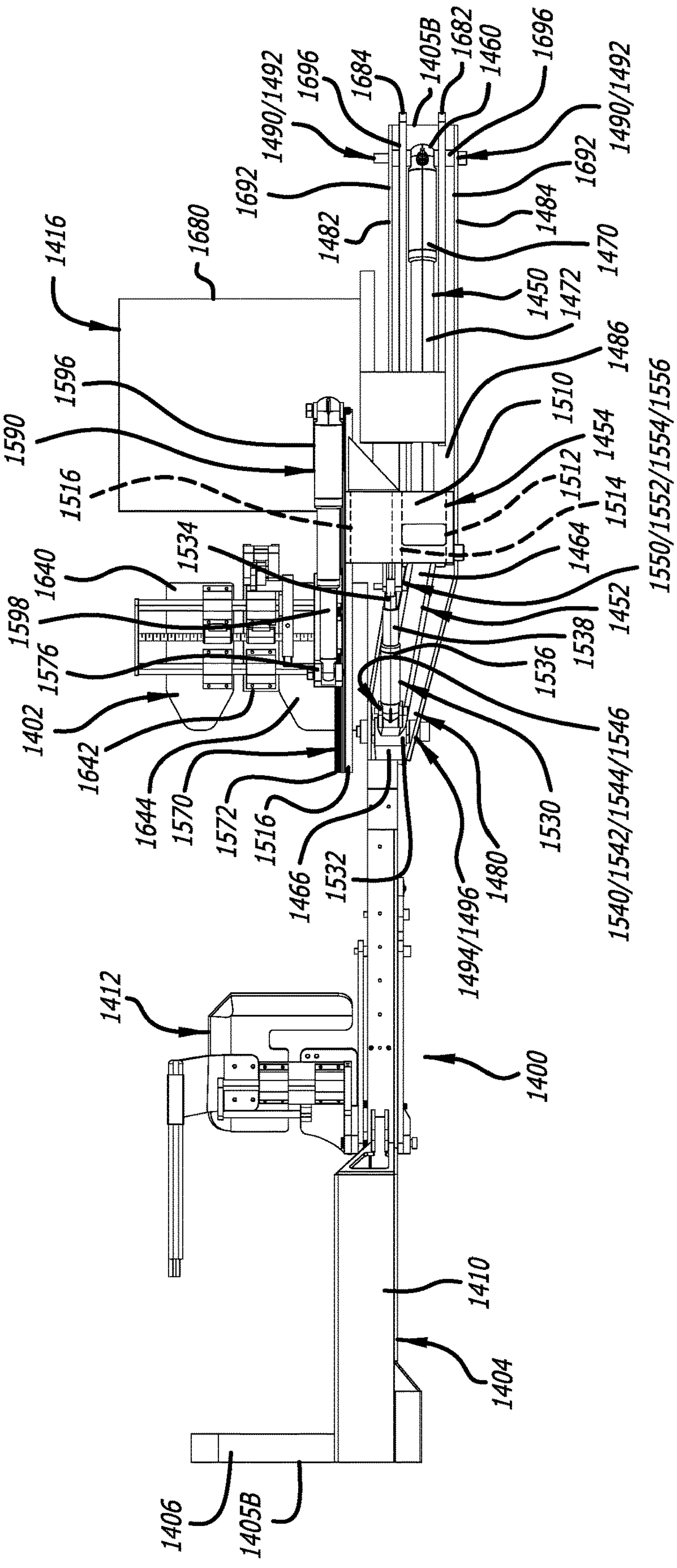
FIG. 42 is a bottom plan view that illustrates the reconfigurable upper leg support of FIG. 40 relative to the main beam.
Figure 44:
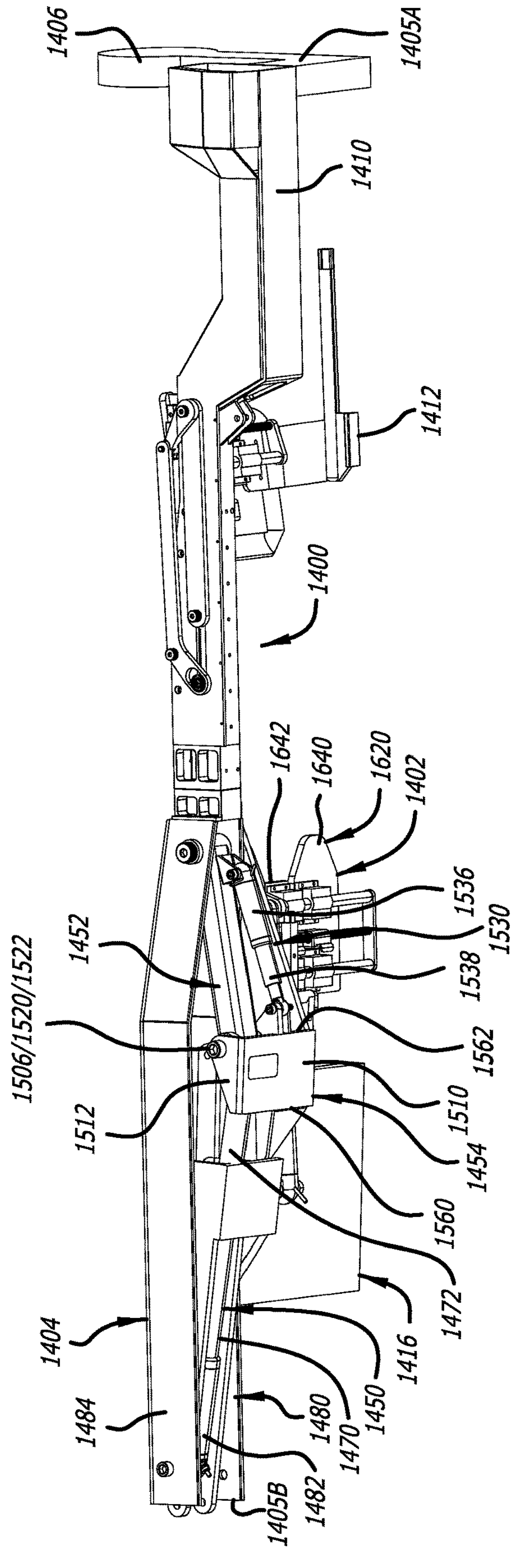
FIG. 44 is a side, bottom perspective view that illustrates the reconfigurable upper leg support of FIG. 40 relative to the main beam.
Figure 45:
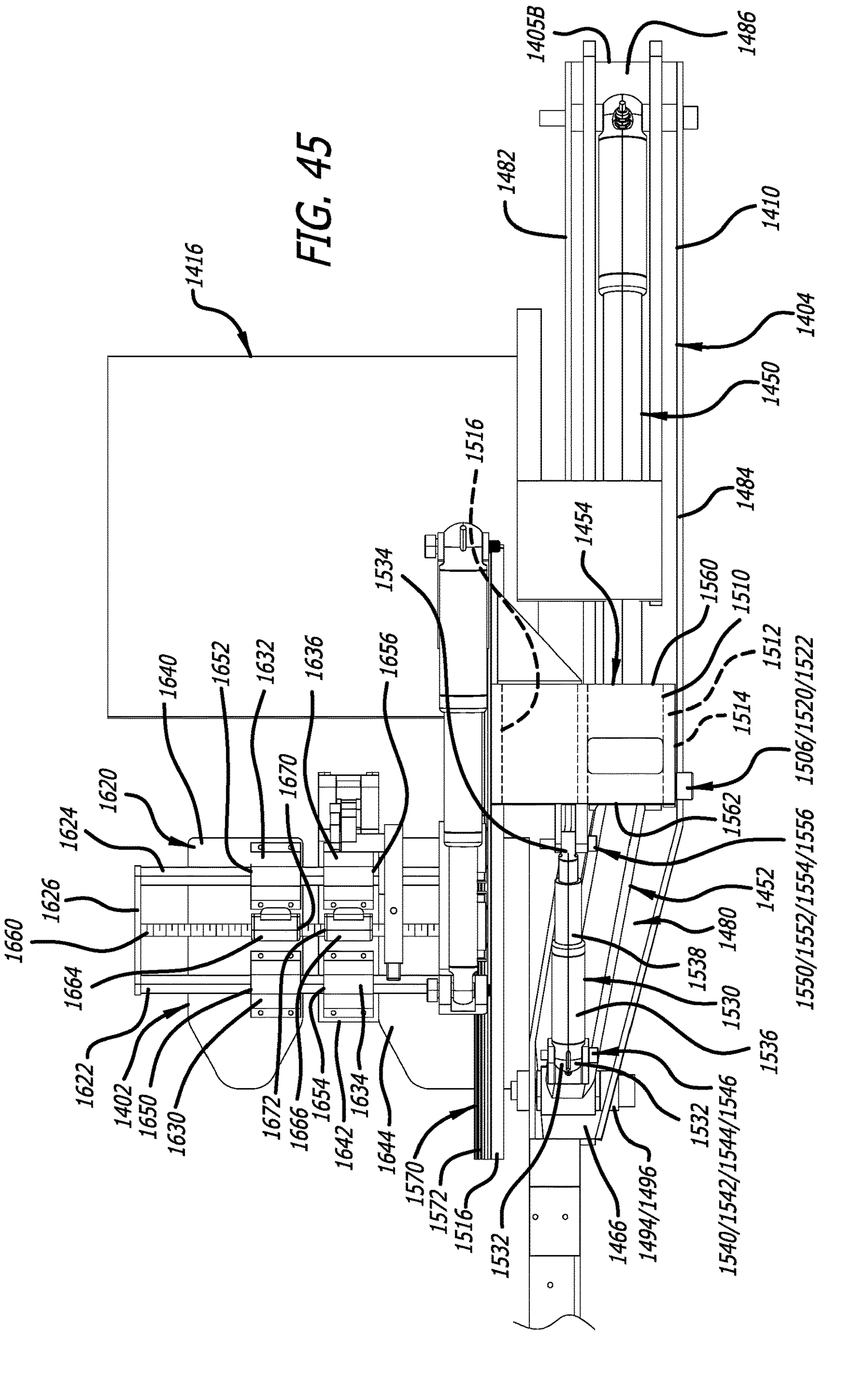
FIG. 45 is an enlarged, bottom plan view that illustrates the reconfigurable upper leg support of FIG. 40 relative to the main beam.

The third portion 1410 includes an interior cavity 1890 defined by a first sidewall portion 1482, a second sidewall portion 1484, and a connecting-wall portion 1486 joining the first sidewall portion 1482 and the second sidewall portion 1484 to one another. As depicted in FIGS. 42, 44, and 45, portions of the upper leg support 1402 are received within the interior cavity 1480. To illustrate, the first end portion 1460 of the first arm portion 1450 and the second end portion 1466 of the second arm portion 1452 are received with the cavity 1480.

Figure 43:
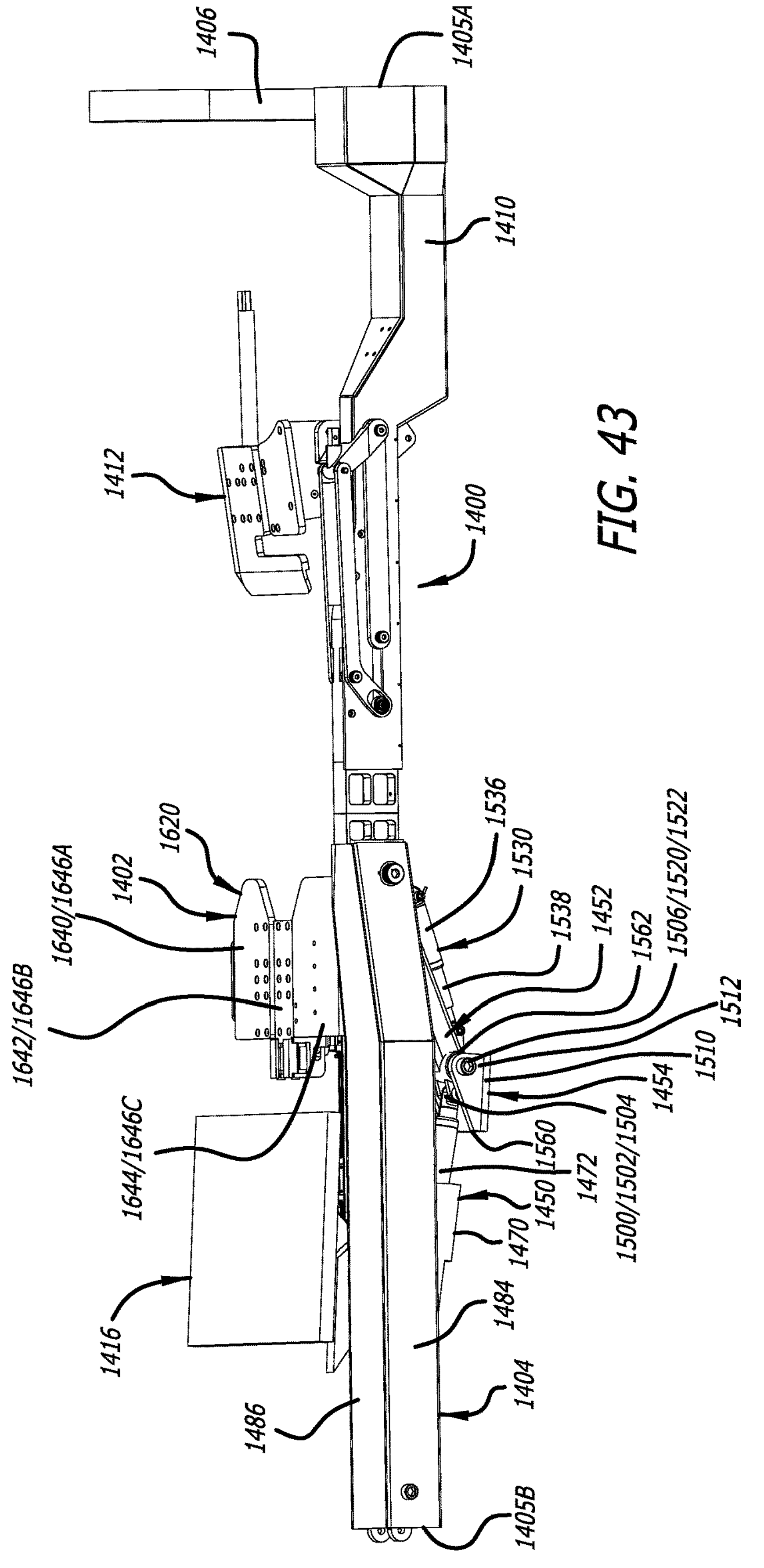
FIG. 43 is a side, top perspective view that illustrates the reconfigurable upper leg support of FIG. 40 relative to the main beam.

The first end portion 1460 of the first arm portion 1450 includes an aperture 1490 for receiving a pin 1492 extending between the first sidewall portion 1482 and the second sidewall portion 1484 to facilitate pivotal attachment of the first arm portion 1450 to the main beam 1404, and the second end portion 1466 of the second arm portion 1452 includes an aperture 1494 for receiving a pin 1496 extending between the first sidewall portion 1482 and the second sidewall portion 1484 to facilitate pivotal attachment of the second arm portion 1452 to the main beam 1404. Furthermore, the second end portion 1462 of the first arm portion 1450 and the first end portion 1464 of the second arm portion 1452 can form a clevis-tang joint, wherein one of the second end portion 1462 and the first end portion 1464 is a clevis, and the other of the second end portion 1462 and the first end portion 1464 is a tang. As depicted in FIG. 43, the second end portion 1462 is configured as a tang with an aperture 1500 extending therethrough, and the first end portion 1464 is configured as a clevis with apertures 1502 extending therethrough. The aperture 1500 and the apertures 1502 are configured to receive a pin 1504, as depicted in FIG. 42, to facilitate pivotal attachment of the first arm portion 1450 and the second arm portion 1452 to one another.

Additionally, a pin 1506 is used in facilitating attachment of the platform portion 1454 to the second arm portion 1452. As depicted in FIGS. 42 and 45, the platform portion 1454 includes a base portion 1510, a first upstanding portion 1512, a second upstanding portion 1514, and a third upstanding portion 1516. Portions of the second end portion 1462 of the first arm portion 1450 and the first end portion 1464 of the second arm portion 1450 are received between the first upstanding portion 1512 and the second upstanding portion 1514. The first upstanding portion 1512 includes an aperture 1520, the second upstanding portion 1514 includes an aperture 1522, and each of the first aperture 1520 and the second aperture 1522 are configured to receive portions of the pin 1506 to attach the first end portion 1464 of the second arm portion 1452 to platform portion 1454.

The extension of the extendable portion 1472 relative to the base portion 1470 serves in pivoting the first arm portion 1450 and the second arm portion 1452 relative to one another such that increasing the amount of extension decreases an angle between the first arm portion 1450 and the second arm portion 1452, and decreasing the amount of extension increases the angle between the first arm portion 1450 and the second arm portion 1452. Given that the platform portion 1454 is attached to the first end portion 1464 of the second arm portion 1452, increasing the amount of extension of the first arm portion 1450 moves the platform portion 1454 away from the third portion 1410 of the main beam 1404, and toward the first end 1405A and away from the second end 1405B, and decreasing the amount of extension of the first arm portion 1450 moves the platform portion 1454 toward the third portion 1410 of the main beam 1404, and away from the first end 1405A and toward the second end 14056. As discussed below, the movement of the platform portion 1454 using the extension of the extendable portion 1472 ultimately serves in adjusting the position of the patient's spine. Such adjustment can occur before, during, and/or after surgery using the surgical frame 1400.

As depicted in FIGS. 42-45, the upper leg support 1402 also includes a telescoping shaft portion 1530 that is connected between the second arm portion 1452 and the platform portion 1454. The telescoping shaft portion 1530 is used to pivot the platform portion 1454 relative to the second arm portion 1452. The telescoping shaft portion 1530 includes a first end portion 1532, a second end portion 1534, a base portion 1536 including the first end portion 1532, and an extendable portion 1538 including the second end portion 1534. As discussed below, the extendable portion 1538 is moveable inwardly and outwardly relative to the base portion 1536, and such inward and outward movement serves to pivot the platform portion 1454.

To facilitate connection between the telescoping shaft portion 1530 and the second arm portion 1452, one of the first end portion 1532 and the second arm portion 1452 can form a clevis, and the other of the first end portion 1532 and the second arm portion 1452 can form a tang. Furthermore, to facilitate connection between the telescoping shaft portion 1530 and the platform portion 1454, one of the second end portion 1534 and the platform portion 1454 can form a clevis, and the other of the second end portion 1534 and the platform portion 1454 can form a tang. As depicted in FIGS. 42 and 45, the second arm portion 1452 includes a clevis 1540 having apertures 1542, the first end portion 1532 is used as a tang having an aperture 1544, and a pin 1546 is received through the apertures 1542 and 1544 to join the telescoping shaft portion 1530 to the second arm portion 1542. Furthermore, as depicted in FIGS. 42 and 45, the platform portion 1454 includes a clevis 1550 having apertures 1552, the second end portion 1534 is used as a tang having an aperture 1554, and a pin 1556 is received through the apertures 1552 and 1554 to join the telescoping shaft portion 1530 to the platform portion 1454.

The extendable portion 1538 is moveable inwardly and outwardly relative to the base portion 1536, and such inward and outward movement serves to pivot the platform portion 1454 relative to the second arm portion 1452. Such pivotal movement serves in facilitating positioning and repositioning of the platform portion 1454 relative to the second arm portion 1452. To illustrate, the base portion 1510 of the platform portion 1454 includes a first end 1560 and a second end 1562, and increasing the amount of extension of the extendable portion 1538 relative to the base portion 1536 moves the second end 1562 away from the third portion 1410 of the main beam 1404. As discussed below, the movement of the platform portion 1454 using the extension of the telescoping shaft portion 1530 ultimately serves in adjusting the position of the patient's spine. Such adjustment can occur before, during, and/or after surgery using the surgical frame 1400.

Figure 46:
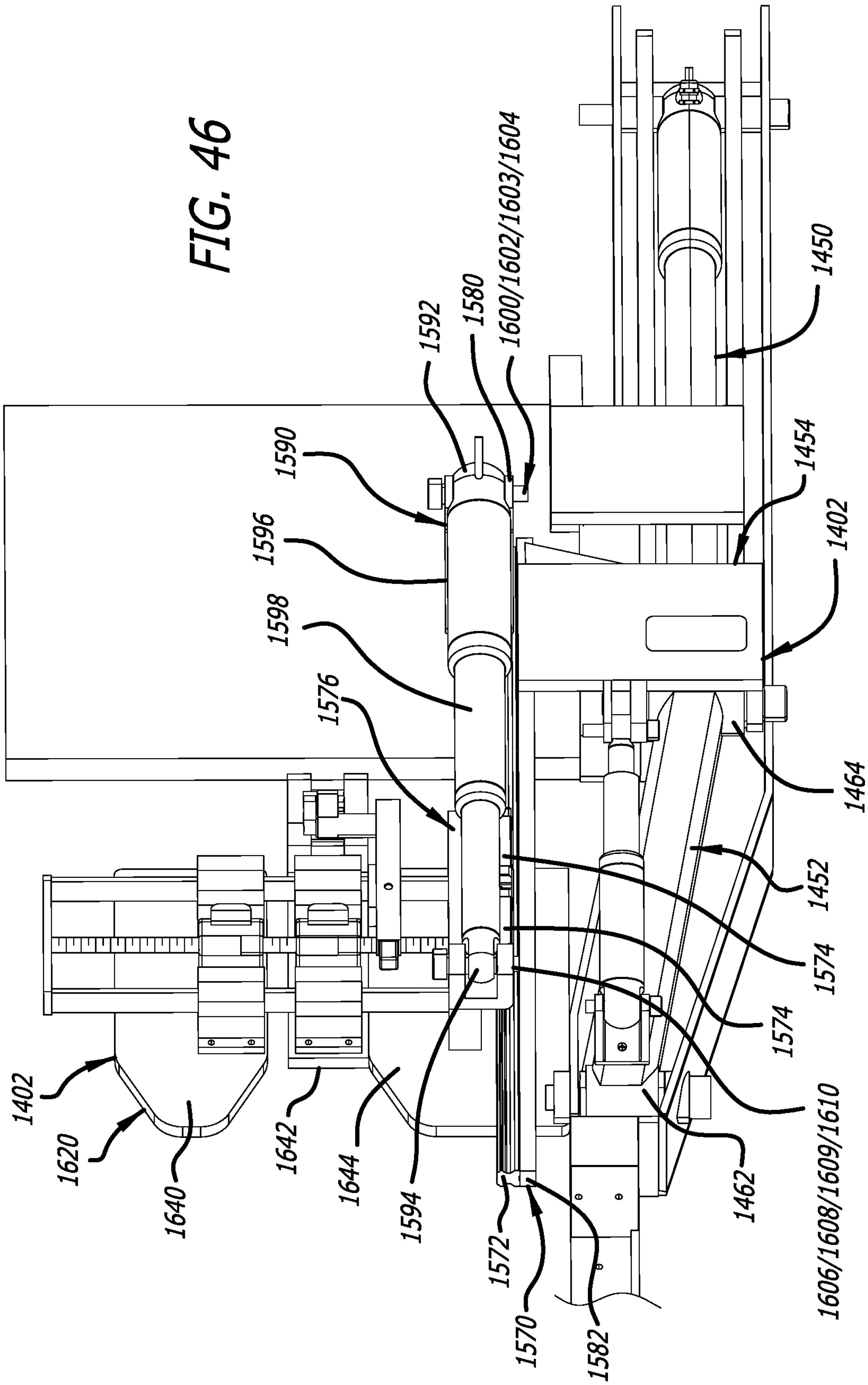
FIG. 46 is an enlarged, bottom perspective view that illustrates the reconfigurable upper leg support of FIG. 40 relative to the main beam.

As depicted in FIGS. 45 and 46, the upper leg support 1402 also includes a linear movement assembly 1570. The linear movement assembly 1570 includes a track portion 1572 attached to the third upstanding portion 1516, two trucks 1574 moveable along the track portion 1572, and a support bracket 1576 attached to the two trucks 1574. The third upstanding portion 1516, as depicted in FIG. 46, includes a first end 1580 and a second end 1582, and is larger than the first upstanding portion 1512 and the second upstanding portion 1514. The third upstanding portion 1516 is attached at and adjacent the first end 1580 to the base portion 1510, and extends from the base portion 510 toward the first portion 1406 of the main beam 1404 to the second end 1582. The third upstanding portion 1516 supports the track portion 1572, the two trucks 1574, the support bracket 1576, and additional components of the upper leg support 1402.

The linear movement assembly 1570 also includes a telescoping shaft portion 1590 that is connected between the third upstanding portion 1516 and the support bracket 1576. The telescoping shaft portion 1590 includes a first end portion 1592, a second end portion 1594, a base portion 1596 including the first end portion 1592, and an extendable portion 1598 including the second end portion 1594. To attach the telescoping shaft portion 1590 to the third upstanding portion 1516, the first end portion 1592 of the base portion 1596 can include an aperture 1600, the third upstanding portion 1516 can include a clevis 1602 with apertures 1603, and a pin 1604 can be received in the apertures 1600 and 1603. Furthermore, to attach the telescoping shaft portion 1590 to the support bracket 1576, the second end portion 1594 of the extendable portion 1598 can include an aperture 1606, the support bracket 1576 include a clevis 1608 with apertures 1609, and a pin 1610 can be received in the apertures 1606 and 1609.

The extendable portion 1598 is moveable inwardly and outwardly relative to the base portion 1596, and such inward and outward movement relative to the base portion 1596 serves to move the support bracket 1576 via movement of the two trucks 1574 along the track portion 1572 between at least a first position closer to the second end 1582 of the third upstanding portion 1516 to a second position closer to the first end 1580 of the third upstanding portion 1516. As discussed below, the movement of the support bracket 1576 using the extension of the extendable portion 1598 ultimately serves in adjusting the position of the patient's spine. Such adjustment can occur before, during, and/or after surgery using the surgical frame 1400.

The upper leg support 1402 also includes a support assembly 1620 that is carried by the support bracket 1576. The support assembly 1620 includes a first support post 1622, a second support post 1624, and a connecting bracket 1626 connecting the first support post 1622 and the second support post 1624 to one another. The support assembly 1620 also includes a first support block 1630, a second support block 1632, a third support block 1634, a fourth support block 1636, a first support plate 1640, a second support plate 1642, and a third support plate 1644. Each of the first support plate 1640, the second support plate 1642, and the third support plate 1644 include upper surfaces 1646A, 1646B, and 1646C, respectively, that can be used to contact the upper legs of the patient. The upper surfaces 1646A and 1646C can be covered with padding (not shown) for contacting portions of the patient's upper legs, and the padding can include pressure sensors (not shown) incorporated therein. The resulting pressure sensing padding can be used to determine if undue stress is placed on the patient P via articulation of the upper leg support 1402.

The first support plate 1640 and the second support plate 1642, as discussed below, are moveable with respect to the support bracket 1576 and the third support plate 1644. As depicted in FIG. 46, the third support plate 1644 is attached to the support bracket 1576, and the second support plate 1642 is positioned such that it can move underneath the third support plate 1644. As such, during movement of the first support plate 1640 and the second support plate 1642, the area defined by the upper surfaces 1646A, 1646B, and 1646C can be respectively decreased or increased as the second support plate 1642 is moved under or out from under the third support plate 1644.

As depicted in FIG. 45, the first support plate 1640 is attached to the first support block 1630 and the second support block 1632, and the first support block 1630 is moveable along the first support post 1622 and the second support block 1632 is moveable along the second support post 1624. Furthermore, the second support plate 1642 is attached to the third support block 1634 and the fourth support block 1636, and the third support block 1634 is moveable along the first support post 1622 and the fourth support block 1636 is moveable along the second support post 1624.

The first and second support blocks 1630 and 1632 include apertures 1650 and 1652 for receiving the first and second support posts 1622 and 1624, respectively, and the third and fourth support blocks 1634 and 1636 include apertures 1654 and 1656 for receiving the first second support posts 1622 and 1624, respectively. The first support plate 1640 and the second support plate 1642 are moveable inwardly and outwardly relative to the support bracket 1576 and the third support plate 644 via movement of the first and third support blocks 1630 and 1634 on the first support post 1622 and via movement of the second and fourth support blocks 1632 and 1636 on the second support post 1624.

The support assembly 1620 also includes a threaded shaft 1660 that is retained in position between the support bracket 1576 and the connecting bracket 1626. As discussed below, the threaded shaft 1660 is used to constrain movement of the first support plate 1640 and the second support plate 1642 relative to the third support plate 644 and the main beam 1404.

Furthermore, the first support plate 1640 includes a first support collar 1664 opposite from the upper surface 1646A, and the second support plate 1642 includes a second support collar 1666 opposite from the upper surface 1646B. The first support collar 1664 includes a first aperture 1670 that can include threads complementary to those of the threaded shaft 1660, and the second support collar 1666 includes a second aperture 1672 that can include threads complementary to those of the threaded shaft 1660. The threaded shaft 1660 can be received in the first aperture 1670 and the second aperture 1672. The first support collar 1664 and the second support collar 1666 can include one or more latches (not shown) that can be engaged and disengaged from the threaded shaft 1660 via actuation thereof. The one or more latches can be attached to the first support collar 1664 and/or the second support collar 1666, and a user can actuate the one or more latches to engage or disengage the threaded shaft 1660 to correspondingly prevent movement or allow movement of the first support collar 1664 and the second support collar 1666 along the threaded shaft 1660. When the one or more latches are engaged, the interactions of the one or more latches with the threaded shaft 1660 prevent movement of the first support plate 1640 and the second support plate 1642 relative to the third support plate 1644. When the one or more latches are disengaged, the first support plate 1640 and the second support plate 1642 can move relative to the third support plate 1644. Rather than using the threaded shaft 1660, a shaft with catches and/or teeth to which the one or more latches can be engaged and disengaged.

Alternatively, a motor/transmission/actuator (not shown) can be used to facilitate rotation of the threaded shaft 1660, and rotation of the threaded shaft 1660 and the interaction in the first aperture 1670 and the second aperture 1672 causes corresponding movement of the first support plate 1640 and the second support plate 1642. As such, rotation of the threaded shaft 1660 via actuation of the motor/transmission/actuator is translated into movement of the first support plate 1640 and the second support plate 1642. To illustrate, the threads of the threaded shaft 1660, the first aperture 1670, and the second aperture 1672 can be configured such that clockwise rotation of the threaded shaft 1660 via actuation of the motor/transmission/actuator causes inward movement of the first support plate 1640 and the second support plate 1642, and counterclockwise rotation of the threaded shaft 1660 via actuation of the motor/transmission/actuator causes outward movement of the first support plate 1640 and the second support plate 1642. The inward and outward movement of the first support plate 1640 and the second support plate 1642 is relative to the third support plate 1644 and the main beam 1404.

The movement of the first support plate 1640 and the second support plate 1642 ultimately serves in adjusting a total width of a combination of the first support plate 1640, the second support plate 1642, and the third support plate 1644. Adjustment of the combined width of the first support plate 1640, the second support plate 1642, and the third support plate 1644 affords the accommodation of differently sized patients on the upper leg support 1402.

The movement of the componentry of the upper leg support 1402 can be effectuated via manual adjustment and/or controlled automation. To illustrate, the first arm portion 1450 includes the extendable portion 1472 that is moveable with respect to the base portion 1470 thereof, the telescoping shaft portion 1530 includes the extendable portion 1538 that is moveable with respect to the base portion 1536 thereof, the telescoping shaft portion 1590 includes the extendable portion 1598 that is moveable with respect to the base portion 1596 thereof, and the motor/transmission/actuator facilitates movement of the first support plate 1640 and the second support plate 1642 is relative to the third support plate 1644 and the main beam 1404.

Such reconfiguration of the upper leg support 1402 can be actuated using the manual adjustment and/or the controlled automation, and as discussed below, the extension and retraction of the extendable portion 1472, the extendable portion 1538, and the extendable portion 1598 via such actuation can be used to both adjust the adjustable center of rotation CR to accommodate patients having different body sizes, and to facilitate flexing of the lumbar spine to afford surgical access thereto via manipulation of portions thereof. The extension/retraction of the extendable portion 1472 serves to change the angle of the first arm portion 1450 and the second arm portion 1452 relative to one another, the extension/retraction of the extendable portion 1538 serves to change the angle of the platform portion 1454 relative to the second arm portion 1452, and the extendable portion 1598 serves to change position of the bracket 1576 (which supports the first support plate 1640, the second support plate 1642, and the third support plate 1644) relative to the platform portion 1454.

Using the upper leg support 1402, the position of the patient's upper legs can be altered, which correspondingly affects the flexure of the lumbar spine of the patient P, and care should be taken to prevent unwanted torsion thereof when manipulating the patient's spine. To illustrate, the amounts of extension/retraction of the extendable portion 1472, the extendable portion 1538, and the extendable portion 1598 can be constrained with respect to one another to prevent unwanted torsion of the lumbar spine during articulation of the upper leg support 1402. As such, the amounts of extension/retraction of the extendable portion 1472, the extendable portion 1538, and the extendable portion 1598 can be contingent upon one another to facilitate such approximate preservation.

Figure 48:
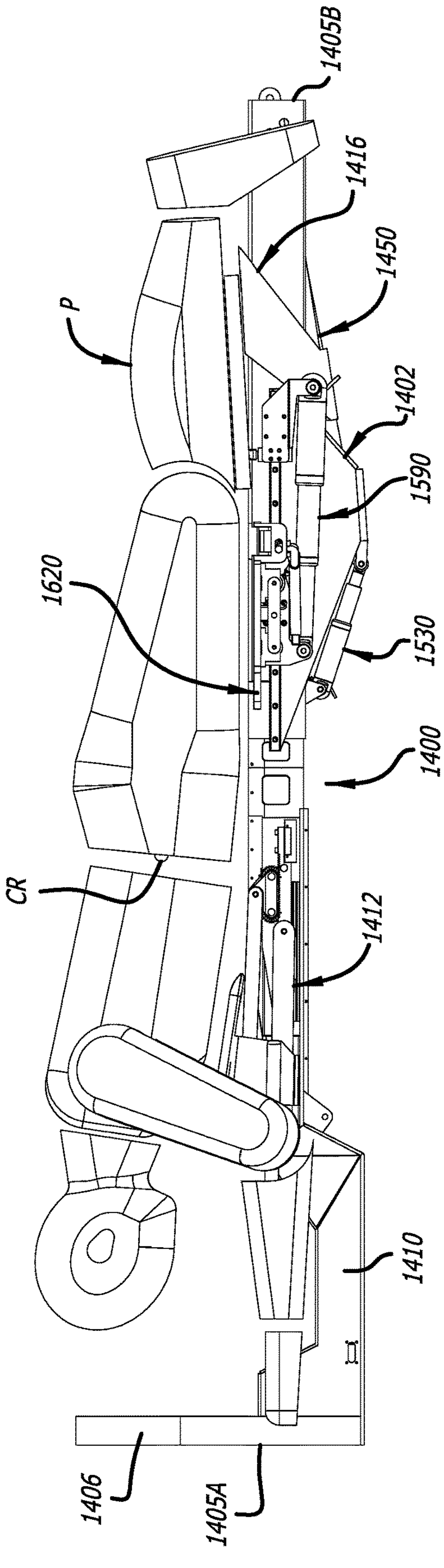
FIG. 48 is a side elevational view that illustrates the reconfigurable upper leg support of FIG. 40 and a patient partially supported thereby with a first arm portion, a first telescoping shaft portion, and a second telescoping shaft portion adjusted to position the upper leg support and the patient in a first position.
Figure 49:
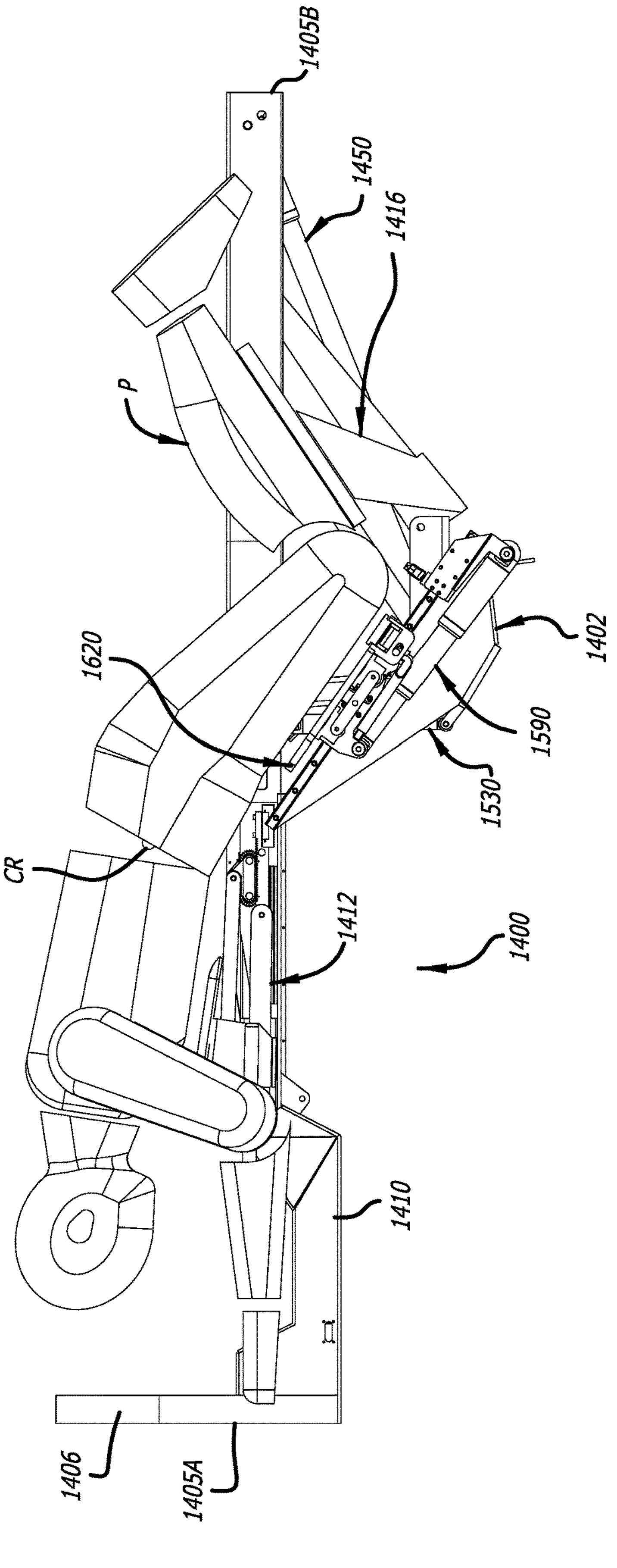
FIG. 49 is a side elevational view that illustrates the reconfigurable upper leg support of FIG. 40 and the patient partially supported thereby with the first arm portion, the first telescoping shaft portion, and the second telescoping shaft portion adjusted to position the upper leg support and the patient in a second position.

A controller (not shown) with a user interface (not shown) can be used to control the constrained/contingent extension and/or retraction of the extendable portion 1472, the extendable portion 1538, and the extendable portion 1598 via the controlled automation. Such extension and/or retraction, as depicted in FIGS. 48 and 49, affords positioning and repositioning of the support assembly 1620. Furthermore, because patients' heights can vary, the amounts of extension/retraction of the extendable portion 1472, the extendable portion 1538, and the extendable portion 1598 can be altered to accommodate these different heights while still being constrained/contingent upon one another to provide for the desired amount of manipulation of portions of the lumbar spine during articulation of the upper leg support 1402.

The controller with input via the user interface can allow the user to select the desired center of rotation and the desired amount of manipulation of the portions of the lumbar spine. To illustrate, the user interface can be used to display a graphical or actual representation of the patient's spine, and the user interface can permit the user to input the desired center of rotation and the desired amount of manipulation by, for example, highlighting a portion of the graphical or actual representation of the patient's spine on the user interface. The selection of the desired amount of manipulation can allow the user to select where the forces applied via the actuation of the extendable portion 1472, the extendable portion 1538, and the extendable portion 1598 are applied during flexure of the patient's spine. In addition to or alternatively to use of the user interface, a navigation tool interconnected with the controller and/or the user interface can be positioned on or adjacent the patient's spine to facilitate inputting of the desired center of rotation and the desired amount of manipulation. The inputting of the desired center of rotation and the desired amount of manipulation can be done with the main beam 404 and the patient P supported on the main beam 1404 in various rotational positions including, but not limited to, prone, lateral, and supine positions.

When the upper leg support 1402 is articulated such that the lumbar spine of the patient P is in an unflexed neutral position, as depicted in FIG. 48, the controller can be used to extend/retract the extendable portion 1472 (of the first arm portion 1450), the extendable portion 1538 (of the telescoping shaft portion 1540), and the extendable portion 1598 (of the telescoping shaft portion 1590) such that the first arm portion 1450, the telescoping shaft portion 1540, and the telescoping shaft portion 1590 have lengths that accommodate the height of the patient P. Furthermore, when the upper leg support 1402 is articulated such that the lumbar spine of the patient P has a 30 degree flex, as depicted in FIG. 49, the controller can be used to extend/retract the extendable portion 1472 (of the first arm portion 1450), the extendable portion 1538 (of the telescoping shaft portion 1530), and the extendable portion 1598 (of the telescoping shaft portion 1590) such that the first arm portion 1450, the telescoping shaft portion 1540, and the telescoping shaft portion 1590 have lengths that flex the lumbar spine of the patient P to afford surgical access thereto. Moreover, during the transition between the positions of FIGS. 48 and 49, the controller can serve to prevent unwanted torsion of the lumbar spine during articulation of the upper leg support 1402 by properly adjusting the amounts of extension/retraction of the extendable portion 1472, the extendable portion 1538, and the extendable portion 1598.

The relative amounts of extension/retraction can be provided for different patient heights and different degrees of flex of the lumbar spine, and can be included as presets in the controller. Thus, using the user interface of the controller, the operator of the surgical frame 1400 can input the height of the patient P, and input the desired degree of flexure of the lumbar spine, and the controller can actuate the first arm portion 1450 (to extend or retract the extendable portion 1472), the telescoping shaft portion 1530 (to extend or retract the extendable portion 1538), and the telescoping shaft portion 1590 (to extend or retract the extendable portion 1598) the appropriate amounts to provide such flexion, while also preventing unwanted torsion of the patient's spine. As discussed above, the extension/retraction of the extendable portion 1472 serves to change the angle of the first arm portion 1450 and the second arm portion 1452 relative to one another, the extension/retraction of the extendable portion 1538 serves to change the angle of the platform portion 1454 relative to the second arm portion 1452, and the extendable portion 1598 serves to change position of the bracket 1576 (which supports the first support plate 1640, the second support plate 1642, and the third support plate 1644) relative to the platform portion 1454. During such manipulation of the patient's spine using the upper leg support 1402, the lengths of the first arm portion 1450, the telescoping shaft portion 1530, and the telescoping shaft portion 1590 may each be alternatingly increased/decreased or decreased/increased to provide for the desired adjustable center of rotation CR. As such, the operator can use the controller to manipulate the upper leg support 1402 to flex the lumbar spine of the patient P into position for surgery, while simultaneously inhibiting the unwanted torsion of the patient's spine caused be reconfiguration of the upper leg support 1402.

Figure 47:
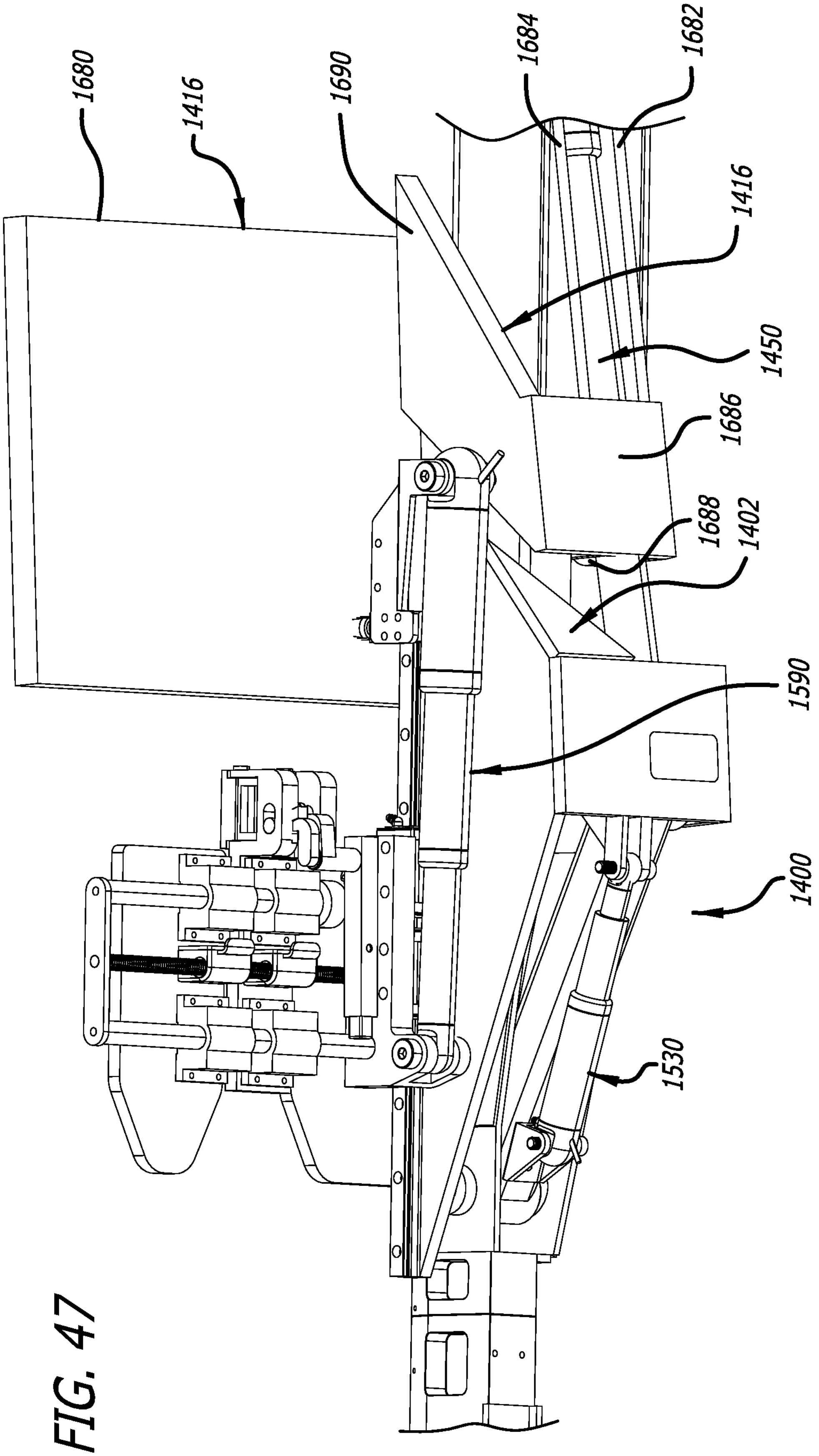
FIG. 47 is another enlarged, bottom perspective view that illustrates the reconfigurable upper leg support of FIG. 40 relative to the main beam.

In addition to the upper leg support 1402, the surgical frame 1400, as depicted in FIGS. 42 and 47 includes the lower leg support 1416 that supports the lower legs of the patient P. The lower leg support includes a support plate portion 1680, a first arm portion 1682, a second arm portion 1684, a first plate portion 1686, a second plate portion 1688, and a connecting rib 1690. The first arm portion 1682 and the second arm portion 1684 include first end portions 1692 and second end portions (not shown). The first end portions 1692 can include apertures 1696 facilitating attachment thereof to the third portion 1410 via receipt of the pin 1492 therein. Furthermore, the second end portions can be attached to the first plate portion 1686, and the first plate portion 1686 can be attached to the first arm portion 1450. As such, portions of the lower leg support 1416 can move with the articulation of the first arm portion 1450. The first plate portion 1686 connects the second plate portion 1688 and the connecting rib 1690 to one another, and the connecting rib 1690 attaches the support plate portion 1680 to the first plate portion 1686. As depicted in FIG. 42, the connecting rib 1690 spaces the support plate portion 1680 from the first plate portion 1686. The support plate portion 1680 can be used to support the patient's lower legs thereon.

Further, other types of mechanism or actuators, such as servomotors, can be used or configuration to provide for the mechanical articulations and movements necessary to support the biomechanical manipulations of the spine described herein.

It should be understood that various aspects disclosed herein may be combined in different combinations than the combinations specifically presented in the description and the accompanying drawings. It should also be understood that, depending on the example, certain acts or events of any of the processes of methods described herein may be performed in a different sequence, may be added, merged, or left out altogether (e.g., all described acts or events may not be necessary to carry out the techniques). In addition, while certain aspect of this disclosure are described as being performed by a single module or unit for purposes of clarity, it should be understood that the techniques of this disclosure may be performed by a combination of units or modules associated with, for example, a medical device.

We claim:

1. A method of adjusting a position of a patient supported on a surgical frame, the method comprising:

positioning the patient on the surgical frame by supporting upper legs of the patient on a support plate portion;

extending a first arm portion relative to a second arm portion to adjust a position of a platform portion supporting the support plate portion relative to a portion of the surgical frame, the first arm portion including a first end attached relative to the portion of the surgical frame and a second end attached relative to the platform portion, and the second arm portion including a first end attached relative to the platform portion and a second end attached relative to the portion of the surgical frame;

extending a telescoping shaft to adjust the position of the platform portion and the support plate portion supported thereby relative to at least one of the first arm portion and the second arm portion, the telescoping shaft including a first end attached relative to the second arm portion and a second end attached relative to the platform portion; and adjusting a position of a lumbar portion of a spine of the patient by coordinating extension of the first arm portion and the telescoping shaft to adjust the position of the platform and the support plate portion supported thereby downwardly and rotatably relative to the portion of the surgical frame to correspondingly adjust the upper legs of the patient supported by the support plate portion.

2. The method of claim 1, wherein the second end of the first arm portion and the first end of the second arm portion are pivotally attached to one another and to the platform portion.

3. The method of claim 2, wherein during extension of the first arm portion, the first arm portion and the second arm portion are pivoted with respect to one another.

4. The method of claim 3, wherein during extension of the telescoping shaft, the platform portion is rotated relative to the at least one of the first arm portion and the second arm portion.

5. The method of claim 1, wherein the first arm portion and the second arm portion are pivoted with respect to the portion of the surgical frame and one another during extension of the first arm portion, and the platform portion is rotated relative to the at least one of the first arm portion and the second arm portion during extension of the telescoping shaft.

6. The method of claim 1, further comprising rotating the portion of the surgical frame to position and reposition the portion of the surgical frame relative to remaining portions of the surgical frame.

7. The method of claim 1, wherein the support plate portion is attached to the platform portion via a support bracket, and further comprising moving the support bracket along portions of the platform portion, and moving the support plate portion inwardly and outwardly relative to the support bracket, the support bracket being moveable along a track attached to the platform portion, and the support plate portion being moveable along at least one support post extending outwardly from the support bracket.

8. A method of adjusting a position of a patient supported on a surgical frame, the method comprising:

supporting upper legs of the patient on a support plate portion of the surgical frame;

supporting the support plate portion relative to a portion of the surgical frame by a platform portion, a first arm portion, and a second arm portion, the first arm portion and the second portion being pivotal with respect to one another via pivotal attachment thereof to the platform portion;

extending the first arm portion to adjust a position of the platform portion and the support plate portion supported thereby relative to the portion of the surgical frame, the first arm portion including a first end attached relative to the portion of the surgical frame and a second end attached to the platform portion, and the second arm portion including a first end attached to the platform portion and a second end attached relative to the portion of the surgical frame;

extending a telescoping shaft to adjust the position of the platform portion and the support plate portion supported thereby relative to the first arm portion and the second arm portion, the telescoping shaft including a first end attached to second arm portion and a second end attached to the platform portion; and adjusting a position of a lumbar portion of a spine of the patient by coordinating extension of the first arm portion and the telescoping shaft to adjust the position of the platform portion and the support plate portion supported thereby downwardly and rotably relative to the portion of the surgical frame to correspondingly adjust the upper legs of the patient supported by the support plate portion.

9. The method of claim 8, wherein during extension of the first arm portion, the first arm portion and the second arm portion are pivoted with respect to one another.

10. The method of claim 9, further comprising retracting the first arm portion to further adjust the position of the platform portion relative to the surgical frame.

11. The method of claim 8, wherein during extension of the telescoping shaft, a rotational position of the platform portion is adjusted.

12. The method of claim 8, further comprising rotating the portion of the surgical frame to position and reposition the portion of the surgical frame relative to remaining portions of the surgical frame.

13. The method of claim 8, wherein the support plate portion is attached to the platform portion via a support bracket; and further comprising moving the support bracket along portions of the platform portion, and moving the support plate portion inwardly and outwardly relative to the support bracket, the support bracket being moveable along a track attached to the platform portion; and the support plate portion being moveable along at least one support post extending outwardly from the support bracket.

14. A method of adjusting a position of a patient supported on a surgical frame, the method comprising:

pivotally attaching each of a first arm portion and a second arm portion to a portion of the surgical frame and to a platform portion;

positioning the patient on the surgical frame by supporting upper legs of the patient on a support plate portion supported by the platform portion;

pivoting and extending the first arm portion relative to the surgical frame and pivoting the second arm portion relative to the surgical frame to adjust the position of the platform portion relative to the portion of the surgical frame; and extending a telescoping shaft to adjust the position of the platform portion and the support plate portion supported thereby relative to at least one of the first arm portion and the second arm portion, the telescoping shaft including a first end attached relative to the second arm portion and a second end attached relative to the portion of the platform portion; and adjusting a position of a lumbar portion of a spine of the patient by coordinating extension of the first arm portion and the telescoping shaft to adjust the position of the platform portion and the support plate portion supported thereby downwardly and rotatably relative to the portion of the surgical frame to correspondingly adjust the upper legs of the patient supported by the support plate portion.

15. The method of claim 14, wherein the pivoting of the first arm portion is afforded by extension of the first arm portion.

16. The method of claim 14, wherein during extension of the telescoping shaft, the platform portion is rotated relative to the first arm portion.

17. The method of claim 14, wherein a first end the first arm portion is pivotally attached to the portion of the surgical frame and a second end of the first arm portion is attached to the platform portion, and a first end of the second arm portion is pivotally attached to the portion of the surgical frame and a second end of the second arm portion is attached to the platform portion.

18. The method of claim 17, wherein the support plate portion is attached to the platform portion via a support bracket; and further comprising moving the support bracket along portions of the platform portion, and moving the support plate portion inwardly and outwardly relative to the support bracket, the support bracket being moveable along a track attached to the platform portion, and the support plate portion being moveable along at least one support post extending outwardly from the support bracket.

19. The method of claim 14, further comprising rotating the portion of the surgical frame to position and reposition the portion of the surgical frame relative to remaining portions of the surgical frame.

20. The method of claim 14, wherein the support plate portion is attached to the platform portion via a support bracket; and further comprising moving the support bracket along portions of the platform portion, and moving the support plate portion inwardly and outwardly relative to the support bracket, the support bracket being moveable along a track attached to the platform portion, and the support plate portion being moveable along at least one support post extending outwardly from the support bracket.

* * * * *